US00RE50078E

(19) United States
(12) Reissued Patent
Shin et al.

(10) Patent Number: US RE50,078 E
(45) Date of Reissued Patent: *Aug. 13, 2024

(54) DEVICE AND SYSTEM INCLUDING ADAPTIVE REPAIR CIRCUIT

(71) Applicant: Samsung Electronics Co., Ltd., Suwon-si (KR)

(72) Inventors: Sang-Hoon Shin, Goyang-si (KR); Hae-Suk Lee, Seongnam-si (KR); Han-Vit Jung, Seoul (KR); Kyo-Min Sohn, Yongin-si (KR)

(73) Assignee: Samsung Electronics Co., Ltd., Gyeonggi-do (KR)

( * ) Notice: This patent is subject to a terminal disclaimer.

(21) Appl. No.: 17/546,251

(22) Filed: Dec. 9, 2021

Related U.S. Patent Documents

Reissue of:
(64) Patent No.: 10,678,631
Issued: Jun. 9, 2020
Appl. No.: 16/032,368
Filed: Jul. 11, 2018

U.S. Applications:
(63) Continuation of application No. 15/650,096, filed on Jul. 14, 2017, now Pat. No. 10,296,414, which is a
(Continued)

(30) Foreign Application Priority Data

Apr. 23, 2015 (KR) ..... 10-2015-0057080

(51) Int. Cl.
*G06F 11/00* (2006.01)
*G06F 11/07* (2006.01)
(Continued)

(52) U.S. Cl.
CPC ..... *G06F 11/1423* (2013.01); *G06F 11/0703* (2013.01); *G06F 11/0793* (2013.01);
(Continued)

(58) Field of Classification Search
CPC ..... G06F 11/1423; G06F 11/0793; G06F 11/142; G06F 11/2017; G06F 11/1616;
(Continued)

(56) References Cited

U.S. PATENT DOCUMENTS 6,367,042 B1 4/2002 Phan et al.
7,111,213 B1 9/2006 Dastidar et al.
(Continued)

*Primary Examiner* — William H. Wood
(74) *Attorney, Agent, or Firm* — Harness, Dickey & Pierce, P.L.C.

(57) ABSTRACT

A device, system, and/or method includes an internal circuit configured to perform at least one function, an input-output terminal set and a repair circuit. The input-output terminal set includes a plurality of normal input-output terminals connected to an external device via a plurality of normal signal paths and at least one repair input-output terminal selectively connected to the external device via at least one repair signal path. The repair circuit repairs at least one failed signal path included in the normal signal paths based on a mode signal and fail information signal, where the mode signal represents whether to use the repair signal path and the fail information signal represents fail information on the normal signal paths. Using the repair circuit, various systems adopting different repair schemes may be repaired and cost of designing and manufacturing the various systems may be reduced.

37 Claims, 56 Drawing Sheets

Related U.S. Application Data continuation of application No. 14/739,534, filed on Jun. 15, 2015, now Pat. No. 9,727,409.

(60) Provisional application No. 62/013,140, filed on Jun. 17, 2014.

(51) Int. Cl.

| | |
|---|---|
| ***G06F 11/14*** | (2006.01) |
| ***G06F 11/16*** | (2006.01) |
| ***G06F 11/18*** | (2006.01) |
| ***G06F 11/20*** | (2006.01) |

(52) U.S. Cl.

CPC ..... *G06F 11/0796* (2013.01); *G06F 11/142* (2013.01); *G06F 11/1616* (2013.01); *G06F 11/18* (2013.01); *G06F 11/2002* (2013.01); *G06F 11/2017* (2013.01)

(58) Field of Classification Search

CPC .. G06F 11/0703; G06F 11/18; G06F 11/2002; G06F 11/0796

See application file for complete search history.

(56) References Cited

U.S. PATENT DOCUMENTS

| | | | |
|---|---|---|---|
| 7,222,274 | B2 | 5/2007 | Combs et al. |
| 7,287,177 | B2 | 10/2007 | Bonaccio et al. |
| 7,516,375 | B2 | 4/2009 | Fong et al. |
| 8,060,774 | B2 | 11/2011 | Smith et al. |
| 8,134,378 | B2 | 3/2012 | Keeth |
| 8,161,334 | B1 | 4/2012 | Hulbert et al. |
| 8,230,274 | B2 | 7/2012 | Fujiwara et al. |
| 8,332,729 | B2 | 12/2012 | Sivaramakrishnan et al. |
| 8,339,879 | B2 | 12/2012 | Choi et al. |
| 8,578,591 | B2 | 11/2013 | Hargan |
| 8,659,961 | B2 | 2/2014 | Rooney et al. |
| 8,873,267 | B2 * | 10/2014 | Lee ..... H01L 25/0655 365/63 |
| 8,890,607 | B2 * | 11/2014 | Huang ..... H01L 23/481 257/776 |
| 9,182,925 | B2 * | 11/2015 | Thayer ..... G06F 13/385 |
| 9,304,167 | B2 * | 4/2016 | Hwang ..... G01R 31/318513 |
| 9,646,720 | B2 * | 5/2017 | Yang ..... G11C 29/04 |
| 10,296,414 | B2 * | 5/2019 | Shin ..... G06F 11/2002 |
| 2002/0188711 | A1 | 12/2002 | Meyer et al. |
| 2006/0221818 | A1 | 10/2006 | Alves et al. |
| 2008/0027564 | A1 | 1/2008 | Duron et al. |
| 2009/0292946 | A1 | 11/2009 | Chang |
| 2010/0332177 | A1 | 12/2010 | Wu et al. |
| 2011/0156034 | A1 | 6/2011 | Cui et al. |
| 2012/0144087 | A1 | 6/2012 | Buckland et al. |
| 2012/0319717 | A1 * | 12/2012 | Chi ..... G01R 31/318513 324/756.05 |
| 2013/0044554 | A1 | 2/2013 | Goel et al. |
| 2013/0049833 | A1 | 2/2013 | Byeon et al. |
| 2013/0093454 | A1 | 4/2013 | Lai et al. |
| 2013/0159587 | A1 | 6/2013 | Nygren et al. |
| 2013/0185608 | A1 | 7/2013 | Bhawmik |
| 2013/0294184 | A1 | 11/2013 | Yang et al. |
| 2015/0115329 | A1 | 4/2015 | Lin et al. |
| 2015/0185274 | A1 | 7/2015 | Hwang et al. |
| 2015/0278040 | A1 | 10/2015 | Sikkink et al. |
| 2015/0364219 | A1 | 12/2015 | Kim |

* cited by examiner

| BLK | PSLi | CONNECTION |
|---|---|---|
| L | L | 1 |
| L | H | 2 |
| H | L | BLOCK |
| H | H | BLOCK |

FIG. 12

| CASE # | MD | FLI1 | FLI2 | FLI3 | FLI4 | PSL1 | PSL2 | PSL3 | PSL4 | BLK |
|---|---|---|---|---|---|---|---|---|---|---|
| 1 | H | L | L | L | L | L | L | L | L | L |
| 2 | H | H | L | L | L | H | H | H | H | H |
| 3 | H | L | H | L | L | L | H | H | H | H |
| 4 | H | L | L | H | L | L | L | H | H | H |
| 5 | H | L | L | L | H | L | L | L | H | H |
| 6 | L | L | L | L | L | L | L | L | L | L |
| 7 | L | H | L | L | L | H | H | H | H | L |
| 8 | L | L | H | L | L | L | H | H | H | L |
| 9 | L | L | L | H | L | L | L | H | H | L |
| 10 | L | L | L | L | H | L | L | L | H | L |

| BLK | MD | PSLi | CONNECTION |
|---|---|---|---|
| L | H | L | 1 |
| | L | L | 1 |
| | H | H | 2 |
| | L | H | 3 |
| H | - | - | BLOCK |

FIG. 23

| CASE # | MD | FLI1 | FLI2 | FLI3 | FLI4 | PSL1 | PSL2 | PSL3 | PSL4 | BLK |
|---|---|---|---|---|---|---|---|---|---|---|
| 1 | H | L | L | L | L | L | L | L | L | L |
| 2 | H | H | L | L | L | H | L | L | L | H |
| 3 | H | L | H | L | L | L | H | L | L | H |
| 4 | H | L | L | H | L | L | L | H | L | H |
| 5 | H | L | L | L | H | L | L | L | H | H |
| 6 | L | L | L | L | L | L | L | L | L | L |
| 7 | L | H | L | L | L | H | L | L | L | L |
| 8 | L | L | H | L | L | L | H | L | L | L |
| 9 | L | L | L | H | L | L | L | H | L | L |
| 10 | L | L | L | L | H | L | L | L | H | L |

DEVICE AND SYSTEM INCLUDING ADAPTIVE REPAIR CIRCUIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[CROSS-REFERENCE TO RELATED APPLICATION] *CROSS-REFERENCE TO RELATED APPLICATIONS*

This application *is a reissue application of U.S. Pat. No. 10,678,631, issued on Jun. 9, 2020 from U.S. patent application Ser. No. 16/032,368, filed on Jul. 11, 2018, which* is a continuation of U.S. patent application Ser. No. 15/650,096, filed on Jul. 14, 2017, which is a continuation of U.S. patent application Ser. No. 14/739,534, filed on Jun. 15, 2015, which claims priority under 35 USC § 119 to U.S. Provisional Application No. 62/013,140, filed on Jun. 17, 2014 in the USPTO, and Korean Patent Application No. 10-2015-0057080, filed on Apr. 23, 2015, in the Korean Intellectual Property Office (KIPO), the entire contents of each of which are incorporated by reference herein in their entirety.

BACKGROUND

1. Technical Field

Example embodiments relate generally to semiconductor integrated circuits, and more particularly to devices and/or systems including an adaptive repair circuit.

2. Discussion of the Related Art

Recent high-performance systems require repair schemes for elements that may have failed. Among many elements in a system, interconnects connecting devices or sub systems may have a high probability of failing, and the failure in the interconnects may cause a breakdown of the entire system. A software recovery mechanism may be adopted to compensate for and/or repair the failure in the interconnects, but it is not a satisfactory solution because the software recovery mechanism is performed by reconfiguring hardware during rebooting processes.

A device performing its own functions may be connected to various other devices having different repair schemes through the interconnects. The device has to be implemented with different configurations depending on the repair scheme of the interconnected device even though the function of the device is not changed.

SUMMARY

At least one example embodiment of the inventive concepts provides a device including an adaptive repair circuit capable of supporting different repair schemes.

At least one example embodiment of the inventive concepts provides a system including sub systems where at least one of the sub systems includes an adaptive repair circuit capable of supporting different repair schemes.

At least one example embodiment of the inventive concepts provides a stacked device including an adaptive repair circuit capable of supporting different repair schemes.

According to some example embodiments, a device includes an internal circuit configured to perform at least one function, an input-output terminal set and a repair circuit. The input-output terminal set includes a plurality of normal input-output terminals connected to an external device via a plurality of normal signal paths and at least one input-output terminal selectively connected to the external device via at least one repair signal path. The repair circuit repairs at least one failed signal path included in the normal signal paths based on a mode signal and fail information signal, where the mode signal represents whether to use the repair signal path and the fail information signal represents fail information on the normal signal paths.

The repair circuit may selectively operate in a first repair mode that the repair input-output terminal is not used and a second repair mode that the repair input-output terminal is used, based on the mode signal.

The normal input-output terminals may include a plurality of main input-output terminals to transfer main signals for a main operation of the internal circuit and at least one sub input-output terminal to transfer a sub signal for a sub operation of the internal circuit.

The repair circuit may repair a failed input-output terminal corresponding to the failed signal path among the normal input-output terminals using the sub input-output terminal in the first repair mode, and the internal circuit may quit the sub operation in the first repair mode.

The repair circuit may repair a failed input-output terminal corresponding to the failed signal path among the normal input-output terminals using the repair input-output terminal in the second repair mode.

The device may further include an initialization circuit connected to the repair input-output terminal, and the initialization circuit may apply an initialization voltage to the repair input-output terminal in response to the mode signal.

The normal input-output terminals may be divided into a plurality of groups, and the repair input-output terminal may be assigned independently to each group.

The normal input-output terminals may be divided into a plurality of groups, and the repair input-output terminal may be assigned commonly to the groups.

The repair circuit may perform a shifting repair operation such that a failed input-output terminal corresponding to the failed signal path among the normal input-output terminals may be replaced with another normal input-output terminal or the repair input-output terminal that is adjacent to the failed input-output terminal.

The repair circuit may perform a multiplexing repair operation such that a failed input-output terminal corresponding to the failed signal path among the normal input-output terminals may be replaced with a sub input-output terminal among the normal input-output terminals or the repair input-output terminal.

The repair circuit may include a repair controller configured to generate a plurality of path selection signals based on the mode signal and the fail information signal and a plurality of conversion units. Each conversion unit may control an electrical connection between each input-output node of the internal circuit and two or more input-output terminals in the input-output terminal set.

Each conversion unit may include at least one of a receiver configured to output a reception signal to each input-output node of the internal circuit, where the reception signal is input from one of the two or more terminals in the input-output terminal set in response to each path selection signal, and a transmitter configured to output a transmission signal to one of the two or more terminals in the input-output terminal set in response to each path selection signal, where the transmission signal is input from each input-output node of the internal circuit.

The normal input-output terminals may include a plurality of main input-output terminals to transfer main signals for a main operation of the internal circuit and at least one sub input-output terminal to transfer a sub signal for a sub operation of the internal circuit.

Each of main conversion units corresponding to the main input-output terminals among the conversion units may be connected to a corresponding normal input-output terminal and an adjacent normal input-output terminal among the normal input-output terminals, and a sub conversion unit corresponding to the sub input-output terminal among the conversion units may be connected to the sub input-output terminal and the repair input-output terminal.

The repair controller may deactivate all of the path selection signals in a first logic level when the normal signal paths do not include the failed signal path, and activate the path selection signals corresponding to the failed signal path through the last normal signal path in a second logic level when the normal signal paths include the failed signal path.

A sub conversion unit corresponding to the sub input-output terminal among the conversion units may block an electrical connection between the internal circuit and the sub conversion unit.

Each of main conversion units corresponding to the main input-output terminals among the conversion units may be connected to a corresponding normal input-output among the normal input-output terminals, the sub input-output terminal and the repair input-output terminal, and a sub conversion unit corresponding to the sub input-output terminal among the conversion units may be connected to the sub input-output terminal and the repair input-output terminal.

The repair controller may deactivate all of the path selection signals in a first logic level when the normal signal paths do not include the failed signal path, and activate only the path selection signal corresponding to the failed signal path in a second logic level when the normal signal paths include the failed signal path.

According to some example embodiments, a system includes a first sub system, a second sub system and a plurality of normal signal paths connecting the first sub system and the second sub system. The first sub system includes an internal circuit configured to perform at least one function, an input-output terminal set including a plurality of normal input-output terminals connected to the second sub system via a plurality of normal signal paths and at least one repair input-output terminal selectively connected to the second sub system via at least one repair signal path, and a repair circuit configured to repair at least one failed signal path included in the normal signal paths based on a mode signal and fail information signal, where the mode signal represents whether to use the repair signal path and the fail information signal represents fail information on the normal signal paths.

According to some example embodiments, a stacked device includes a base substrate and a plurality of semiconductor dies stacked on the based substrate. Each of the semiconductor dies includes an internal circuit configured to perform at least one function, an input-output terminal set including a plurality of normal input-output terminals connected to an external device via a plurality of normal signal paths and at least one repair input-output terminal selectively connected to the external device via at least one repair signal path, and a repair circuit configured to repair at least one failed signal path included in the normal signal paths based on a mode signal and fail information signal, where the mode signal represents whether to use the repair signal path and the fail information signal represents fail information on the normal signal paths.

According to some example embodiments, a device may include a repair circuit between output nodes of an integrated circuit (IC) and a set of output terminals, the repair circuit configured to selectively connect the output nodes with a subset of the output terminals based on fail information, the subset including a number of the output terminals that is less than all of the output terminals, and the fail information indicating whether a failure has occurred that affects at least one of the output terminals.

The device may further include the IC, and the IC may be configured to perform at least one function.

The repair circuit may further include at least one conversion unit configured to selectively establish an electrical connection between one of the output nodes and a selected one of the output terminals based on a control signal, and a repair controller configured to transmit the control signal to the conversion unit based on the fail information, the control signal indicating the selected one of the output terminals.

The device including the adaptive repair circuit according to some example embodiments may repair various systems adopting different repair schemes. The device including the adaptive repair circuit may support the different repair schemes using the same configuration and thus cost of designing and manufacturing various systems may be reduced.

BRIEF DESCRIPTION OF THE DRAWINGS

The foregoing and other features of inventive concepts will be apparent from the more particular description of non-limiting embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 12 is a diagram for describing an overall operation of a repair circuit including the path conversion circuit of FIG. 3 according to some example embodiments.

FIG. 23 is a diagram for describing an overall operation of a repair circuit including the path conversion circuit of FIG. 14 according to some example embodiments.

DETAILED DESCRIPTION OF THE EMBODIMENTS

Figure 1:
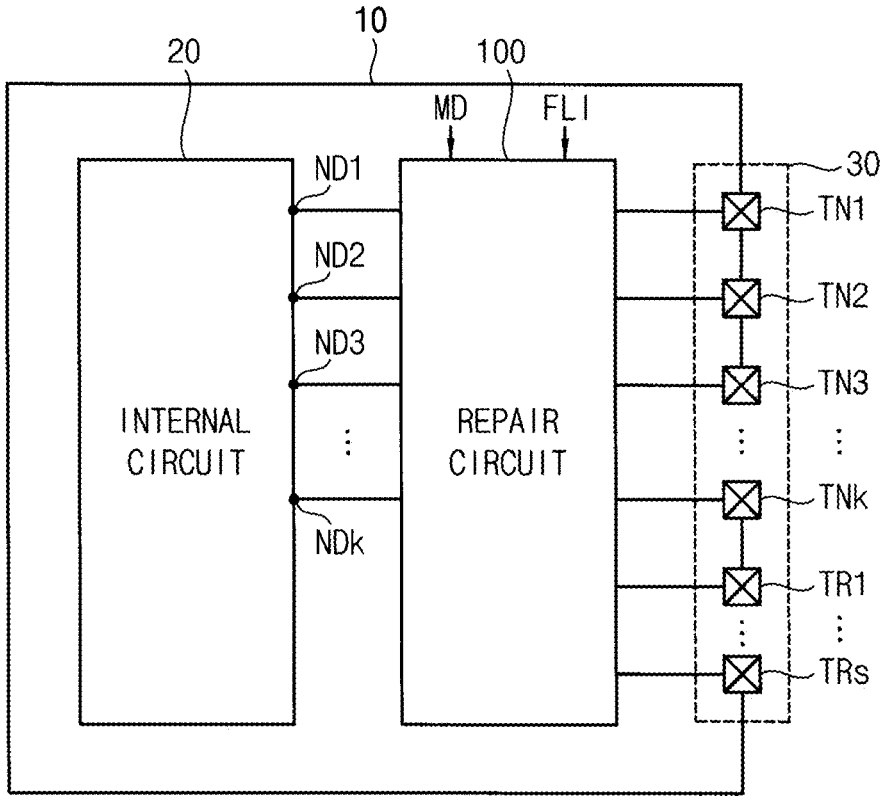
FIG. 1 is a block diagram illustrating a device including a repair circuit according to some example embodiments.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

In example embodiments, a nonvolatile memory may be embodied to include a three dimensional (3D) memory array. The 3D memory array may be monolithically formed on a substrate (e.g., semiconductor substrate such as silicon, or semiconductor-on-insulator substrate). The 3D memory array may include two or more physical levels of memory cells having an active area disposed above the substrate and circuitry associated with the operation of those memory cells, whether such associated circuitry is above or within such substrate. The layers of each level of the array may be directly deposited on the layers of each underlying level of the array.

In example embodiments, the 3D memory array may include vertical NAND strings that are vertically oriented such that at least one memory cell is located over another memory cell. The at least one memory cell may comprise a charge trap layer.

The following patent documents, which are hereby incorporated by reference in their entirety, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

FIG. 1 is a block diagram illustrating a device including a repair circuit according to some example embodiments.

Referring to FIG. 1, a device 10 includes an internal circuit 20, an input-output terminal set 30 and a repair circuit 100.

The internal circuit 20 may perform its own functions. For example, if the device 10 is a memory device, the internal circuit 20 may include a memory cell array and peripheral circuits to operate the memory cell array. The internal circuit of the memory device may perform main operations such as a write operation and a read operation and other sub operations. If the device 10 is a display device, the internal circuit may include a pixel array and peripheral circuits to operate the pixel array. The internal circuit of the display device may perform the main operations such as an image displaying operation and other sub operations. The internal circuit 20 may have various configuration depending on the desired functions of the device 10.

The input-output terminal set 30 may include a plurality of normal input-output terminals TN1~TNk that are connected to an external device via a plurality of normal signal paths and one or more repair input-output terminals TR1~TRs that are selectively connected to the external device via one or more repair signal paths. The normal signal paths are for exchanging signals with the external device to perform the functions of the device 10 and the normal input-output terminals TN1~TNk are connected to the normal signal paths requisitely. In contrast, the repair signal path may be omitted depending on the repair scheme of the external device and the repair input-output terminals TR1~TRs may be connected to the repair signal paths selectively.

The repair circuit 100 may repair at least one failed signal path included in the normal signal paths based on a mode signal MD and fail information signal FLI where the mode signal MD represents whether to use the repair signal path, and the fail information signal FLI represents fail information on the normal signal paths.

As illustrated in FIG. 1, the normal input-output terminals TN1~TNk may correspond to input-output nodes ND1~NDk, respectively. The first normal input-output terminal TN1 corresponds to the first input-output node ND1 of the internal circuit 20, the second normal input-output terminal TN2 corresponds to the second input-output node ND2 of the internal circuit 20, and in this way the last normal input-output terminal TNk corresponds to the last input-output node NDk of the internal circuit 20. The repair circuit 100 may connect each input-output node NDi (i=1~k) to the corresponding normal input-output terminal TNi when the normal signal paths do not include the failed signal path. When the normal signal paths include the failed signal path, the repair circuit 100 may change electrical connections between the input-output nodes ND1~NDk of the internal circuit 20 and the input-output terminals TN1~TNk and TR1~TRs so that the failed signal path may be repaired.

The repair circuit 100 may selectively operate in a first repair mode where the repair input-output terminals TR1~TRs are not used and a second repair mode where the repair input-output terminals TR1~TRs are used, based on the mode signal MD. As such, the device 10 including the adaptive repair circuit 100 according to some example embodiments may repair various systems adopting different repair schemes. The device 10 including the adaptive repair circuit 100 may support the different repair schemes using the same configuration and thus the cost of designing and manufacturing various systems may be reduced.

Figure 2:
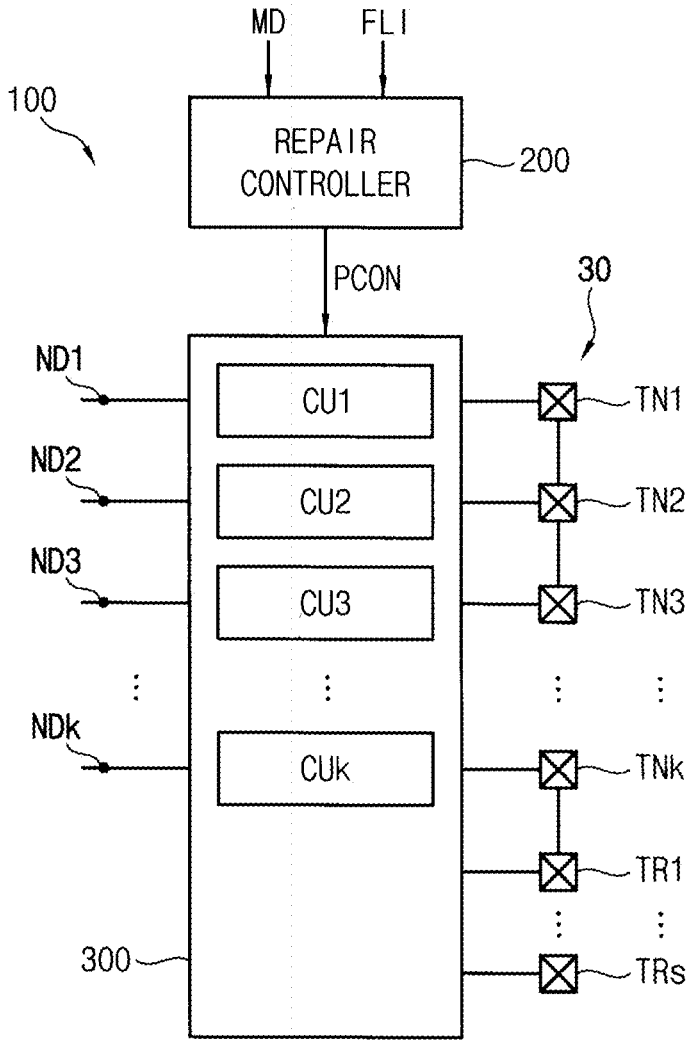
FIG. 2 is a block diagram illustrating a repair circuit included in the device of FIG. 1 according to some example embodiments.

FIG. 2 is a block diagram illustrating a repair circuit included in the device of FIG. 1 according to some example embodiments.

Referring to FIG. 2, a repair circuit 100 may include a repair controller 200 and a path conversion circuit 300.

The repair controller 200 may generate a path control signal PCON based on the mode signal MD and the fail information signal FLI. The path control signal PCON may include a block control signal BLK and a plurality of path selection signals PSL1~PSLk that are respectively provided to a plurality of conversion units CU1~CUk as will be described below.

The path conversion circuit 300 may control electrical connections between the input-output terminal set 30 and the internal circuit 20 in FIG. 1 in response to the path selection signals PSL1~PSLk. As illustrated in FIG. 2, the path conversion circuit 30 may include the plurality of conversion units. Each conversion unit CUi (i=1~k) may control an electrical connection between each input-output node NDi of the internal circuit 20 and two or more input-output terminals in the input-output terminal set 30.

The repair circuit 100 may selectively operate in a first repair mode where the repair input-output terminals TR1~TRs are not used and a second repair mode where the repair input-output terminals TR1~TRs are used, based on the mode signal MD. The repair circuit 100 may be implemented to perform a shifting repair operation or a multiplexing repair operation. Hereinafter example embodiments of the repair circuit performing the shifting repair operation are described with reference to FIGS. 3 through 13 and example embodiments of the repair circuit performing the multiplexing operation are described with reference to FIGS. 14 through 24.

Figure 3:
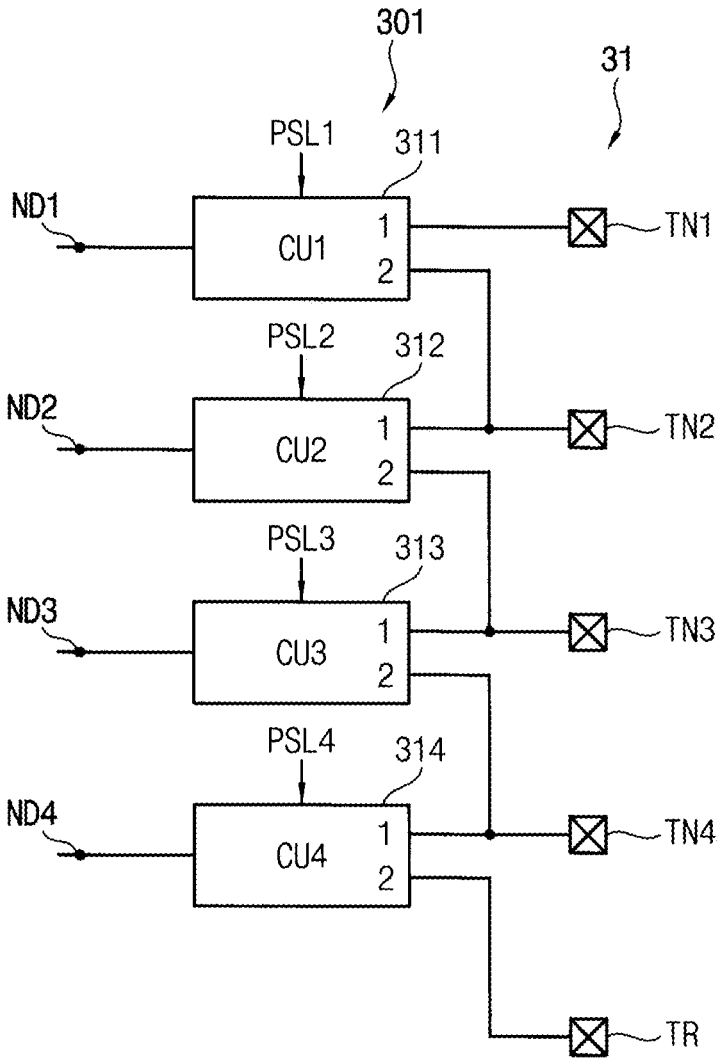
FIG. 3 is a block diagram illustrating a path conversion circuit performing a shifting repair operation according to some example embodiments.

FIG. 3 is a block diagram illustrating a path conversion circuit performing a shifting repair operation according to some example embodiments.

Referring to FIG. 3, a path conversion circuit 301 may include a plurality of conversion units, such as conversion units CU1~CU4 311~314. Each of the conversion units 311~314 may control an electrical connection between each of the plurality of input-output nodes, such as input-output nodes ND1~ND4 of the internal circuit and two or more input-output terminals in the input-output terminal set 31 in response to each of the plurality of path selection signals, such as path selection signals PSL1~PSL4. FIG. 3 illustrates the first through fourth conversion units 311~314 for convenience of illustration and description, but the number of the conversion units and the input-output terminals may be changed variously.

As will be described below with reference to FIG. 7, the normal input-output terminals TN1~TN4 may include a plurality of main input-output terminals to transfer main signals for a main operation of the internal circuit 20 in FIG. 1 and at least one sub input-output terminal to transfer a sub signal for a sub operation of the internal circuit. For example, in the configuration of FIG. 3, the first, second and third normal input-output terminals TN1, TN2 and TN3 may be the main input-output terminals and the fourth normal input-output terminal TN4 may be the sub input-output terminal.

Each of the main conversion units 311, 312 and 313 corresponding to the main input-output terminals TN1, TN2 and TN3 among the conversion units 311~314 may be connected to a corresponding normal input-output terminal and an adjacent normal input-output terminal among the normal input-output terminals TN1~TN4. In other words, the first conversion unit 311 may be connected to the first normal input-output terminal TN1 and the second normal input-output terminal TN2, the second conversion unit 312 may be connected to the second normal input-output terminal TN2 and the third normal input-output terminal TN3, and the third conversion unit 313 may be connected to the third normal input-output terminal TN3 and the fourth normal input-output terminal TN4.

The sub conversion unit 314 corresponding to the sub input-output terminal TN4 among the conversion units 311~314, that is, the fourth conversion unit 314 may be connected to the sub input-output terminal TN4 and the repair input-output terminal TR.

As will be described below with reference to FIGS. 11 and 12, the repair controller 200 in FIG. 2 may control logic levels of the path selection signals PSL1~PSL4 so that the shifting repair operation may be performed. Each of the conversion units 311~314 may be connected selectively to one of the two input-output terminals depending on each logic level of the path selection signals PSL1~PSL4. When each path selection signal PSLi is deactivated in a first logic level (e.g., a logic low level), each conversion unit CUi may select the terminal '1' to be connected to the corresponding input-output terminal. When each path selection signal PSLi is activated in a second logic level (e.g., a logic high level), each conversion unit CUi may select the terminal '2' to be connected to the adjacent input-output terminal.

Figure 4A:
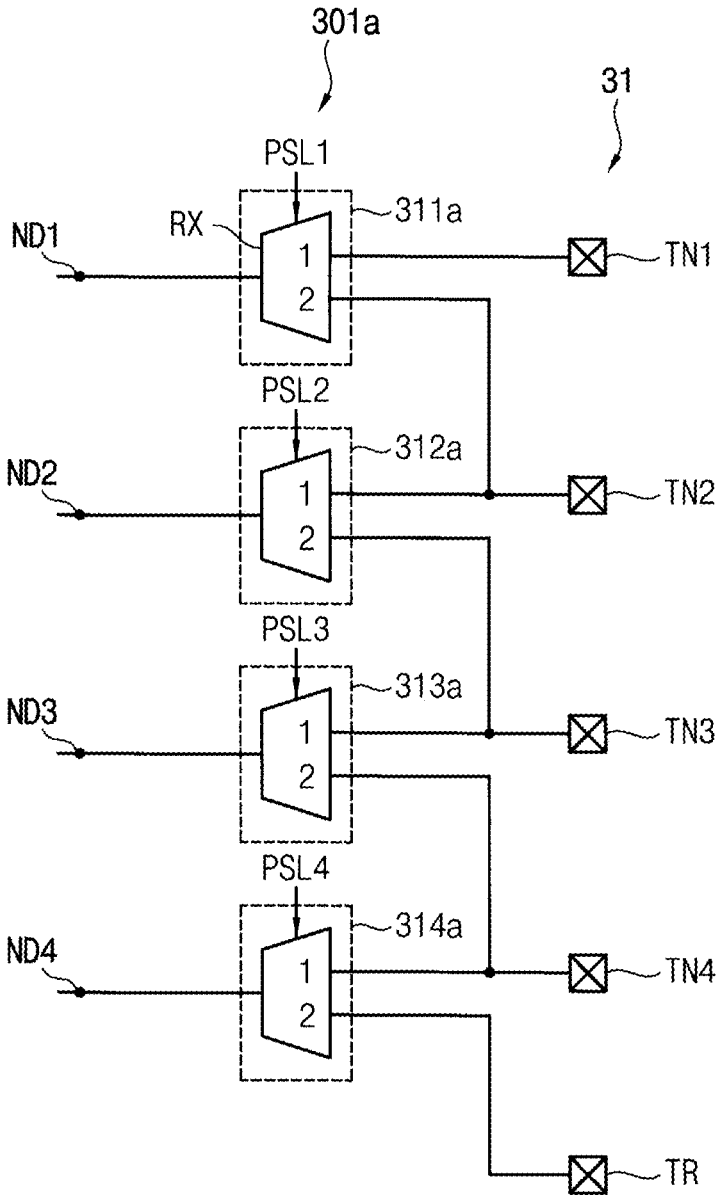
FIG. 4A is a diagram illustrating an example embodiment of a path conversion circuit performing a receiving operation with a shifting repair scheme.

FIG. 4A is a diagram illustrating an example embodiment of a path conversion circuit performing a receiving operation with a shifting repair scheme.

Referring to FIG. 4A, a path conversion circuit 301a may include a plurality of conversion units 311a~314a functioning as reception interface and each of the conversion units 311a~314a may include a receiver RX to transfer reception signals from the external device to the internal circuit 20 in FIG. 1. Each receiver RX may output the reception signal to each of the input-output nodes ND1~ND4 of the internal circuit 20, where the reception signal is input from one of the two or more terminals in the input-output terminal set 31 in response to each of the path selection signals ND1~ND4.

The receiver RX in the first conversion unit 311a may connect one of the first normal input-output terminal TN1 and the second normal input-output terminal TN2 to the first input-output node ND1 of the internal circuit 20 in response to the first path selection signal PSL1. The receiver RX in the second conversion unit 312a may connect one of the second normal input-output terminal TN2 and the third normal input-output terminal TN3 to the second input-output node ND2 of the internal circuit 20 in response to the second path selection signal PSL2. The receiver RX in the third conversion unit 313a may connect one of the third normal input-output terminal TN3 and the fourth normal input-output terminal TN4 to the third input-output node ND3 of the internal circuit 20 in response to the third path selection signal PSL3. The receiver RX in the fourth conversion unit 314a may connect one of the fourth normal input-output terminal TN4 and the repair input-output terminal TR to the fourth input-output node ND4 of the internal circuit 20 in response to the fourth path selection signal PSL4.

Figure 4B:
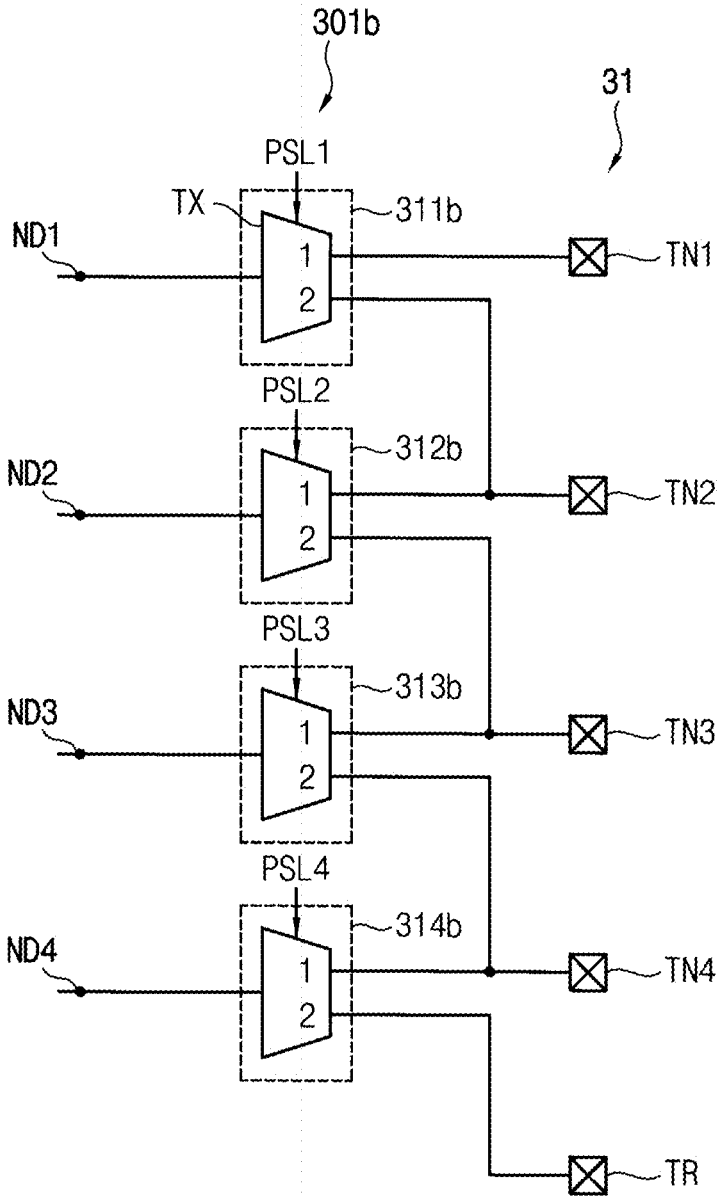
FIG. 4B is a diagram illustrating an example embodiment of a path conversion circuit performing a transmitting operation with a shifting repair scheme.

FIG. 4B is a diagram illustrating an example embodiment of a path conversion circuit performing a transmitting operation with a shifting repair scheme.

Referring to FIG. 4B, a path conversion circuit 301b may include a plurality of conversion units, such as conversion units 311b~314b, functioning as transmission interface and each of the conversion units 311b~314b may include a transmitter TX to transfer transmission signals from the internal circuit in FIG. 1 to the external device. Each transmitter TX may output the transmission signal to at least one of the two or more terminals in the input-output terminal set 31 in response to each of the path selection signals PSL1~PSL4, where the transmission signal is input from each of the input-output nodes ND1~ND4 of the internal circuit 20.

The transmitter TX in the first conversion unit 311b may connect the first input-output node ND1 of the internal circuit 20 to one of the first normal input-output terminal TN1 and the second normal input-output terminal TN2 in response to the first path selection signal PSL1. The transmitter TX in the second conversion unit 312b may connect the second input-output node ND2 of the internal circuit 20 to one of the second normal input-output terminal TN2 and the third normal input-output terminal TN3 in response to the second path selection signal PSL2. The transmitter TX in the third conversion unit 313b may connect the third input-output node ND3 of the internal circuit 20 to one of the third normal input-output terminal TN3 and the fourth normal input-output terminal TN4 in response to the third path selection signal PSL3. The transmitter TX in the fourth conversion unit 314b may connect the fourth input-output node ND4 of the internal circuit 20 to one of the fourth normal input-output terminal TN4 and the repair input-output terminal TR in response to the fourth path selection signal PSL4.

Figure 4C:
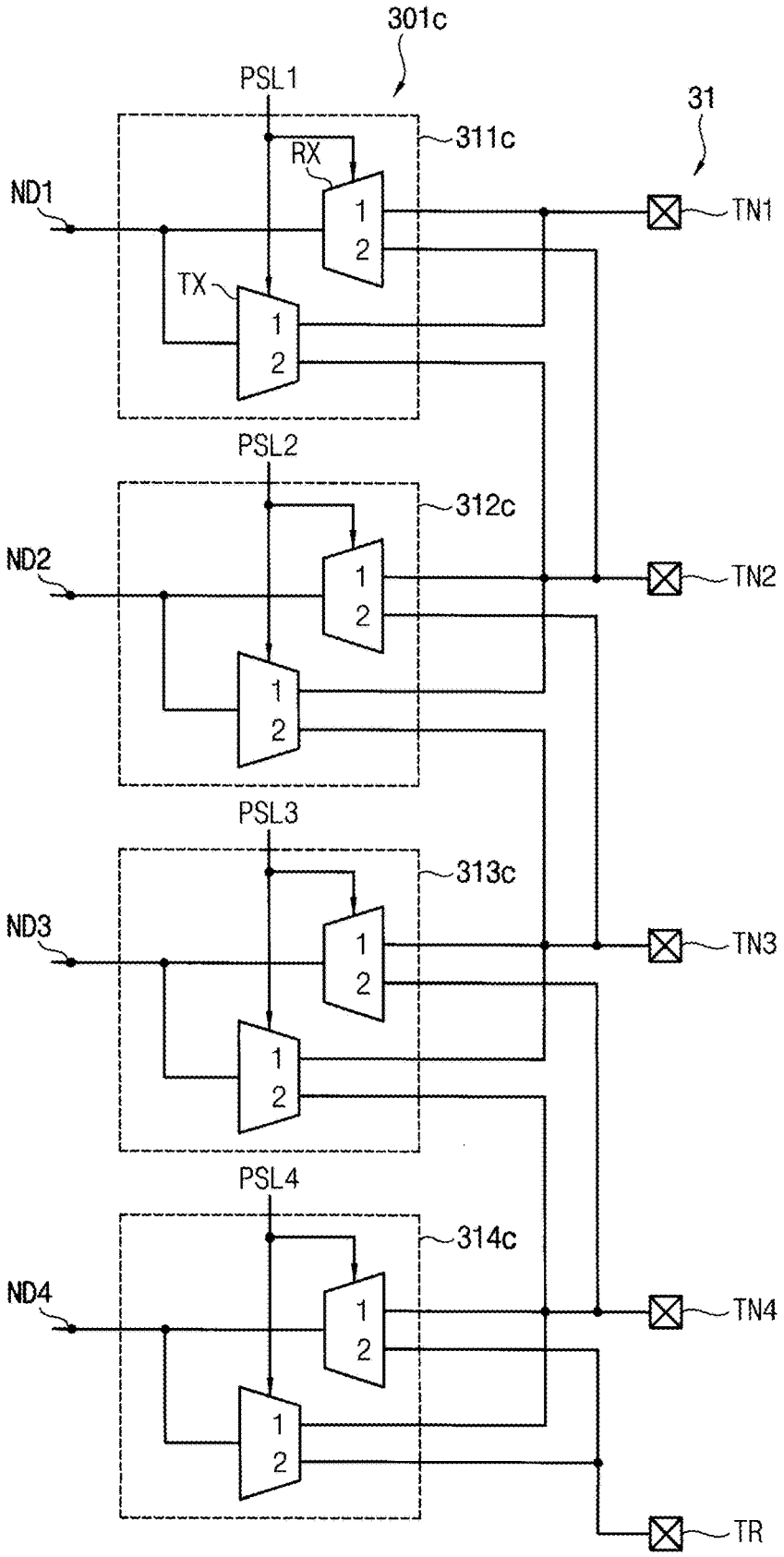
FIG. 4C is a diagram illustrating an example embodiment of a path conversion circuit performing receiving and transmitting operations with a shifting repair scheme.

FIG. 4C is a diagram illustrating an example embodiment of a path conversion circuit performing receiving and transmitting operations with a shifting repair scheme.

Referring to FIG. 4C, a path conversion circuit 301c may include a plurality of conversion units, such as conversion units 311c~314c, functioning as reception and transmission interface and each of the conversion units 311c~314c may include a receiver RX to transfer reception signals from the external device to the internal circuit 20 in FIG. 1 and a transmitter TX to transfer transmission signals from the internal circuit to the external device. As described with reference to FIG. 4A, each receiver RX may output the reception signal to each of the input-output nodes ND1~ND4 of the internal circuit 20, where the reception signal is input from one of the two or more terminals in the input-output terminal set 31 in response to each of the path selection signals ND1~ND4. As described with reference to FIG. 4B, each transmitter TX may output the transmission signal to one of the two or more terminals in the input-output terminal set 31 in response to each of the path selection signals ND1~ND4, where the transmission signal is input from each of the input-output nodes ND1~ND4 of the internal circuit 20.

Figures 5, 6:
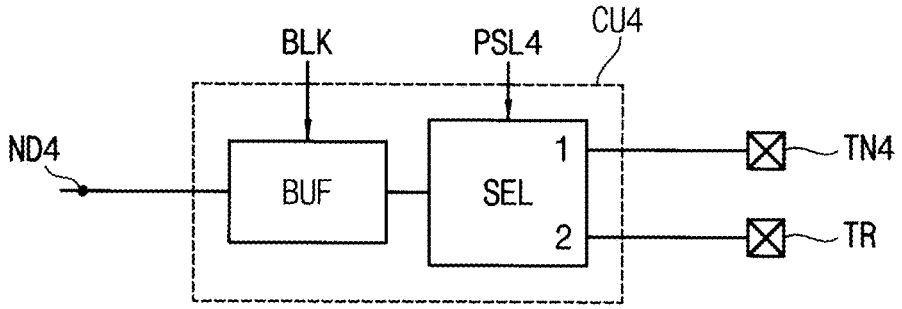
FIG. 5 is a diagram illustrating an example embodiment of a sub conversion unit included in the path conversion circuit of FIG. 3.
FIG. 6 is a diagram for describing operations of conversion units included in the path conversion unit of FIG. 3 according to some example embodiments.

FIG. 5 is a diagram illustrating an example embodiment of a sub conversion unit included in the path conversion circuit of FIG. 3.

As will be described with reference to FIG. 7, the normal input-output terminals may include a plurality of main input-output terminals to transfer main signals for a main operation of the internal circuit 20 in FIG. 1 and at least one sub input-output terminal to transfer a sub signal for a sub operation of the internal circuit. For example, in the configuration of FIG. 3, the first, second and third normal input-output terminals TN1, TN2 and TN3 may be the main input-output terminals and the fourth normal input-output terminal TN4 may be the sub input-output terminal.

Referring to FIG. 5, the fourth conversion unit CU4 corresponding to the sub input-output terminal TN4 may include at least one buffer BUF and at least one selector SEL.

The selector SEL may include the receiver RX and/or the transmitter TX as described with reference to FIGS. 4A, 4B and 4C, which control the electrical connection between the fourth input-output node ND4 of the internal circuit 20 and the fourth normal input-output terminal TN4 and the repair input-output terminal TR in the input-output terminal set 31 in response to the fourth path selection signal PSL4. The buffer BUF may block the electrical connection between the fourth input-output node ND4 and the selector SEL in response to a block control signal BLK.

For example, the block control signal BLK may be deactivated in a first logic level (e.g., a logic low level L) and the buffer BUF may electrically connect the fourth input-output node ND4 and the selector SEL when the sub signal for the sub operation is transferred. In contrast, when the sub signal for the sub operation is not transferred, the block control signal BLK may be activated in a second logic level (e.g., a logic high level H) and the buffer BUF may block the electrical connection between the fourth node ND4 and the selector SEL.

As such, the sub conversion unit CU4 corresponding to the sub input-output terminal TN4 among the conversion units CU1~CU4 may block the electrical connection between the internal circuit 20 and the sub conversion unit CU4 in response to the block control signal BLK.

FIG. 6 is a diagram for describing operations of conversion units included in the path conversion unit of FIG. 3.

Referring to FIG. 6, one of the terminals of the conversion unit CUi may be selected in response to the logic level of the corresponding path selection signal PSLi. For example, the terminal '1' may be selected and the conversion unit CUi may be connected to the corresponding normal input-output terminal TNi when the path selection signal PSLi is deactivated in a first logic level (e.g., a logic low level L), but the terminal '2' may be selected and the conversion unit CUi may be connected to the adjacent normal input-output terminal TNi+1 when the path selection signal PSLi is activated in a second logic level (e.g., a logic high level H).

As described above, in the configuration of FIG. 3, the first, second and third normal input-output terminals TN1, TN2 and TN3 may be the main input-output terminals and the fourth normal input-output terminal TN4 may be the sub input-output terminal. In this case, each of the main conversion units CUi (i=1,2,3) corresponding to the main input-output terminals TN1, TN2 and TN3 may connect the terminal '1' or the terminal '2 to the corresponding input-output node NDi of the internal circuit 20 in response to the corresponding path selection signal PSLi regardless of the block control signal BLK. As described with reference to FIG. 5, the sub conversion unit CU4 corresponding to the sub input-output terminal TN4 may block the electrical connection between the internal circuit 20 and sub conversion unit CU4 when the block control signal BLK is activated in the second logic level H. When the block control signal BLK is deactivated in the first logic level L, as the other main conversion units CU1, CU2 and CU3, the sub conversion unit CU4 may connect the terminal '1' or the terminal '2 to the fourth input-output node ND4 of the internal circuit 20 in response to the fourth path selection signal PSL4.

Hereinafter, for convenience of description, it is assumed that the terminal '1' of the conversion unit CUi is selected and the conversion unit CUi is electrically connected to the corresponding normal input-output terminal TNi when the path selection signal PSLi has the logic low level L, and the terminal '2' of the conversion unit CUi is selected and the conversion unit CUi is electrically connected to the adjacent normal input-output terminal TNi+1 when the path selection signal PSLi has the logic high level H. The logic levels of the path selection signal PSLi to select the terminals may be changed depending on the configuration of the conversion unit CUi.

The repair circuit described with reference to FIGS. 3 through 6 may perform the shifting repair operation such that the failed input-output terminal corresponding to the failed signal path among the normal input-output terminals TN1~TN4 may be replaced with the other normal input-output terminal or the repair input-output terminal which is adjacent to the failed input-output terminal. Using the repair circuit of the same configuration, the failed signal path may be repaired regardless of whether to support the repair signal path. Hereinafter, the first repair mode without supporting the repair signal path and the repair input-output terminal is described with reference to FIGS. 7, 8A and 8B, and the second repair mode supporting the repair signal path and the repair input-output terminal is described with reference to FIGS. 9, 10A and 10B.

Figure 7:
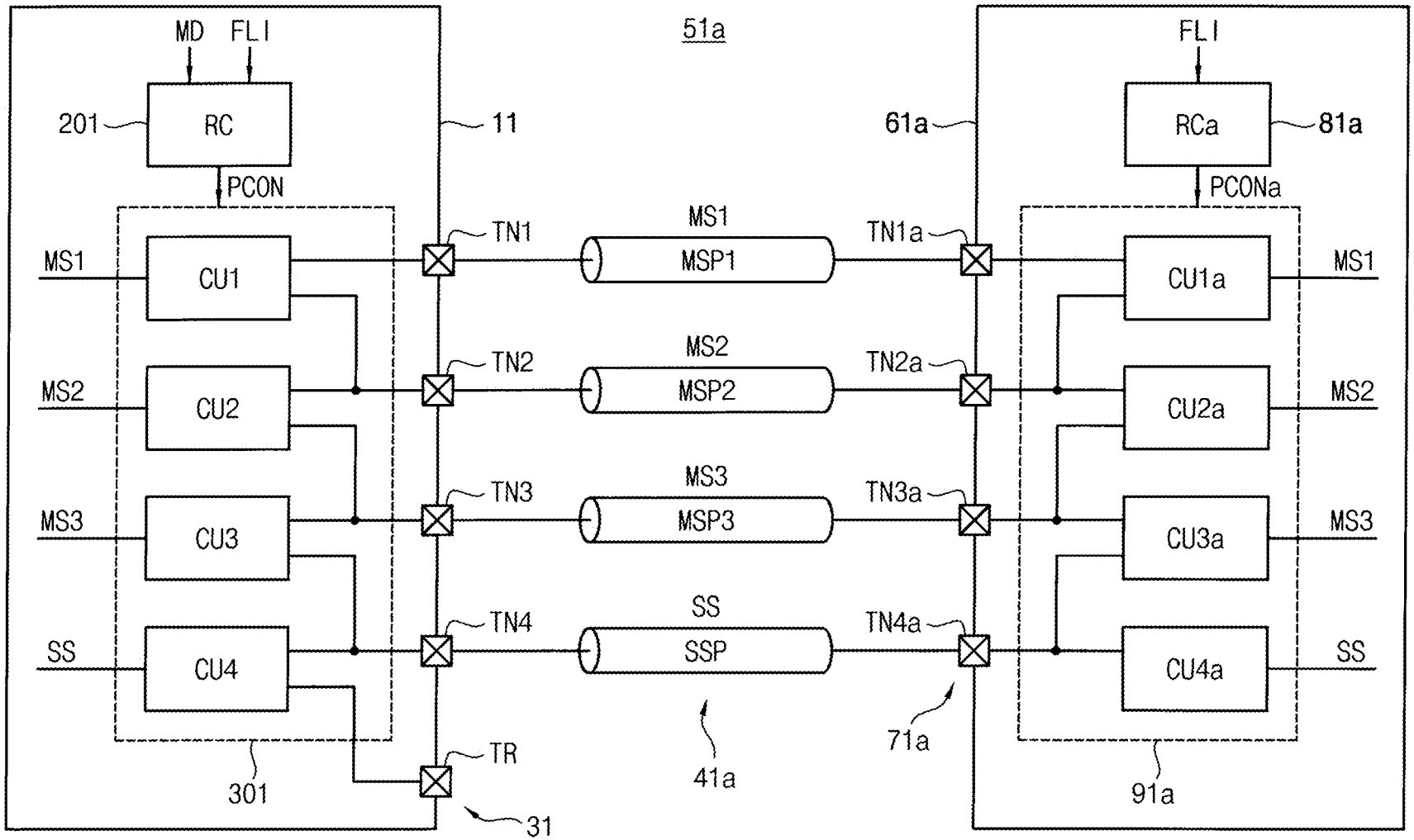
FIG. 7 is a block diagram illustrating a system including the path conversion circuit of FIG. 3 without supporting a repair signal path according to some example embodiments.

FIG. 7 is a block diagram illustrating a system including the path conversion circuit of FIG. 3 without supporting a repair signal path according to an example embodiment.

Referring to FIG. 7, a system 51a may include a first sub system 11, a second sub system 61a and a signal path set 41a connecting the first sub system 11 and the second sub system 61a.

The first sub system 11 may have a configuration capable of selectively operating in the first repair mode without using the repair input-output terminal TR or in the second repair mode using the repair input-output terminal TR. The first system 11 may include an input-output terminal set 31, a repair controller RC 201 and a path conversion circuit 301. The internal circuit of the first sub system 11 is omitted for convenience of illustration.

The input-output terminal set 31 may include a plurality of normal input-output terminals TN1~TN4 and at least one repair input-output terminal TR. The repair controller 201 may generate a path control signal PCON based on a mode signal MD and fail information signal FLI. The path conversion circuit 301 may control electrical connections between the input-output terminal set 31 and the internal circuit of the first sub system 11 in response to the path control signal PCON.

As described with reference to FIG. 3, the path conversion circuit 301 may include a plurality of conversion units, such as conversion units CU1~CU4, where each of the conversion units CU1~CU4 may control an electrical connection between each of the input-output node ND1~ND4 of the internal circuit and two or more input-output terminals in the input-output terminal set 31 in response to each of the path selection signals PSL1~PSL4.

The second sub system 61a may have a configuration that does not support the repair signal path. The second sub system 61a may include an input-output terminal set 71a, a repair controller RCa 81a and a path conversion circuit 91a. The internal circuit of the second sub system 61a is omitted for convenience of illustration.

The input-output terminal set 71a may include a plurality of normal input-output terminals, such as normal input-output terminals TN1a~TN4a, but may not include a repair input-output terminal. The repair controller 81a may generate a path control signal PCONa based on the fail information signal FLI. The path conversion circuit 91a may control electrical connections between the input-output terminal set 71a and the internal circuit of the second sub system 61a in response to the path control signal PCONa.

Similar to the path conversion circuit 301 of the first sub system 11, the path conversion circuit 91a of the second sub system 61a may include a plurality of conversion units, such as conversion units CU1a~CU4a, and each of the conversion units CU1a~CU4a may control an electrical connection between each of the input-output node of the internal circuit and two or more input-output terminals in the input-output terminal set 71a in response to each of the path selection signals. However, the input-output terminal set 71a does not include the repair input-output terminal and thus the last conversion unit CU4a may control the electrical connection between the input-output node of the internal circuit and the one input-output terminal TN4a.

Because the second sub system 61a is fixed to the configuration not to support the repair signal path, the repair controller 81a of the second sub system 61a may not receive the mode signal MD. The same fail information signal FLI may be provided to the first sub system 11 and the second sub system 61a.

The signal path set 41a may include a plurality of normal signal paths, such as MSP1, MSP2, MSP3 and SSP. The normal signal paths MSP1, MSP2, MSP3 and SSP may include first, second and third main signal paths MSP1, MSP2 and MSP3 to transfer main signals MS1, MS2 and MS3 for a main operation of the first sub system 11 and at least one sub input-output terminal SSP to transfer a sub signal SS for a sub operation of the first sub system 11. As such, the first, second and third normal input-output terminals TN1, TN2 and TN3 may be referred to as main input-output terminals and the fourth normal input-output terminal TN4 may be referred to as a sub input-output terminal. The first, second and third conversion units CU1, CU2 and CU3 may be referred to as main conversion units and the fourth conversion unit CU4 may be referred to as a sub conversion unit.

The main (or primary) operation may be an essential and/or desired operation for the own function of the sub system and the sub operation may be an optional operation that may have no effect, little effect, reduced effect, or a trivial effect on the own function of the sub system. For example, in case of a memory device, the main operation may include a read operation and a write operation and the sub operation may include operations for data bus inversion (DBI), data mask (DM), parity check, etc.

FIG. 7 illustrates a signal transfer when the normal signal paths MSP1, MSP2, MSP3 and SSP do not include the failed signal path. The repair function may be disabled when the failed signal path does not exist, the first, second and third main signals MS1, MS2 and MS3 may be transferred through the respective main signal paths MSP1, MSP2 and MSP3, and the sub signal SS may be transferred through the sub signal path SSP.

Figure 8A:
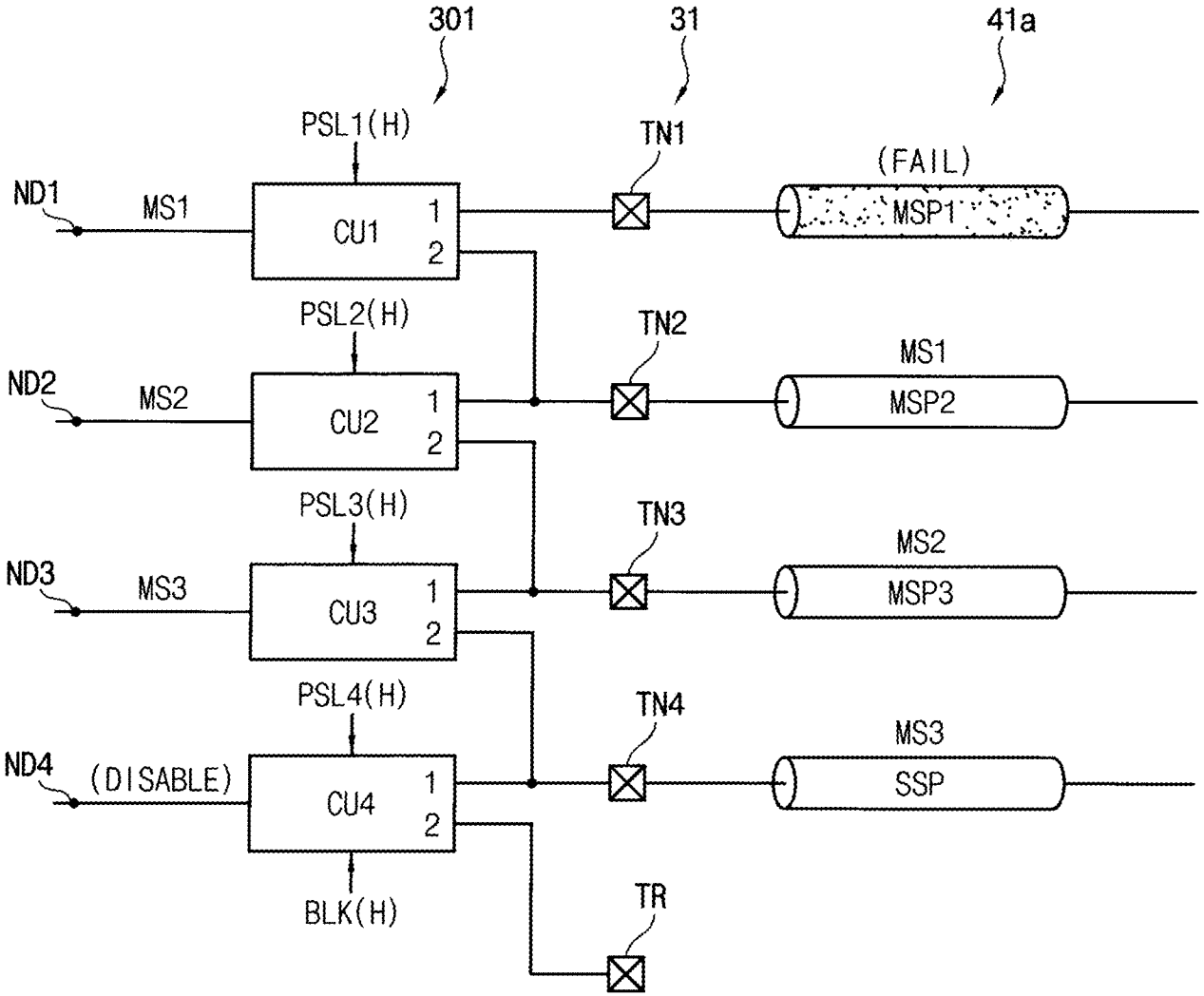
FIGS. 8A and 8B are diagrams for describing a repair operation of the system of FIG. 7 according to some example embodiments.
Figure 8B:
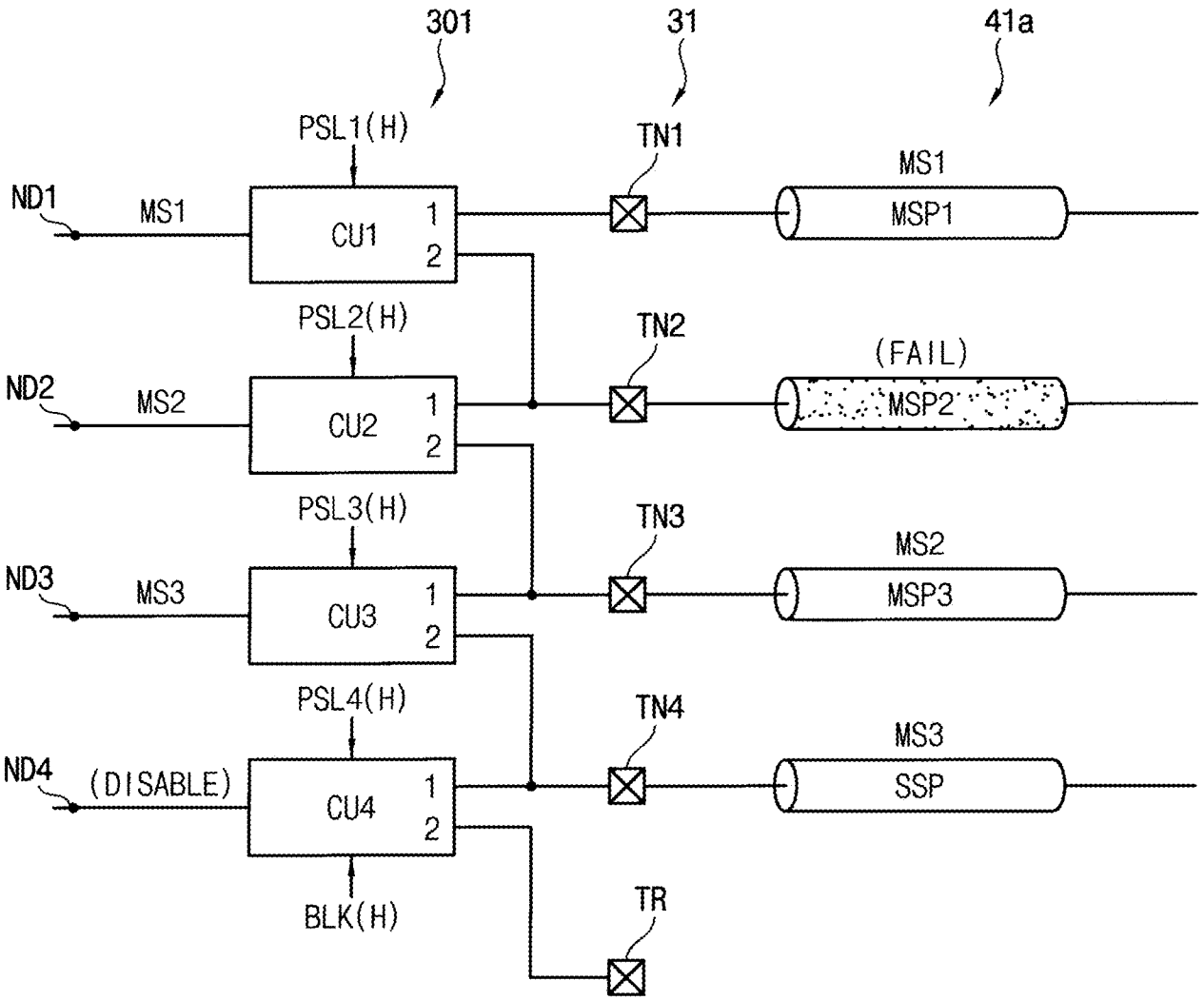

FIGS. 8A and 8B are diagrams for describing a repair operation of the system of FIG. 7 according to some example embodiments.

For example, the first main signal path MSP1 may be a failed signal path as illustrated in FIG. 8A. In this case, the first main signal MS1 may be transferred through the second main signal path MSP2, the second main signal MS2 may be transferred through the third main signal path MSP3, and the third main signal MS3 may be transferred through the sub signal path SSP. All of the first through fourth path selection signals PSL1~PSL4 may be activated in the logic high level H and thus all of the first through fourth conversion units CU1~CU4 may select the terminal '2'. As a result, the first, second and third main signals MS1, MS2 and MS3 may be transferred through the respective input-output nodes ND1, ND2 and ND3 as the case when the failed signal path does not exist.

For example, the second main signal path MSP2 may be a failed signal path as illustrated in FIG. 8B. In this case, the first main signal MS1 may be transferred through the first main signal path MSP1, the second main signal MS2 may be transferred through the third main signal path MSP3, and the third main signal MS3 may be transferred through the sub signal path SSP. The first path selection signal PSL1 may maintain the deactivated logic low level L and the first conversion unit CU1 may select the terminal '1'. The second, third and fourth path selection signals PSL2, PSL3 and PSL4 may be activated in the logic high level H and thus the second, third and fourth conversion units CU2, CU3 and CU4 may select the terminal '2'. As a result, the first, second and third main signals MS1, MS2 and MS3 may be transferred through the respective input-output nodes ND1, ND2 and ND3 as the case when the failed signal path does not exist.

As illustrated in FIGS. 8A and 8B, in the first repair mode that does not support the repair signal path, the failed signal path may be repaired using the sub signal path. The repair circuit including the path conversion circuit 301 of FIG. 3 may perform the shifting repair operation to repair the failed input-output terminal corresponding to the failed signal path among the normal input-output terminals TN1~TN4, using the sub input-output terminal TN4. The sub signal SS may not be transferred and the internal circuit 20 may quit the sub operation using the sub signal SS in the first repair mode. The block control signal BLK may be activated, for example, in the logic high level H, and the forth conversion unit CU4, that is, the sub conversion unit corresponding to the sub input-output terminal TN4 among the conversion units CU1~CU4 may block or disable the electrical connection to the fourth input-output node ND4 of the internal circuit.

Figure 9:
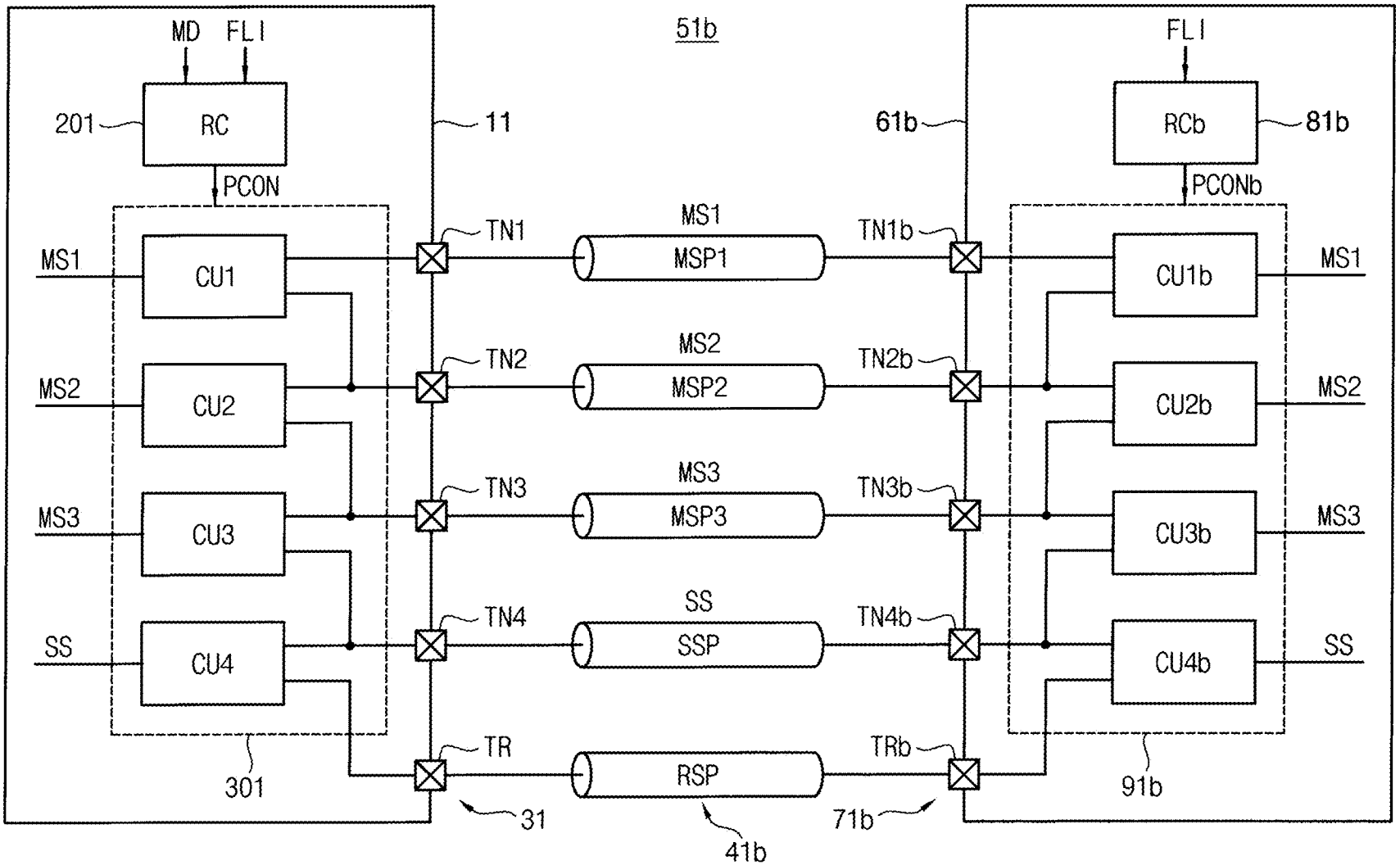
FIG. 9 is a block diagram illustrating a system including the path conversion circuit of FIG. 3 and supporting a repair signal path according to some example embodiments.

FIG. 9 is a block diagram illustrating a system including the path conversion circuit of FIG. 3 and supporting a repair signal path according to some example embodiments.

Referring to FIG. 9, a system 51b may include a first sub system 11, a second sub system 61b and a signal path set 41b connecting the first sub system 11 and the second sub system 61b.

The first sub system 11 may have a configuration capable of selectively operating in the first repair mode without using the repair input-output terminal TR or in the second repair mode using the repair input-output terminal TR. The first system 11 may include an input-output terminal set 31, a repair controller RC 201 and a path conversion circuit 301. The internal circuit of the first sub system 11 is omitted for convenience of illustration.

The input-output terminal set 31 may include a plurality of normal input-output terminals, such as normal input-output terminals TN1~TN4, and at least one repair input-output terminal TR. The repair controller 201 may generate a path control signal PCON based on a mode signal MD and fail information signal FLI. The path conversion circuit 301 may control electrical connections between the input-output terminal set 31 and the internal circuit of the first sub system 11 in response to the path control signal PCON.

As described with reference to FIG. 3, the path conversion circuit 301 may include a plurality of conversion units CU1~CU4 where each of the conversion units CU1~CU4 may control an electrical connection between each of the input-output node ND1~ND4 of the internal circuit and two or more input-output terminals in the input-output terminal set 31 in response to each of the path selection signals PSL1~PSL4.

The second sub system 61b may have a configuration that supports the repair signal path. The second sub system 61b may include an input-output terminal set 71b, a repair controller RCb 81b and a path conversion circuit 91b. The internal circuit of the second sub system 61b is omitted for convenience of illustration.

The input-output terminal set 71b may include a plurality of normal input-output terminals TN1b~TN4b and a repair input-output terminal TRb. The repair controller 81b may generate a path control signal PCONb based on the fail information signal FLI. The path conversion circuit 91b may control electrical connections between the input-output terminal set 71b and the internal circuit of the second sub system 61b in response to the path control signal PCONb.

Similar to the path conversion circuit 301 of the first sub system 11, the path conversion circuit 91b of the second sub system 61b may include a plurality of conversion units CU1b~CU4b, and each of the conversion units CU1b~CU4b may control an electrical connection between each of the input-output node of the internal circuit and two or more input-output terminals in the input-output terminal set 71b in response to each of the path selection signals.

Because the second sub system 61b is fixed to the configuration to support the repair signal path, the repair controller 81b of the second sub system 61b may not receive the mode signal MD. The same fail information signal FLI may be provided to the first sub system 11 and the second sub system 61b.

The signal path set 41b may include a plurality of normal signal paths MSP1, MSP2, MSP3 and SSP and at least one repair signal path RSP. The normal signal paths MSP1, MSP2, MSP3 and SSP may include first, second and third main signal paths MSP1, MSP2 and MSP3 to transfer main signals MS1, MS2 and MS3 for a main operation of the first sub system 11 and at least one sub input-output terminal SSP to transfer a sub signal SS for a sub operation of the first sub system 11. As such, the first, second and third normal input-output terminals TN1, TN2 and TN3 may be referred to as main input-output terminals and the fourth normal input-output terminal TN4 may be referred to as a sub input-output terminal. The first, second and third conversion units CU1, CU2 and CU3 may be referred to as main conversion units and the fourth conversion unit CU4 may be referred to as a sub conversion unit.

The main operation may be an essential and/or desired operation for the own function of the sub system and the sub operation may be an optional operation that may have no effect, little effect, reduced effect, or a trivial effect on the own function of the sub system. For example, in the case of a memory device, the main operation may include a read operation and a write operation and the sub operation may include the operations for data bus inversion (DBI), data mask (DM), parity check, etc.

FIG. 9 illustrates a signal transfer when the normal signal paths MSP1, MSP2, MSP3 and SSP do not include the failed signal path. The repair function may be disabled when the failed signal path does not exist, the first, second and third main signals MS1, MS2 and MS3 may be transferred through the respective main signal paths MSP1, MSP2 and MSP3, and the sub signal SS may be transferred through the sub signal path SSP.

Figure 10A:
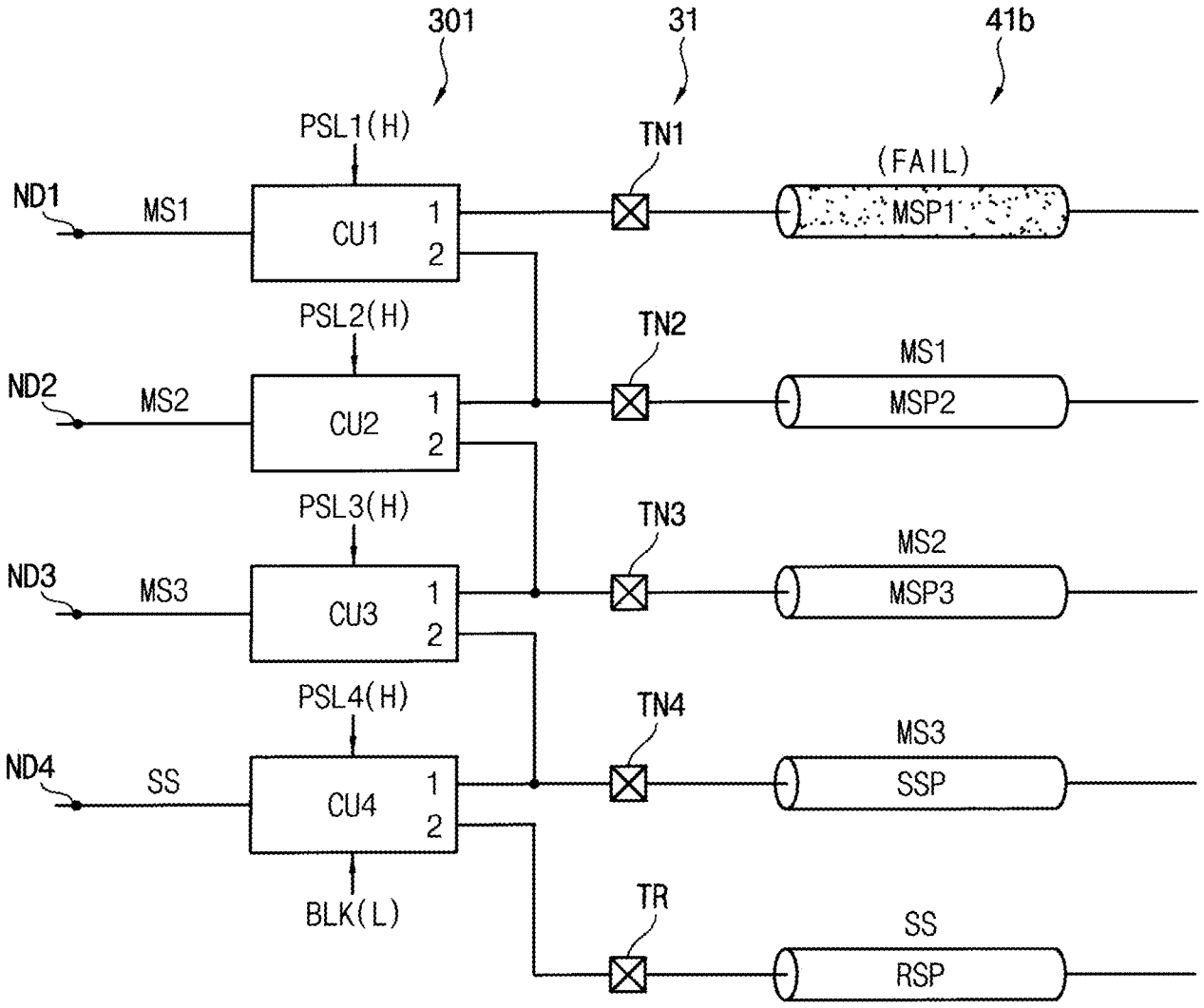
FIGS. 10A and 10B are diagrams for describing a repair operation of the system of FIG. 9 according to some example embodiments.
Figure 10B:
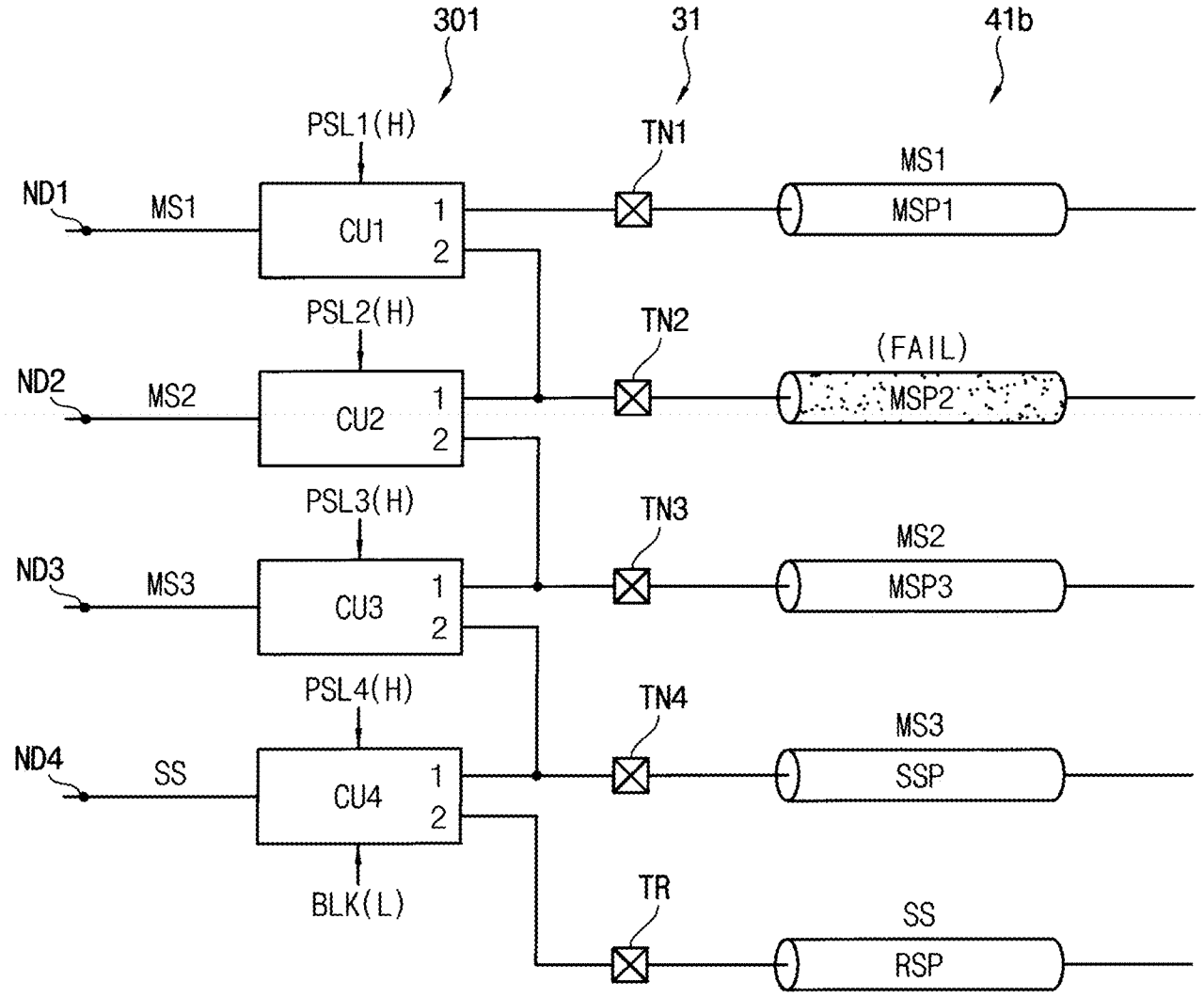

FIGS. 10A and 10B are diagrams for describing a repair operation of the system of FIG. 9 according to some example embodiments.

For example, the first main signal path MSP1 may be a failed signal path as illustrated in FIG. 10A. In this case, the first main signal MS1 may be transferred through the second main signal path MSP2, the second main signal MS2 may be transferred through the third main signal path MSP3, the third main signal MS3 may be transferred through the sub signal path SSP and the sub signal SS may be transferred through the repair signal path RSP. All of the first through fourth path selection signals PSL1~PSL4 may be activated in the logic high level H and thus all of the first through fourth conversion units CU1~CU4 may select the terminal '2'. As a result, the first, second and third main signals MS1, MS2 and MS3 and the sub signal SS may be transferred through the respective input-output nodes ND1~ND4 as the case when the failed signal path does not exist.

For example, the second main signal path MSP2 may be a failed signal path as illustrated in FIG. 10B. In this case, the first main signal MS1 may be transferred through the first main signal path MSP1, the second main signal MS2 may be transferred through the third main signal path MSP3, the third main signal MS3 may be transferred through the sub signal path SSP and the sub signal SS may be transferred through the repair signal path RSP. The first path selection signal PSL1 may maintain the deactivated logic low level L and the first conversion unit CU1 may select the terminal '1'. The second, third and fourth path selection signals PSL2, PSL3 and PSL4 may be activated in the logic high level H and thus the second, third and fourth conversion units CU2, CU3 and CU4 may select the terminal '2'. As a result, the first, second and third main signals MS1, MS2 and MS3 and the sub signal SS may be transferred through the respective input-output nodes ND1~ND4 as the case when the failed signal path does not exist.

As illustrated in FIGS. 10A and 10B, in the second repair mode that supports the repair signal path, the failed signal path may be repaired using the repair signal path. The repair circuit including the path conversion circuit 301 of FIG. 3 may perform the shifting repair operation to repair the failed input-output terminal corresponding to the failed signal path among the normal input-output terminals TN1~TN4, using the repair input-output terminal TR. The sub signal SS may be transferred and the internal circuit 20 may perform the sub operation using the sub signal SS in the second repair mode. The block control signal BLK may be deactivated, for example, in the logic low level L, and the forth conversion unit CU4, that is, the sub conversion unit corresponding to the sub input-output terminal TN4 among the conversion units CU1~CU4 may be electrically connected to the fourth input-output node ND4 of the internal circuit.

Figure 11:
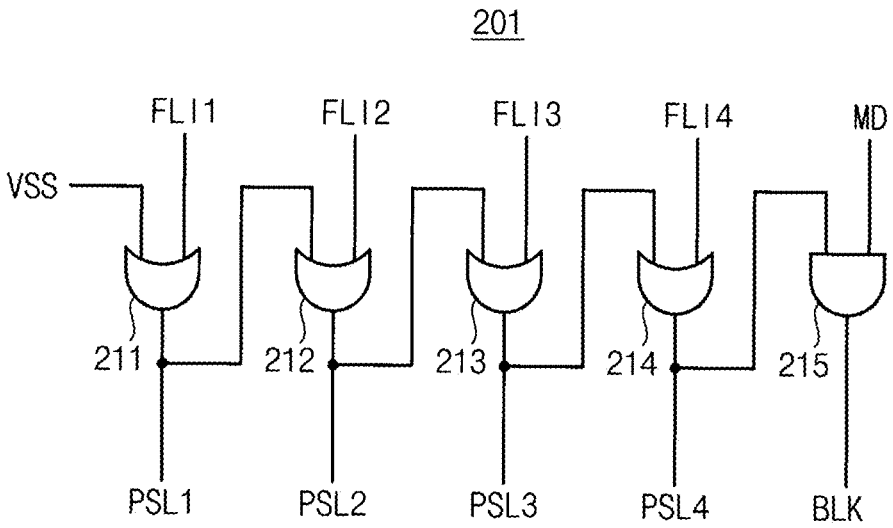
FIG. 11 is a diagram illustrating an example embodiment of a repair controller of generating path selection signals for the path conversion circuit of FIG. 3.

FIG. 11 is a diagram illustrating an example embodiment of a repair controller of generating path selection signals for the path conversion circuit of FIG. 3, and FIG. 12 is a diagram for describing an overall operation of a repair circuit including the path conversion circuit of FIG. 3 according to an example embodiment.

The fail information signal FLI may include a plurality of bit signals FLI1~FLI4 corresponding to the normal signal paths, respectively. In FIGS. 11 and 12, the logic low level L of the respective bit signals FLI1~FLI4 may represent that the corresponding normal signal path is not a failed signal path, and the logic high level H of the respective bit signals FLI1~FLI4 may represent that the corresponding normal signal path is a failed signal path. The logic low level L of the respective path selection signals PSL1~PSL4 may represent that the corresponding conversion unit selects the terminal '1', and the logic high level H of the respective path selection signals PSL1~PSL4 may represent that the corresponding conversion unit selects the terminal '2'. The logic high level H of the mode signal MD may represent the first repair mode that does not use the repair signal path, and the logic low level L of the mode signal MD may represent the second repair mode that uses the repair signal path. In FIG. 12, first through fifth cases represent the first repair mode and sixth through tenth cases represent the second repair mode. Such logic levels of the signals are non-limiting examples and the logic levels of the signals may be defined variously depending on the circuit configurations.

Referring to FIG. 11, the repair controller 201 may include a plurality of OR gates, such as first through fourth OR gates 211~214, and at least one AND gate 215. The first OR gate 211 may perform an OR logic operation on a ground voltage signal VSS and the first bit signal FLI1 of the fail information signal FLI to generate the first path selection signal PSL1. The second OR gate 212 may perform an OR logic operation on the first path selection signal PSL1 and the second bit signal FLI2 of the fail information signal FLI to generate the second path selection signal PSL2. The third OR gate 213 may perform an OR logic operation on the second path selection signal PSL2 and the third bit signal FLI3 of the fail information signal FLI to generate the third path selection signal PSL3. The fourth OR gate 214 may perform an OR logic operation on the third path selection signal PSL3 and the fourth bit signal FLI4 of the fail information signal FLI to generate the fourth path selection signal PSL4. The AND gate 215 may perform an AND logic operation on the fourth path selection signal PSL4 and the mode signal MD to generate the block control signal BLK.

Referring to FIG. 12, if the bit signal FLIi corresponding failed signal path is activated in the logic high level H, all of the corresponding path selection signal PSLi through the last path selection signal PSL4 may be activated in the logic high level, through the configuration of FIG. 11. The first through fourth path selection signals PSL1~PSL4 may be activated in the logic high level H if the first bit signal FLI1 is activated in the logic high level H. The second, third and fourth path selection signals PSL2, PSL3 and PSL4 may be activated in the logic high level H if the second bit signal FLI2 is activated in the logic high level H. The third and fourth path selection signals PSL3 and PSL4 may be activated in the logic high level H if the third bit signal FLI3 is activated in the logic high level H. Only the fourth path selection signal PSL4 may be activated in the logic high level H if the fourth bit signal FLI4 is activated in the logic high level H. Using such path selection signals PSL1~PSL4, the shifting repair operation may be performed such that the respective signal path is replaced with the adjacent signal path to repair the failed signal path.

The block control signal BLK may have the logic high level H when the mode signal MD had the logic high level H to indicate the first repair mode without using the repair signal path and when the fourth path selection signals PSL4 is activated in the logic high level H since one of the bit signals FLI1~FLI4 of the fail information signal FLI is activated in the logic high level H to indicate that the failed signal path exists.

As such, the path control signal PCON, that is, the path selection signals PSL1~PSL4 and the block control signal BLK may be generated based on the mode signal MD and the fail information signal FLI. Using the path control signal PCON, the shifting repair operation may be performed in the first repair mode that does not use the repair signal path as described with reference to FIGS. 7, 8A and 8B, and the shifting repair operation may be performed in the second repair mode that uses the repair signal path as described with reference to FIGS. 9, 10A and 10B.

Figure 13:
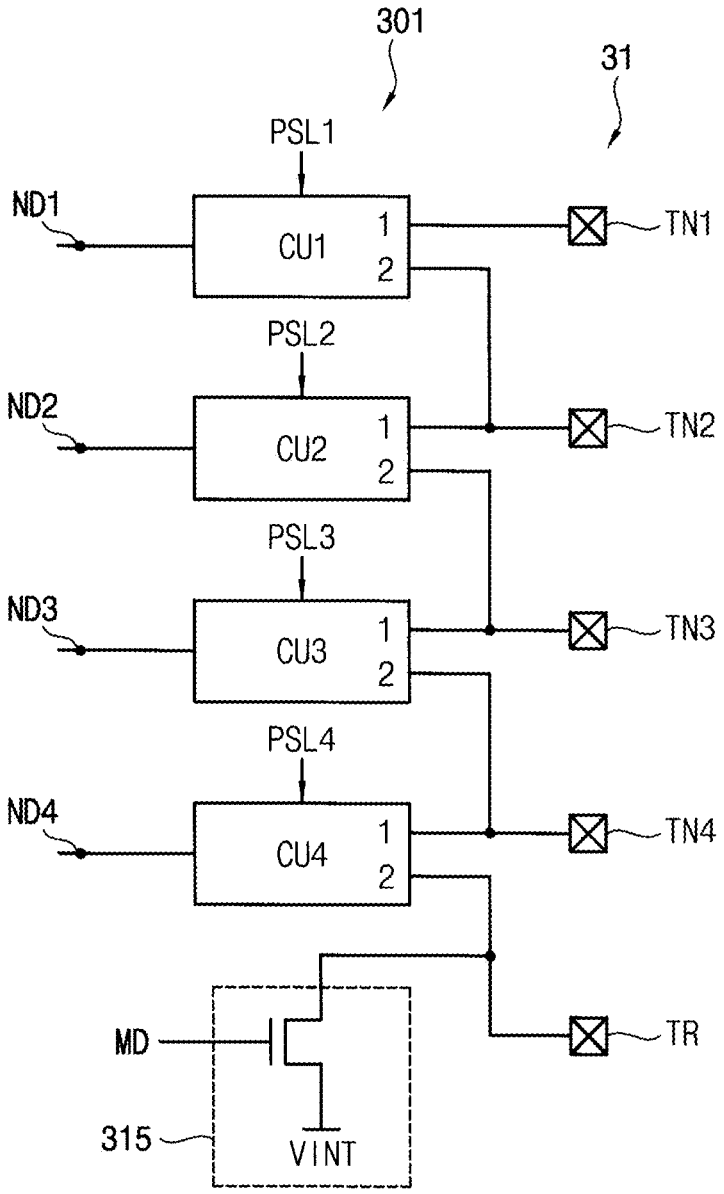
FIG. 13 is a block diagram illustrating a path conversion circuit performing a shifting repair operation according to some example embodiments.

FIG. 13 is a block diagram illustrating a path conversion circuit performing a shifting repair operation according to some example embodiments.

Referring to FIG. 13, a path conversion circuit 301 may include a plurality of conversion units, such as units CU1~CU4 and at least one initialization circuit 315.

As described above, the conversion units CU1~CU4 may perform the shifting repair operation such that each of the conversion units CU1~CU4 controls an electrical connection between each of the input-output node ND1~ND4 of the internal circuit and two or more input-output terminals in the input-output terminal set 31 in response to each of the path selection signals PSL1~PSL4.

The initialization circuit 315 may be connected to the repair input-output terminal TR and the initialization circuit 315 may apply an initialization voltage VINT to the repair input-output terminal TR in response to the mode signal MD. For example, the initialization circuit 315 may be implemented with an N-type metal oxide semiconductor (NMOS) transistor as illustrated in FIG. 13. The NMOS transistor may be turned on and the initialization voltage VINT may be applied to the repair input-output terminal TR when the mode signal MD has the logic high level H to represent the first repair mode that does not use the repair signal path and the repair input-output terminal TR. In contrast, the NMOS transistor may be turned off and the initialization voltage VINT may not be applied to the repair input-output terminal TR when the mode signal MD has the logic low level L to represent the second repair mode that uses the repair signal path and the repair input-output terminal TR.

In the conventional schemes, the systems have to be implemented independently with respect to the cases that support the repair signal path and with respect to the cases that do not support the repair signal path, due to the floating problems of the repair signal path. Using the initialization circuit controlling the initial state of the repair input-output terminal TR, the integrated device or sub system may be implemented to be applied to various repair schemes.

Figure 14:
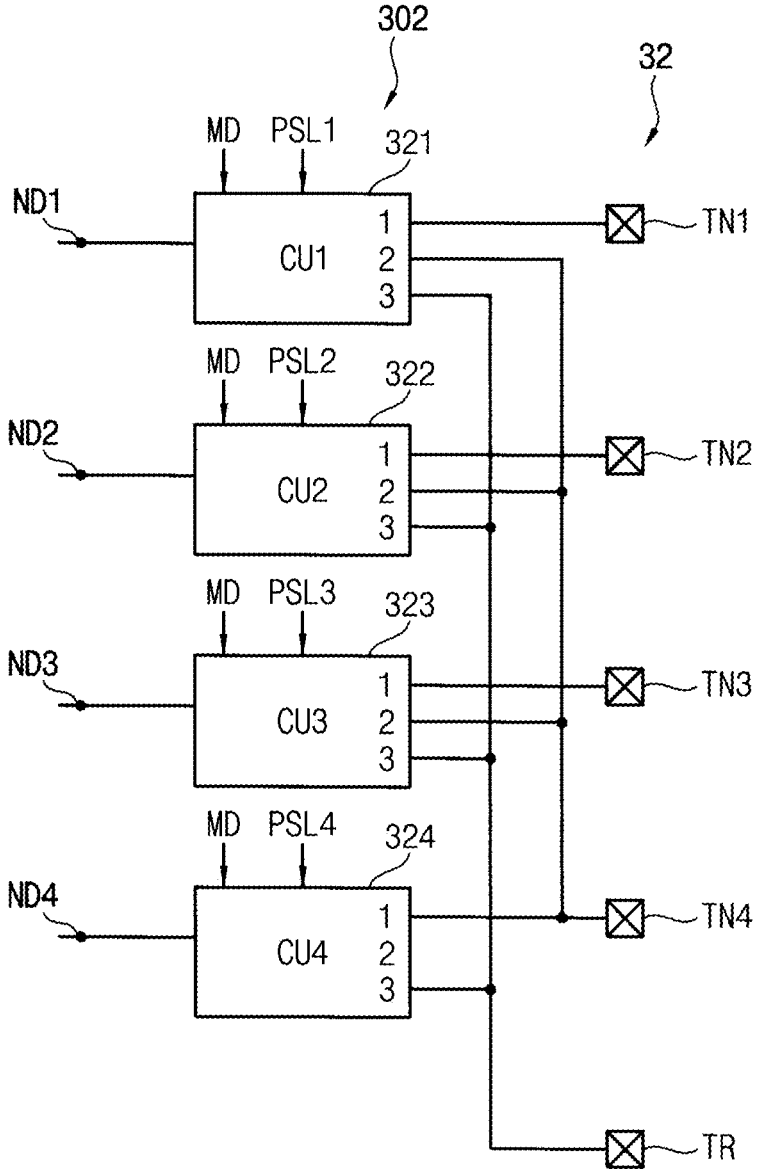
FIG. 14 is a block diagram illustrating a path conversion circuit performing a multiplexing repair operation according to some example embodiments.

FIG. 14 is a block diagram illustrating a path conversion circuit performing a multiplexing repair operation according to some example embodiments.

Referring to FIG. 14, a path conversion circuit 302 may include a plurality of conversion units, such as units CU1~CU4 321~324. Each of the conversion units 321~324 may control an electrical connection between each of the input-output node ND1~ND4 of the internal circuit and two or more input-output terminals in the input-output terminal set 32 in response to each of the path selection signals PSL1~PSL4. FIG. 14 illustrates the first through fourth conversion units 321~324 for convenience of illustration and description, but the number of the conversion units and the input-output terminals may be changed variously.

As described above with reference to FIG. 7, the normal input-output terminals TN1~TN4 may include a plurality of main input-output terminals to transfer main signals for a main (or primary) operation of the internal circuit 20 in FIG. 1 and at least one sub input-output terminal to transfer a sub signal for a sub operation of the internal circuit. For example, in the configuration of FIG. 14, the first, second and third normal input-output terminals TN1, TN2 and TN3 may be the main input-output terminals and the fourth normal input-output terminal TN4 may be the sub input-output terminal.

Each of the main conversion units 321, 322 and 323 corresponding to the main input-output terminals TN1, TN2 and TN3 among the conversion units 321-324 may be connected to a corresponding normal input-output terminal, the sub input-output terminal TN4 and the repair input-output terminal TR. In other words, the first conversion unit 321 may be connected to the first normal input-output terminal TN1, the sub input-output terminals TN4 and the repair input-output terminal TR, the second conversion unit 322 may be connected to the second normal input-output terminal TN2, the sub input-output terminals TN4 and the repair input-output terminal TR, and the third conversion unit 323 may be connected to the third normal input-output terminal TN3, the sub input-output terminals TN4 and the repair input-output terminal TR.

The sub conversion unit 324 corresponding to the sub input-output terminal TN4 among the conversion units 321~324, that is, the fourth conversion unit 324 may be connected to the sub input-output terminal TN4 and the repair input-output terminal TR.

As will be described below with reference to FIGS. 22 and 23, the repair controller 200 in FIG. 2 may control logic levels of the path selection signals PSL1~PSL4 so that the multiplexing repair operation may be performed. Each of the conversion units 321~324 may be connected selectively to one of the three input-output terminals depending on each logic level of the path selection signals PSL1~PSL4. When each path selection signal PSLi is deactivated in a first logic level (e.g., a logic low level), each conversion unit CUi may select the terminal '1' to be connected to the corresponding input-output terminal. When each path selection signal PSLi is activated in a second logic level (e.g., a logic high level), each conversion unit CUi may select the terminal '2' or the terminal '3' depending on the logic level of the mode signal MD to be connected to the sub input-output terminal TN4 and the repair input-output terminal TR.

Figure 15A:
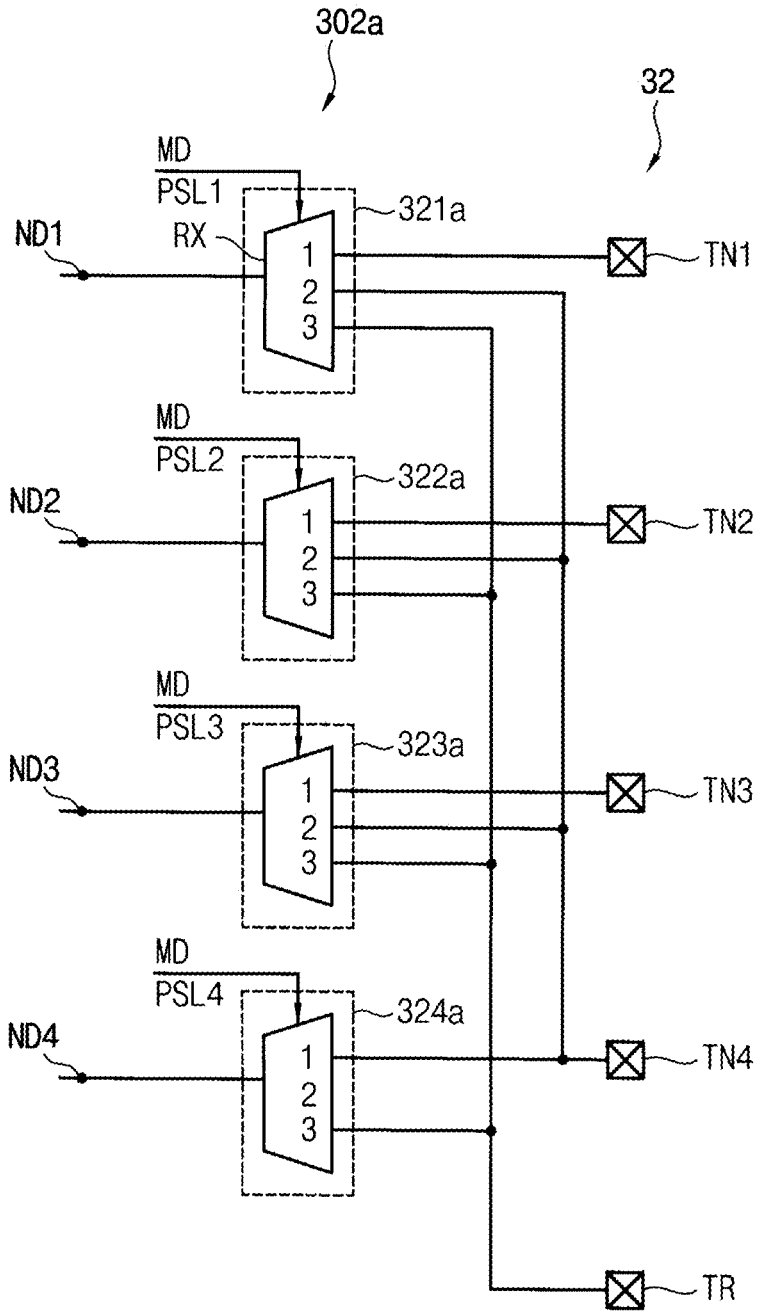
FIG. 15A is a diagram illustrating an example embodiment of a path conversion circuit performing a receiving operation with a multiplexing repair scheme.

FIG. 15A is a diagram illustrating an example embodiment of a path conversion circuit performing a receiving operation with a multiplexing repair scheme.

Referring to FIG. 15A, a path conversion circuit 302a may include a plurality of conversion units 321a~324a functioning as reception interface and each of the conversion units 321~-324a may include a receiver RX to transfer reception signals from the external device to the internal circuit 20 in FIG. 1. Each receiver RX may output the reception signal to each of the input-output nodes ND1~ND4 of the internal circuit 20, where the reception signal is input from one of the two or more terminals in the input-output terminal set 32 in response to the mode signal MD and each of the path selection signals ND1~ND4.

The receiver RX in the first conversion unit 321a may connect one of the first normal input-output terminal TN1, the fourth normal input-output terminal TN4 and the repair input-output terminal TR to the first input-output node ND1 of the internal circuit 20 in response to the mode signal MD and the first path selection signal PSL1. The receiver RX in the second conversion unit 322a may connect one of the second normal input-output terminal TN2, the fourth normal input-output terminal TN4 and the repair input-output terminal TR to the second input-output node ND2 of the internal circuit 20 in response to the mode signal MD and the second path selection signal PSL2. The receiver RX in the third conversion unit 323a may connect one of the third normal input-output terminal TN3, the fourth normal input-output terminal TN4 and the repair input-output terminal TR to the third input-output node ND3 of the internal circuit 20 in response to the mode signal MD and the third path selection signal PSL3. The receiver RX in the fourth conversion unit 324a may connect one of the fourth normal input-output terminal TN4 and the repair input-output terminal TR to the fourth input-output node ND4 of the internal circuit 20 in response to the mode signal MD and the fourth path selection signal PSL4.

Figure 15B:
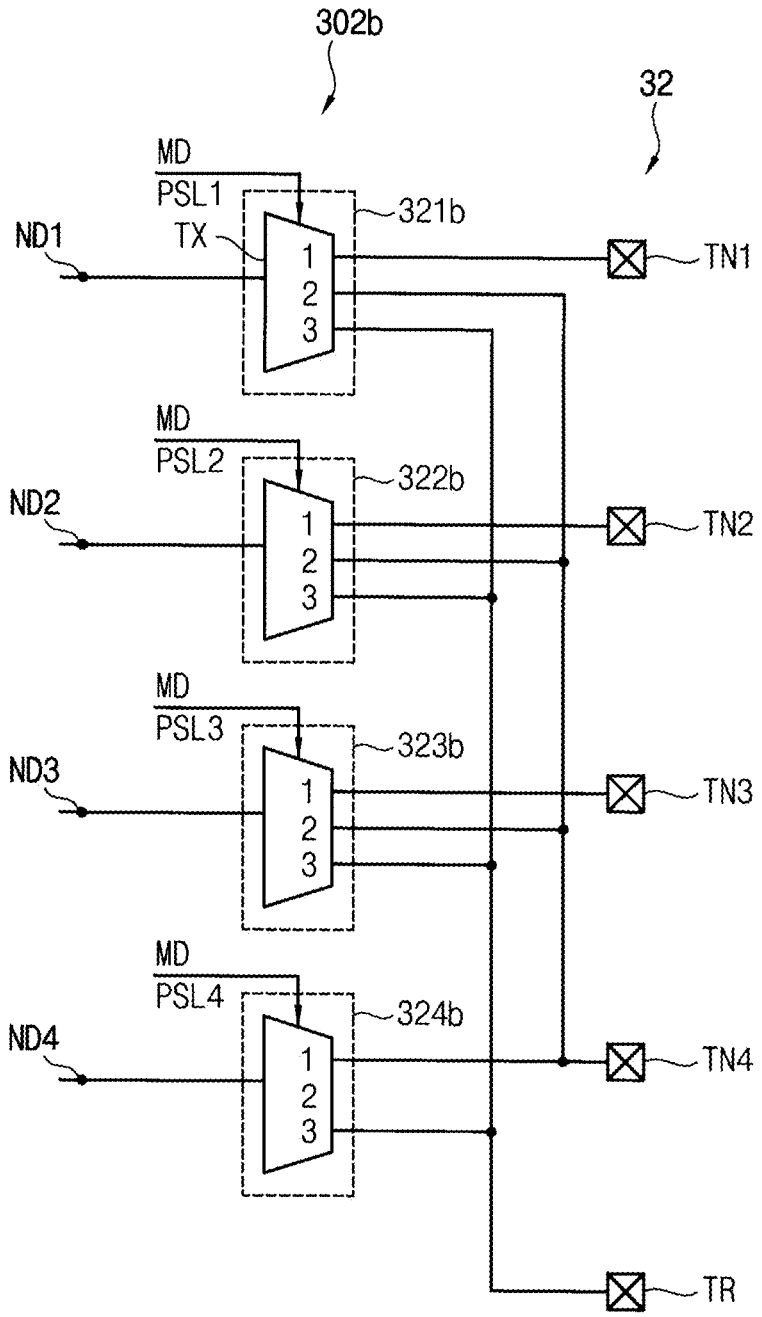
FIG. 15B is a diagram illustrating an example embodiment of a path conversion circuit performing a transmitting operation with a multiplexing repair scheme.

FIG. 15B is a diagram illustrating an example embodiment of a path conversion circuit performing a transmitting operation with a multiplexing repair scheme.

Referring to FIG. 15B, a path conversion circuit 302b may include a plurality of conversion units 321b~324b functioning as transmission interface and each of the conversion units 321b~324b may include a transmitter TX to transfer transmission signals from the internal circuit in FIG. 1 to the external device. Each transmitter TX may output the transmission signal to one of the two or more terminals in the input-output terminal set 32 in response to the mode signal MD and each of the path selection signals PSL1~PSL4, where the transmission signal is input from each of the input-output nodes ND1~ND4 of the internal circuit 20.

The transmitter TX in the first conversion unit 321b may connect the first input-output node ND1 of the internal circuit 20 to one of the first normal input-output terminal TN1, the fourth normal input-output terminal TN2 and the repair input-output terminal TR in response to the mode signal MD and the first path selection signal PSL1. The transmitter TX in the second conversion unit 322b may connect the second input-output node ND2 of the internal circuit 20 to one of the second normal input-output terminal TN2, the fourth normal input-output terminal TN2 and the repair input-output terminal TR in response to the mode signal MD and the second path selection signal PSL2. The transmitter TX in the third conversion unit 323b may connect the third input-output node ND3 of the internal circuit 20 to one of the third normal input-output terminal TN3, the fourth normal input-output terminal TN2 and the repair input-output terminal TR in response to the mode signal MD and the third path selection signal PSL3. The transmitter TX in the fourth conversion unit 324b may connect the fourth input-output node ND4 of the internal circuit 20 to one of the fourth normal input-output terminal TN4 and the repair input-output terminal TR in response to the mode signal MD and the fourth path selection signal PSL4.

Figure 15C:
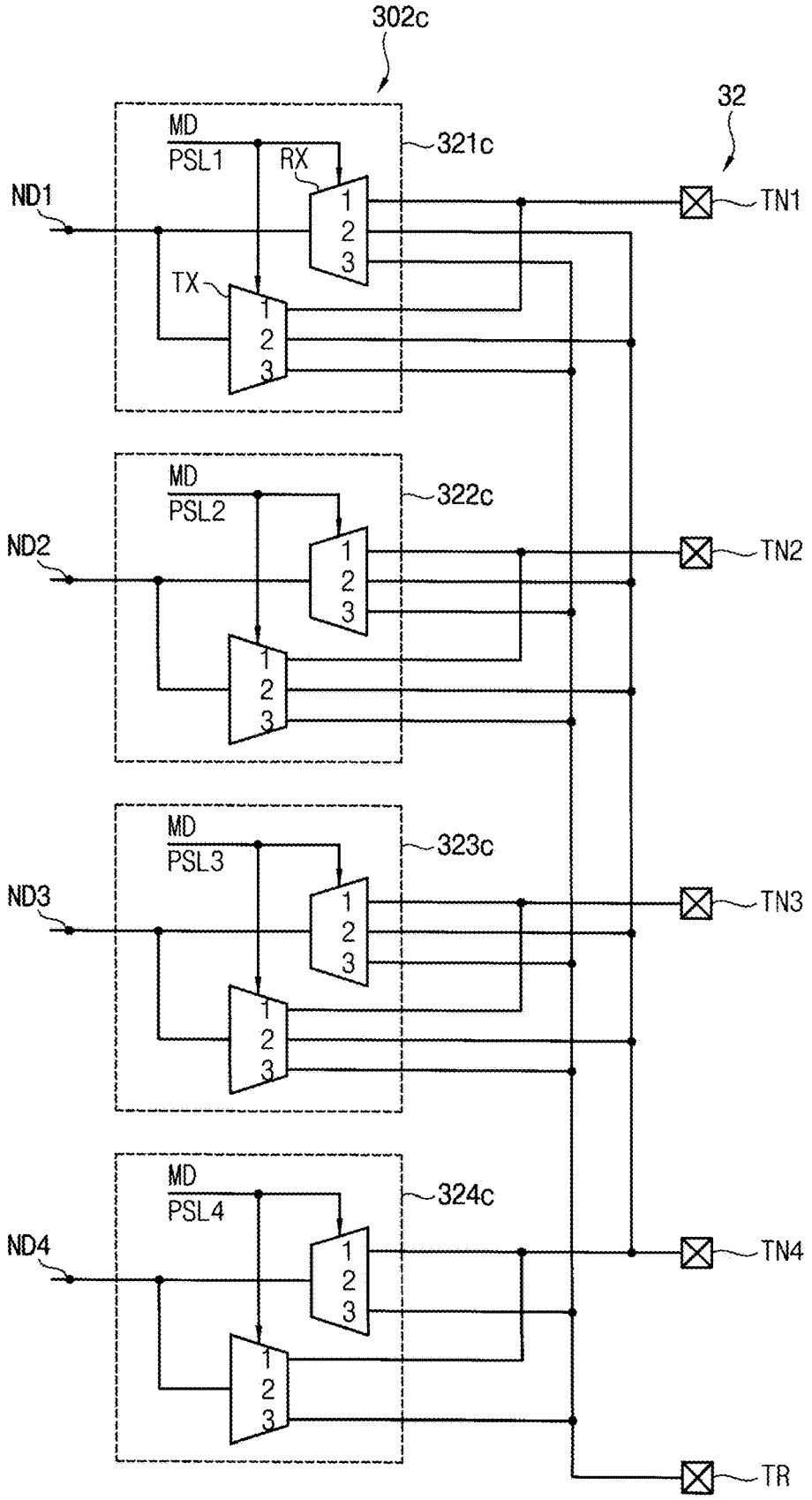
FIG. 15C is a diagram illustrating an example embodiment of a path conversion circuit performing receiving and transmitting operations with a multiplexing repair scheme.

FIG. 15C is a diagram illustrating an example embodiment of a path conversion circuit performing receiving and transmitting operations with a multiplexing repair scheme.

Referring to FIG. 15C, a path conversion circuit 302c may include a plurality of conversion units 321c~324c functioning as reception and transmission interface and each of the conversion units 321c~324c may include a receiver RX to transfer reception signals from the external device to the internal circuit 20 in FIG. 1 and a transmitter TX to transfer transmission signals from the internal circuit to the external device. As described with reference to FIG. 15A, each receiver RX may output the reception signal to each of the input-output nodes ND1~ND4 of the internal circuit 20, where the reception signal is input from one of the two or more terminals in the input-output terminal set 32 in response to the mode signal MD and each of the path selection signals ND1~ND4. As described with reference to FIG. 15B, each transmitter TX may output the transmission signal to one of the two or more terminals in the input-output terminal set 32 in response to the mode signal MD and each of the path selection signals ND1~ND4, where the transmission signal is input from each of the input-output nodes ND1~ND4 of the internal circuit 20.

Figures 16, 17:
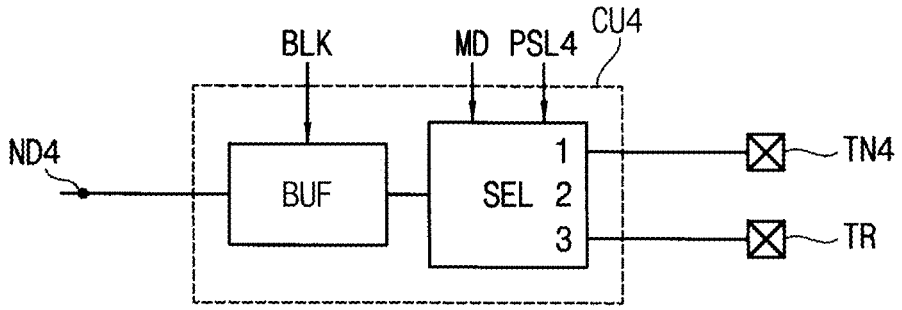
FIG. 16 is a diagram illustrating an example embodiment of a sub conversion unit included in the path conversion circuit of FIG. 14.
FIG. 17 is a diagram for describing operations of conversion units included in the path conversion unit of FIG. 14 according to some example embodiments.

FIG. 16 is a diagram illustrating an example embodiment of a sub conversion unit included in the path conversion circuit of FIG. 14.

As described above with reference to FIG. 7, the normal input-output terminals may include a plurality of main input-output terminals to transfer main signals for a main (or primary) operation of the internal circuit 20 in FIG. 1 and at least one sub input-output terminal to transfer a sub signal for a sub operation of the internal circuit. For example, in the configuration of FIG. 14, the first, second and third normal input-output terminals TN1, TN2 and TN3 may be the main input-output terminals and the fourth normal input-output terminal TN4 may be the sub input-output terminal.

Referring to FIG. 16, the fourth conversion unit CU4 corresponding to the sub input-output terminal TN4 may include a buffer BUF and a selector SEL.

The selector SEL may include the receiver RX and/or the transmitter TX as described with reference to FIGS. 15A, 15B and 15C, which control the electrical connection between the fourth input-output node ND4 of the internal circuit 20 and the fourth normal input-output terminal TN4 and the repair input-output terminal TR in the input-output terminal set 32 in response to the mode signal MD and the fourth path selection signal PSL4. The terminal '2' of the selector SEL may be in a floated sate. The buffer BUF may block the electrical connection between the fourth input-output node ND4 and the selector SEL in response to a block control signal BLK.

For example, the block control signal BLK may be deactivated in a first logic level e.g., a logic low level L) and the buffer BUF may electrically connect the fourth input-output node ND4 and the selector SEL when the sub signal for the sub operation is transferred. In contrast, when the sub signal for the sub operation is not transferred, the block control signal BLK may be activated in a second logic level (e.g., a logic high level H) and the buffer BUF may block the electrical connection between the fourth node ND4 and the selector SEL.

As such, the sub conversion unit CU4 corresponding to the sub input-output terminal TN4 among the conversion units CU1~CU4 may block the electrical connection between the internal circuit 20 and the sub conversion unit CU4 in response to the block control signal BLK.

FIG. 17 is a diagram for describing operations of conversion units included in the path conversion unit of FIG. 14.

Referring to FIG. 17, one of the terminals of the conversion unit CUi may be selected in response to the logic levels of the mode signal MD and the corresponding path selection signal PSLi. For example, the terminal '1' may be selected and the conversion unit CUi may be connected to the corresponding normal input-output terminal TNi when the path selection signal PSLi is deactivated in a first logic level (e.g., a logic low level L). The terminal '2' may be selected and the conversion unit CUi may be connected to the fourth input-output terminal TN4, that is, the sub input-output terminals when the path selection signal PSLi is activated in a second logic level (e.g., a logic high level H) and the mode signal MD has the second logic level H. The terminal '3' may be selected and the conversion unit CUi may be connected to the repair input-output terminal TR when the path selection signal PSLi is activated in the second logic level (e.g., a logic high level H) and the mode signal MD has the first logic level L.

As described above, in the configuration of FIG. 14, the first, second and third normal input-output terminals TN1, TN2 and TN3 may be the main input-output terminals and the fourth normal input-output terminal TN4 may be the sub input-output terminal. In this case, each of the main conversion units CUi (i=1,2,3) corresponding to the main input-output terminals TN1, TN2 and TN3 may connect the terminal '1', the terminal '2' or the terminal '3 to the corresponding input-output node NDi of the internal circuit 20 in response to the mode signal MD and the corresponding path selection signal PSLi regardless of the block control signal BLK. As described with reference to FIG. 16, the sub conversion unit CU4 corresponding to the sub input-output terminal TN4 may block the electrical connection between the internal circuit 20 and sub conversion unit CU4 when the block control signal BLK is activated in the second logic level H. When the block control signal BLK is deactivated in the first logic level L, as the other main conversion units CU1, CU2 and CU3, the sub conversion unit CU4 may connect the terminal '1', the terminal '2' or the terminal '3 to the fourth input-output node ND4 of the internal circuit 20 in response to the mode signal MD and the fourth path selection signal PSL4.

Hereinafter, for convenience of description, it is assumed that the terminal '1' of the conversion unit CUi is selected and the conversion unit CUi is electrically connected to the corresponding normal input-output terminal TNi when the path selection signal PSLi has the logic low level L, the terminal '2' of the conversion unit CUi is selected and the conversion unit CUi is electrically connected to the sub input-output terminal TN4 when the path selection signal PSLi has the logic high level H and the mode signal MD has the logic high level H, and the terminal '3' of the conversion unit CUi is selected and the conversion unit CUi is electrically connected to the repair input-output terminal TR when the path selection signal PSLi has the logic high level H and the mode signal MD has the logic low level L. The logic levels of the mode signal MD and the path selection signal PSLi to select the terminals may be changed depending on the configuration of the conversion unit CUi.

The repair circuit described with reference to FIGS. 14 through 17 may perform the multiplexing repair operation such that the failed input-output terminal corresponding to the failed signal path among the normal input-output terminals TN1~TN4 may be replaced with the sub input-output terminal or the repair input-output terminal. Using the repair circuit of the same configuration, the failed signal path may be repaired regardless of whether to support the repair signal path. Hereinafter, the first repair mode without supporting the repair signal path and the repair input-output terminal is described with reference to FIGS. 18, 19A and 19B, and the second repair mode supporting the repair signal path and the repair input-output terminal is described with reference to FIGS. 20, 21A and 21B.

Figure 18:
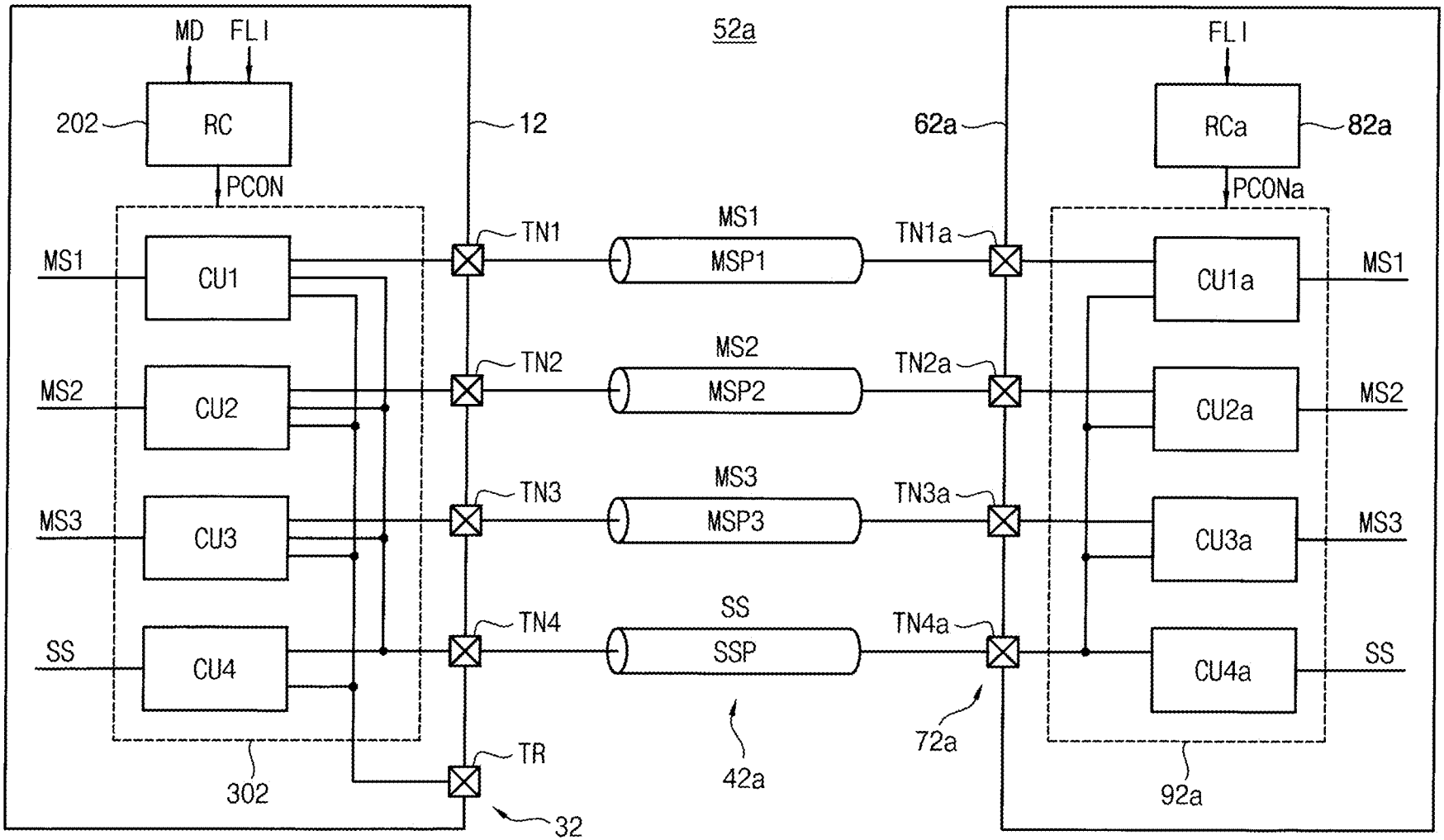
FIG. 18 is a block diagram illustrating a system including the path conversion circuit of FIG. 14 without supporting a repair signal path according to some example embodiments.

FIG. 18 is a block diagram illustrating a system including the path conversion circuit of FIG. 14 without supporting a repair signal path.

Referring to FIG. 18, a system 52a may include a first sub system 12, a second sub system 62a and a signal path set 42a connecting the first sub system 12 and the second sub system 62a The first sub system 12 may have a configuration capable of selectively operating in the first repair mode without using the repair input-output terminal TR or in the second repair mode using the repair input-output terminal TR. The first system 12 may include an input-output terminal set 32, a repair controller RC 202 and a path conversion circuit 302. The internal circuit of the first sub system 12 is omitted for convenience of illustration.

The input-output terminal set 32 may include a plurality of normal input-output terminals TN1~TN4 and at least one repair input-output terminal TR. The repair controller 202 may generate a path control signal PCON based on a mode signal MD and fail information signal FLI. The path conversion circuit 302 may control electrical connections between the input-output terminal set 32 and the internal circuit of the first sub system 12 in response to the path control signal PCON.

As described with reference to FIG. 14, the path conversion circuit 302 may include a plurality of conversion units CU1~CU4 where each of the conversion units CU1~CU4 may control an electrical connection between each of the input-output node ND1~ND4 of the internal circuit and two or more input-output terminals in the input-output terminal set 32 in response to the mode signal MD and each of the path selection signals PSL1~PSL4.

The second sub system 62a may have a configuration that does not support the repair signal path. The second sub system 62a may include an input-output terminal set 72a, a repair controller RCa 82a and a path conversion circuit 92a. The internal circuit of the second sub system 62a is omitted for convenience of illustration.

The input-output terminal set 72a may include a plurality of normal input-output terminals TN1a~TN4a but may not include a repair input-output terminal. The repair controller 82a may generate a path control signal PCONa based on the fail information signal FLI. The path conversion circuit 92a may control electrical connections between the input-output terminal set 72a and the internal circuit of the second sub system 62a in response to the path control signal PCONa.

The path conversion circuit 92a of the second sub system 62a may include a plurality of conversion units CU1a~CU4a. and each of the conversion units CU1a~CU4a may control an electrical connection between each of the input-output node of the internal circuit and two or more input-output terminals in the input-output terminal set 72a in response to each of the path selection signals. However, the input-output terminal set 72a does not include the repair input-output terminal and thus the last conversion unit CU4a may control the electrical connection between the input-output node of the internal circuit and the one input-output terminal TN4a.

Because the second sub system 62a is fixed to the configuration not to support the repair signal path, the repair controller 82a of the second sub system 62a may not receive the mode signal MD. The same fail information signal FLI may be provided to the first sub system 12 and the second sub system 62a.

The signal path set 42a may include a plurality of normal signal paths MSP1, MSP2, MSP3 and SSP. The normal signal paths MSP1, MSP2, MSP3 and SSP may include first, second and third main signal paths MSP1, MSP2 and MSP3 to transfer main signals MS1, MS2 and MS3 for a main (or primary) operation of the first sub system 12 and at least one sub input-output terminal SSP to transfer a sub signal SS for a sub operation of the first sub system 12. As such, the first, second and third normal input-output terminals TN1, TN2 and TN3 may be referred to as main input-output terminals and the fourth normal input-output terminal TN4 may be referred to as a sub input-output terminal. The first, second and third conversion units CU1, CU2 and CU3 may be referred to as main conversion units and the fourth conversion unit CU4 may be referred to as a sub conversion unit.

The main (or primary) operation may be an essential and/or desired operation for the own function of the sub system and the sub operation may be an optional operation that may have no effect, little effect, reduced effect, or a trivial effect on the own function of the sub system. For example, in case of a memory device, the main (or primary) operation may include a read operation and a write operation and the sub operation may include operations for data bus inversion (DBI), data mask (DM), parity check, etc.

FIG. 18 illustrates a signal transfer when the normal signal paths MSP1, MSP2, MSP3 and SSP do not include the failed signal path. The repair function may be disabled when the failed signal path does not exist, the first, second and third main signals MS1, MS2 and MS3 may be transferred through the respective main signal paths MSP1, MSP2 and MSP3, and the sub signal SS may be transferred through the sub signal path SSP.

Figure 19A:
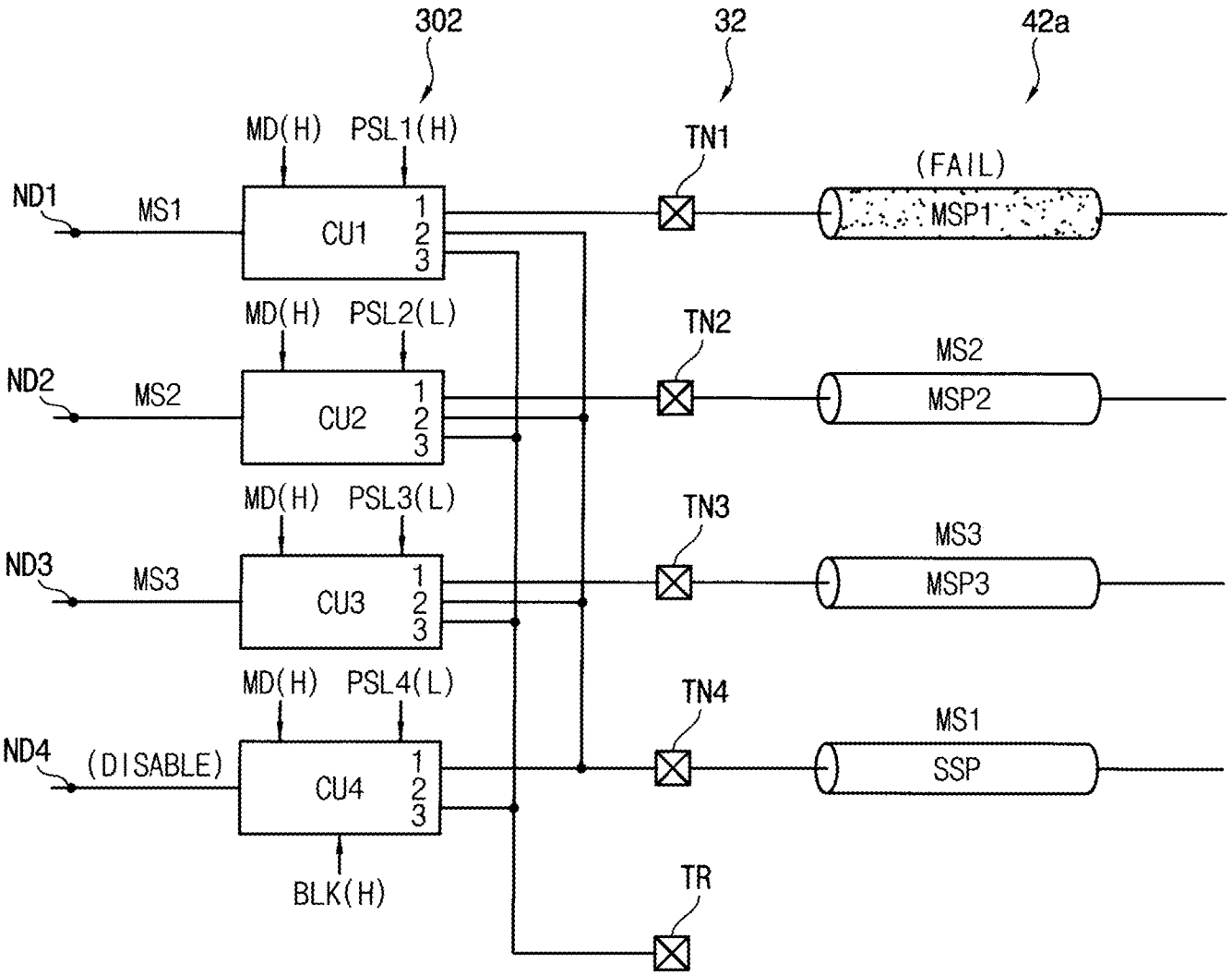
FIGS. 19A and 19B are diagrams for describing a repair operation of the system of FIG. 18 according to some example embodiments.
Figure 19B:
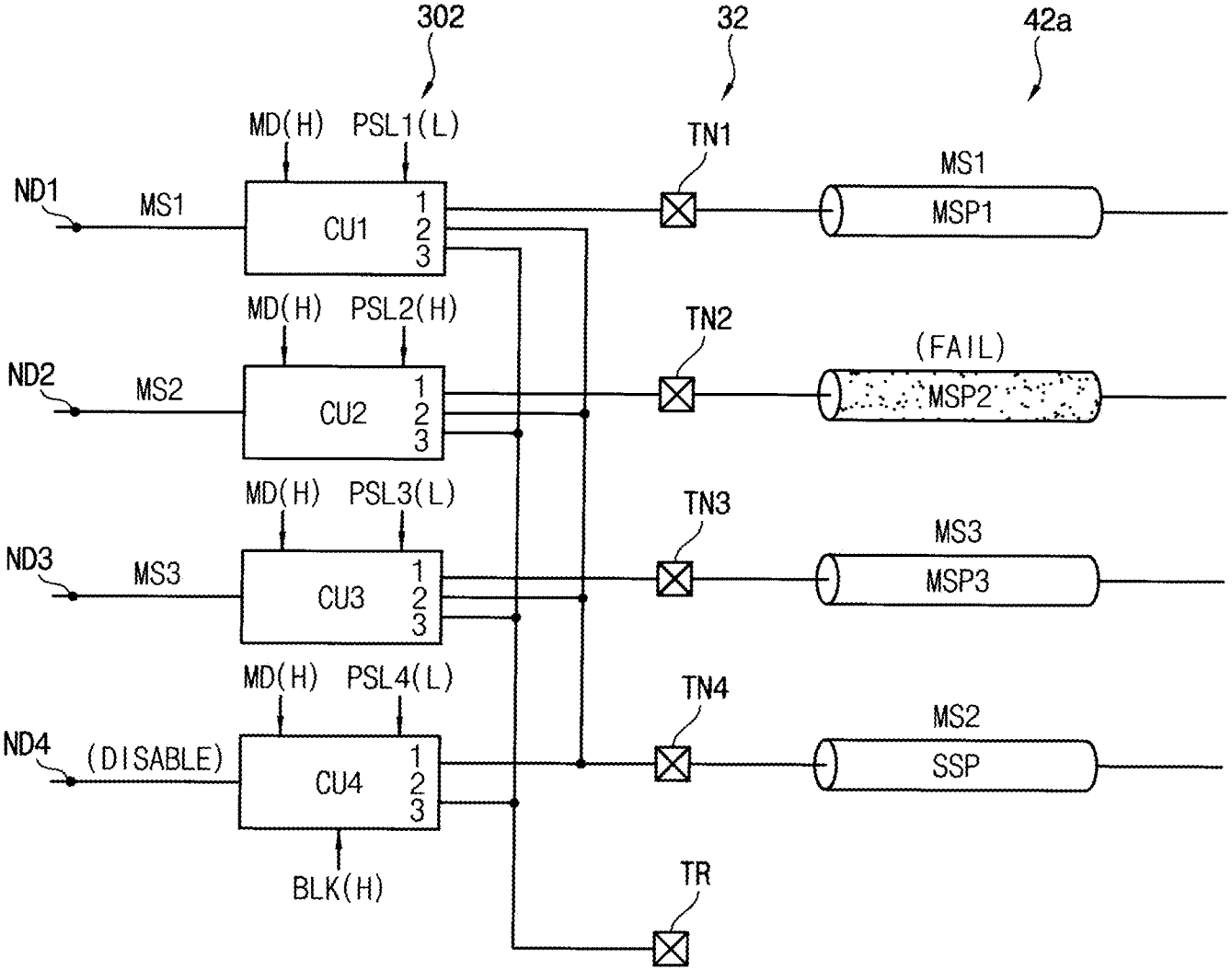

FIGS. 19A and 19B are diagrams for describing a repair operation of the system of FIG. 18.

For example, the first main signal path MSP1 may be a failed signal path as illustrated in FIG. 19A. In this case, the first main signal MS1 may be transferred through the sub signal path SSP, the second main signal MS2 may be transferred through the second main signal path MSP2, and the third main signal MS3 may be transferred through the third main signal path MSP3. The mode signal MD may have the logic high level H to represent the first repair mode that does not use the repair signal path. The first path selection signal PSL1 may be activated in the logic high level H and thus the first conversion unit CU1 may select the terminal '2'. The second, third and fourth path selection signals PSL2, PSL3 and SL4 may maintain the deactivated logic low level L and thus the second, third and fourth conversion units CU2, CU3 and CU4 may select the terminal '1'. As a result, the first, second and third main signals MS1, MS2 and MS3 may be transferred through the respective input-output nodes ND1, ND2 and ND3 as the case when the failed signal path does not exist.

For example, the second main signal path MSP2 may be a failed signal path as illustrated in FIG. 19B. In this case, the first main signal MS1 may be transferred through the first main signal path MSP1, the second main signal MS2 may be transferred through the sub signal path SSP, and the third main signal MS3 may be transferred through the third main signal path MSP3. The mode signal MD may have the logic high level H to represent the first repair mode that does not use the repair signal path. The second path selection signal PSL2 may be activated in the logic high level H and thus the second conversion unit CU2 may select the terminal '2'. The first, third and fourth path selection signals PSL1, PSL3 and PSL4 may maintain the deactivated logic low level L and the first, third and fourth conversion units CU1, CU3 and CU4 may select the terminal '1'. As a result, the first, second and third main signals MS1, MS2 and MS3 may be transferred through the respective input-output nodes ND1, ND2 and ND3 as the case when the failed signal path does not exist.

As illustrated in FIGS. 19A and 19B, in the first repair mode that does not support the repair signal path, the failed signal path may be repaired using the sub signal path. The repair circuit including the path conversion circuit 302 of FIG. 14 may perform the multiplexing repair operation to repair the failed input-output terminal corresponding to the failed signal path among the normal input-output terminals TN1~TN4, using the sub input-output terminal TN4. The sub signal SS may not be transferred and the internal circuit 20 may quit the sub operation using the sub signal SS in the first repair mode. The block control signal BLK may be activated, for example, in the logic high level H, and the forth conversion unit CU4, that is, the sub conversion unit corresponding to the sub input-output terminal TN4 among the conversion units CU1~CU4 may block or disable the electrical connection to the fourth input-output node ND4 of the internal circuit.

Figure 20:
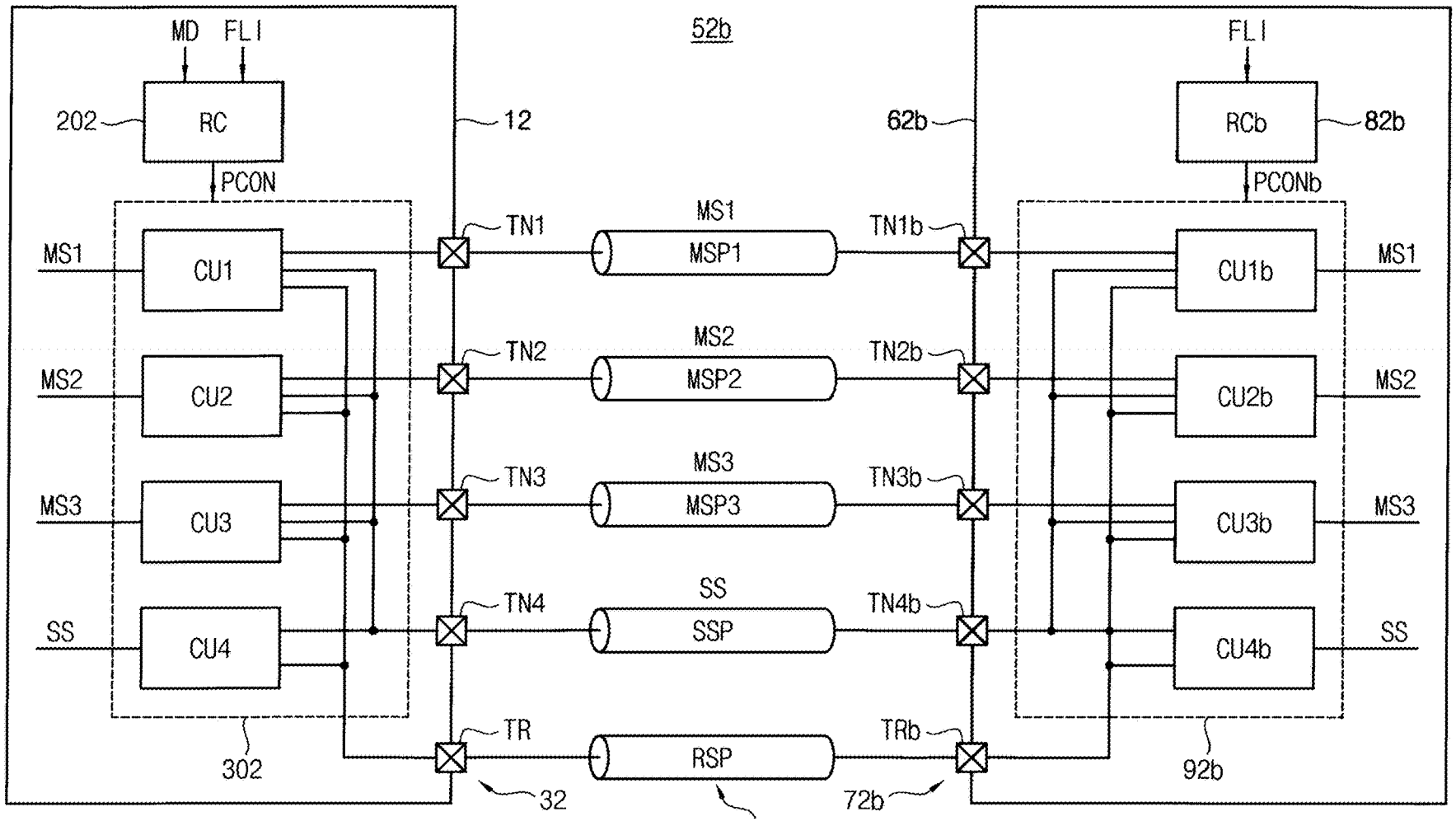
FIG. 20 is a block diagram illustrating a system including the path conversion circuit of FIG. 14 and supporting a repair signal path according to some example embodiments.

FIG. 20 is a block diagram illustrating a system including the path conversion circuit of FIG. 14 and supporting a repair signal path.

Referring to FIG. 20, a system 52b may include a first sub system 12, a second sub system 62b and a signal path set 42b connecting the first sub system 12 and the second sub system 62b The first sub system 12 may have a configuration capable of selectively operating in the first repair mode without using the repair input-output terminal TR or in the second repair mode using the repair input-output terminal TR. The first system 12 may include an input-output terminal set 32, a repair controller RC 202 and a path conversion circuit 302. The internal circuit of the first sub system 12 is omitted for convenience of illustration.

The input-output terminal set 32 may include a plurality of normal input-output terminals TN1~TN4 and at least one repair input-output terminal TR. The repair controller 202 may generate a path control signal PCON based on a mode signal MD and fail information signal FLI. The path conversion circuit 302 may control electrical connections between the input-output terminal set 32 and the internal circuit of the first sub system 12 in response to the path control signal PCON.

As described with reference to FIG. 14, the path conversion circuit 302 may include a plurality of conversion units CU1~CU4 where each of the conversion units CU1~CU4 may control an electrical connection between each of the input-output node ND1~ND4 of the internal circuit and two or more input-output terminals in the input-output terminal set 32 in response to the mode signal MD and each of the path selection signals PSL1~PSL4.

The second sub system 62b may have a configuration that supports the repair signal path. The second sub system 62b may include an input-output terminal set 72b, a repair controller RCb 82b and a path conversion circuit 92b. The internal circuit of the second sub system 62b is omitted for convenience of illustration.

The input-output terminal set 72b may include a plurality of normal input-output terminals TN1a~TN4a and a repair input-output terminal TRb. The repair controller 82b may generate a path control signal PCONb based on the fail information signal FLI. The path conversion circuit 92b may control electrical connections between the input-output terminal set 72b and the internal circuit of the second sub system 62b in response to the path control signal PCONb.

Similar to the path conversion circuit 302 of the first sub system 12, the path conversion circuit 92b of the second sub system 62b may include a plurality of conversion units CU1b~CU4b, and each of the conversion units CU1b~CU4b may control an electrical connection between each of the input-output node of the internal circuit and two or more input-output terminals in the input-output terminal set 72b in response to each of the path selection signals.

Because the second sub system 62b is fixed to the configuration to support the repair signal path, the repair controller 82b of the second sub system 62b may not receive the mode signal MD. The same fail information signal FLI may be provided to the first sub system 12 and the second sub system 62b.

The signal path set 42b may include a plurality of normal signal paths MSP1, MSP2, MSP3 and SSP and at least one repair signal path RSP. The normal signal paths MSP1, MSP2, MSP3 and SSP may include first, second and third main signal paths MSP1, MSP2 and MSP3 to transfer main signals MS1, MS2 and MS3 for a main (or primary) operation of the first sub system 12 and at least one sub input-output terminal SSP to transfer a sub signal SS for a sub operation of the first sub system 12. As such, the first, second and third normal input-output terminals TN1, TN2 and TN3 may be referred to as main input-output terminals and the fourth normal input-output terminal TN4 may be referred to as a sub input-output terminal. The first, second and third conversion units CU1, CU2 and CU3 may be referred to as main conversion units and the fourth conversion unit CU4 may be referred to as a sub conversion unit.

The main (or primary) operation may be an essential and/or desired operation for the own function of the sub system and the sub operation may be an optional operation that may have no effect, little effect, reduced effect, or a trivial effect on the own function of the sub system. For example, in case of a memory device, the main operation may include a read operation and a write operation and the sub operation may include the operations for data bus inversion (DBI), data mask (DM), parity check, etc.

FIG. 20 illustrates a signal transfer when the normal signal paths MSP1, MSP2, MSP3 and SSP do not include the failed signal path. The repair function may be disabled when the failed signal path does not exist, the first, second and third main signals MS1, MS2 and MS3 may be transferred through the respective main signal paths MSP1, MSP2 and MSP3, and the sub signal SS may be transferred through the sub signal path SSP.

Figure 21A:
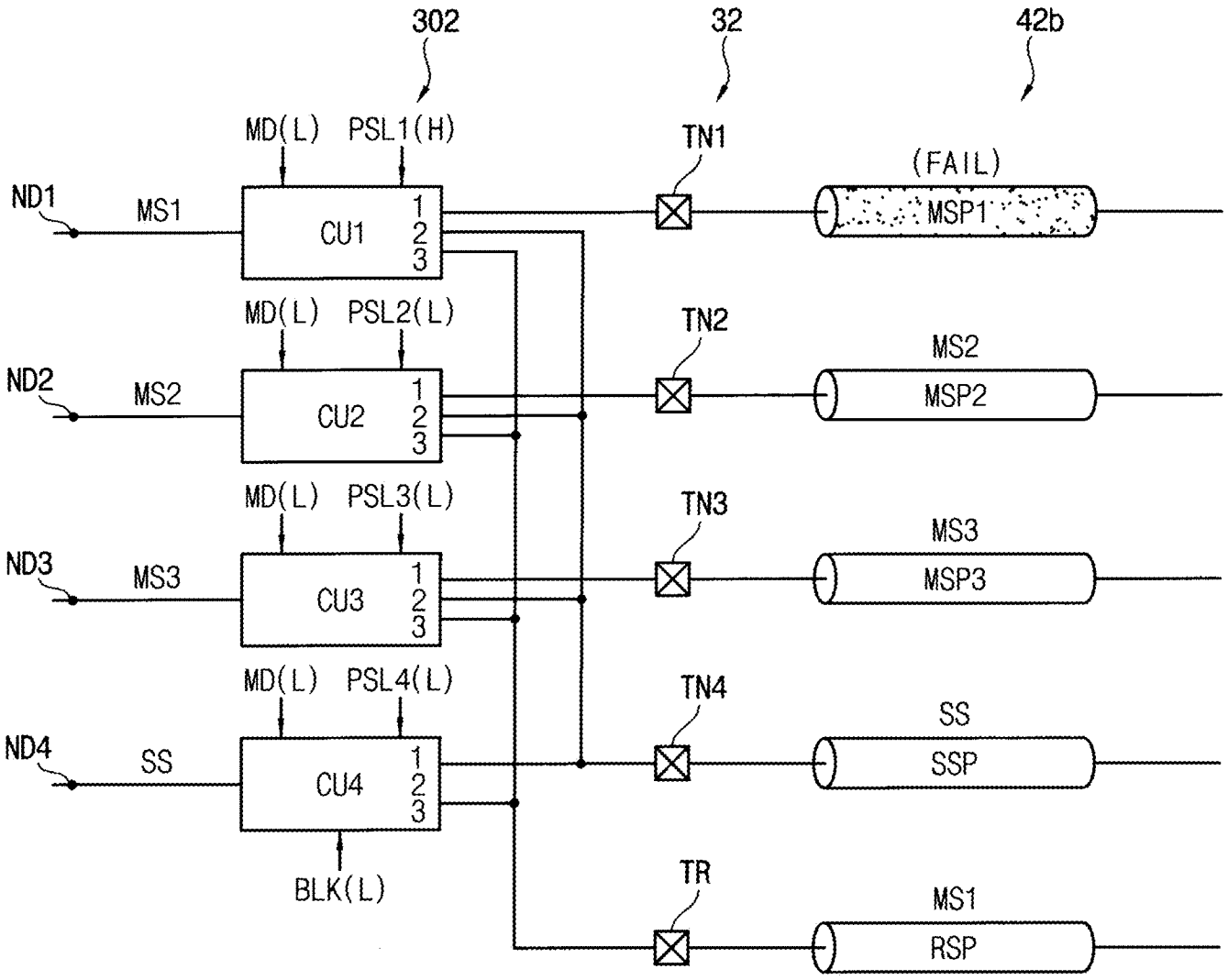
FIGS. 21A and 21B are diagrams for describing a repair operation of the system of FIG. 20 according to some example embodiments.
Figure 21B:
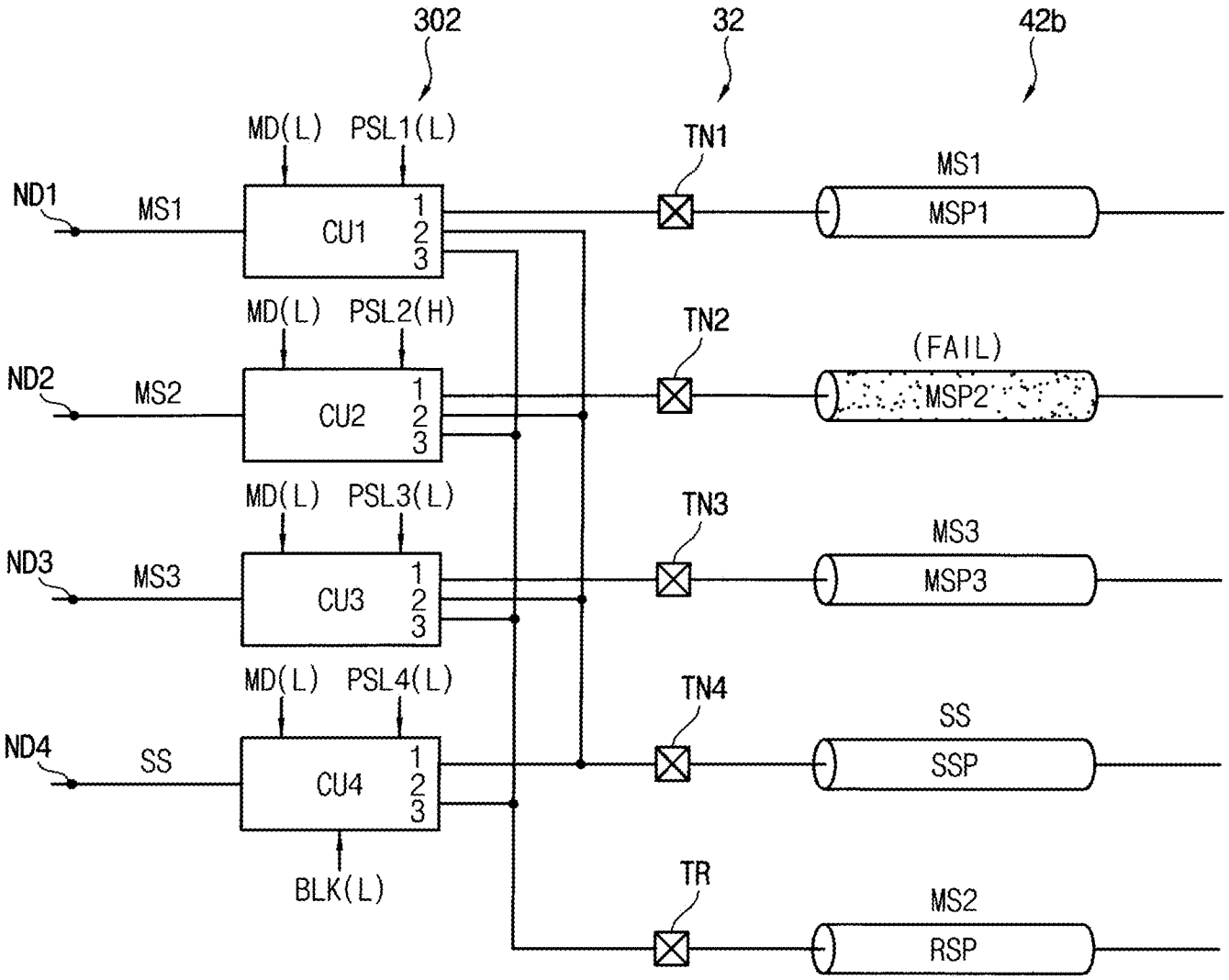

FIGS. 21A and 21B are diagrams for describing a repair operation of the system of FIG. 20.

For example, the first main signal path MSP1 may be a failed signal path as illustrated in FIG. 21A. In this case, the first main signal MS1 may be transferred through the repair signal path RSP, the second main signal MS2 may be transferred through the second main signal path MSP2, the third main signal MS3 may be transferred through the third main signal path MSP3 and the sub signal SS may be transferred through the sub signal path SSP. The mode signal MD may have the logic low level L to represent the second repair mode that uses the repair signal path. The first path selection signal PSL1 may be activated in the logic high level H and thus the first conversion unit CU1 may select the terminal '3'. The second, third and fourth path selection signals PSL2, PSL3 and PSL4 may maintain the deactivated logic low level L and thus the second, third and fourth conversion units CU2, CU3 and CU4 may select the terminal '1'. As a result, the first, second and third main signals MS1, MS2 and MS3 and the sub signal SS may be transferred through the respective input-output nodes ND1~ND4 as the case when the failed signal path does not exist.

For example, the second main signal path MSP2 may be a failed signal path as illustrated in FIG. 21B. In this case, the first main signal MS1 may be transferred through the first main signal path MSP1, the second main signal MS2 may be transferred through the repair signal path RSP, the third main signal MS3 may be transferred through the third main signal path MSP3 and the sub signal SS may be transferred through the sub signal path SSP. The mode signal MD may have the logic low level L to represent the second repair mode that uses the repair signal path. The second path selection signal PSL2 may be activated in the logic high level H and thus the second conversion unit CU2 may select the terminal '3'. The first, third and fourth path selection signals PSL1, PSL3 and PSL4 may maintain the deactivated logic low level L and thus the second, third and fourth conversion units CU1, CU3 and CU4 may select the terminal '1'. As a result, the first, second and third main signals MS1, MS2 and MS3 and the sub signal SS may be transferred through the respective input-output nodes ND1~ND4 as the case when the failed signal path does not exist.

As illustrated in FIGS. 21A and 21B, in the second repair mode that supports the repair signal path, the failed signal path may be repaired using the repair signal path. The repair circuit including the path conversion circuit 302 of FIG. 3 may perform the multiplexing repair operation to repair the failed input-output terminal corresponding to the failed signal path among the normal input-output terminals TN1~TN4, using the repair input-output terminal TR. The sub signal SS may be transferred and the internal circuit 20 may perform the sub operation using the sub signal SS in the second repair mode. The block control signal BLK may be deactivated, for example, in the logic low level L, and the forth conversion unit CU4, that is, the sub conversion unit corresponding to the sub input-output terminal TN4 among the conversion units CU1~CU4 may be electrically connected to the fourth input-output node ND4 of the internal circuit.

Figure 22:
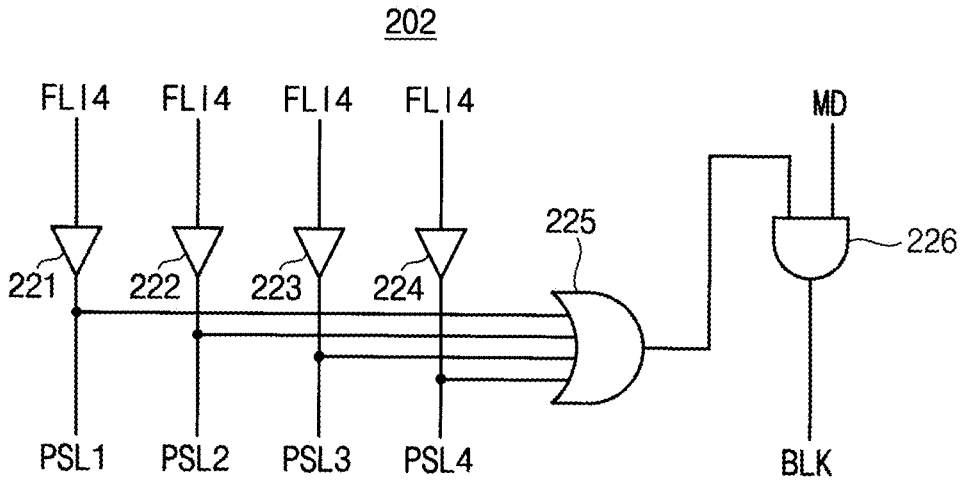
FIG. 22 is a diagram illustrating an example embodiment of a repair controller of generating path selection signals for the path conversion circuit of FIG. 14.

FIG. 22 is a diagram illustrating an example embodiment of a repair controller of generating path selection signals for the path conversion circuit of FIG. 14, and FIG. 23 is a diagram for describing an overall operation of a repair circuit including the path conversion circuit of FIG. 14.

The fail information signal FLI may include a plurality of bit signals FLI1~FLI4 corresponding to the normal signal paths, respectively. In FIGS. 22 and 23, the logic low level L of the respective bit signals FLI1~FLI4 may represent that the corresponding normal signal path is not a failed signal path, and the logic high level H of the respective bit signals FLI1~FLI4 may represent that the corresponding normal signal path is a failed signal path. The logic low level L of the respective path selection signals PSL1~PSL4 may represent that the corresponding conversion unit selects the terminal '1', and the logic high level H of the respective path selection signals PSL1~PSL4 may represent that the corresponding conversion unit selects the terminal '2' or the terminal '3 depending on the logic level of the mode signal MD. The logic high level H of the mode signal MD may represent the first repair mode that does not use the repair signal path, and the logic low level L of the mode signal MD may represent the second repair mode that uses the repair signal path. In FIG. 23, first through fifth cases represent the first repair mode and sixth through tenth cases represent the second repair mode. Such logic levels of the signals are non-limiting examples and the logic levels of the signals may be defined variously depending on the circuit configurations.

Referring to FIG. 22, the repair controller 202 may include firs through fourth buffers 221~224, an OR gate 225 and an AND gate 226. The first buffer 221 may buffer the first bit signal FLI1 of the fail information signal FLI to generate the first path selection signal PSL1. The second buffer 222 may buffer the second bit signal FLI2 of the fail information signal FLI to generate the second path selection signal PSL2. The third buffer 223 may buffer the third bit signal FLI3 of the fail information signal FLI to generate the third path selection signal PSL3. The fourth buffer 224 may buffer the fourth bit signal FLI4 of the fail information signal FLI to generate the fourth path selection signal PSL4. The OR gate 225 may perform an OR logic gate on the first through fourth path selection signals PSL1~PSL4. The AND gate 226 may perform an AND logic operation on the output of the OR gate 225 and the mode signal MD to generate the block control signal BLK. In other example embodiments, the buffers 221~224 may be omitted and the first through fourth bit signals FLI1~FLI4 may be provided as the first through fourth path selection signals PSL1~PSL4 as they are.

Referring to FIG. 23, if the bit signal FLIi corresponding failed signal path is activated in the logic high level H, only the corresponding path selection signal PSLi may be activated in the logic high level, through the configuration of FIG. 22. The first path selection signal PSL1 may be activated in the logic high level H if the first bit signal FLI1 is activated in the logic high level H. The second path selection signal PSL2 may be activated in the logic high level H if the second bit signal FLI2 is activated in the logic high level H. The third path selection signal PSL3 may be activated in the logic high level H if the third bit signal FLI3 is activated in the logic high level H. The fourth path selection signal PSL4 may be activated in the logic high level H if the fourth bit signal FLI4 is activated in the logic high level H. Using such path selection signals PSL1~PSL4, the multiplexing repair operation may be performed such that the failed signal path is replaced with the sub signal path or the repair signal path depending on the logic level of the mode signal MD to repair the failed signal path.

The block control signal BLK may have the logic high level H when the mode signal MD had the logic high level H to indicate the first repair mode without using the repair signal path and when the output signal of the OR gate 225 has the logic high level H since one of the bit signals FLI1~FLI4 of the fail information signal FLI is activated in the logic high level H to indicate that the failed signal path exists.

As such, the path control signal PCON, that is, the path selection signals PSL1~PSL4 and the block control signal BLK may be generated based on the mode signal MD and the fail information signal FLI. Using the path control signal PCON, the multiplexing repair operation may be performed in the first repair mode that does not use the repair signal path as described with reference to FIGS. 18, 19A and 19B, and the multiplexing repair operation may be performed in the second repair mode that uses the repair signal path as described with reference to FIGS. 20, 21A and 21B.

Figure 24:
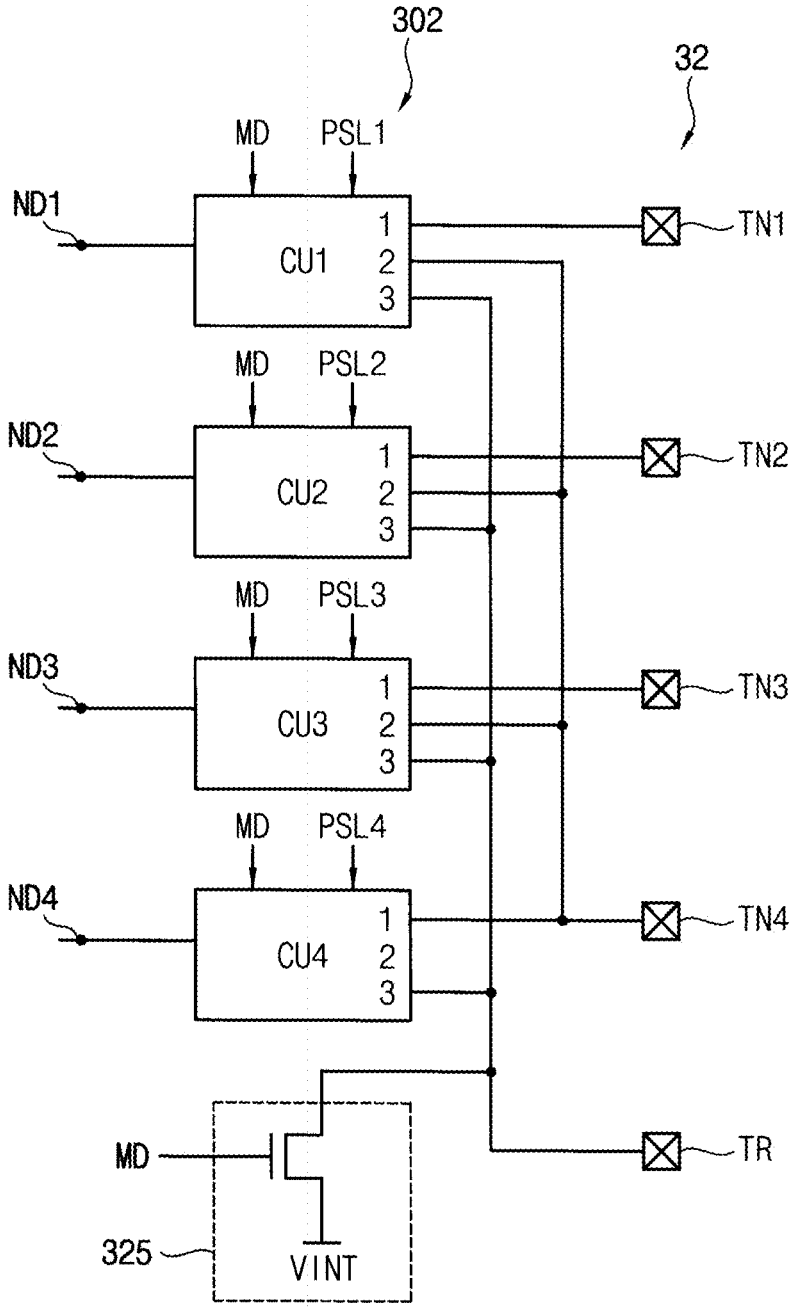
FIG. 24 is a block diagram illustrating a path conversion circuit performing a multiplexing repair operation according to some example embodiments.

FIG. 24 is a block diagram illustrating a path conversion circuit performing a multiplexing repair operation according to some example embodiments.

Referring to FIG. 24, a path conversion circuit 30 may include a plurality of conversion units CU1~CU4 and an initialization circuit 325.

As described above, the conversion units CU1~CU4 may perform the multiplexing repair operation such that each of the conversion units CU1~CU4 controls an electrical connection between each of the input-output node ND1~ND4 of the internal circuit and two or more input-output terminals in the input-output terminal set 31 in response to each of the path selection signals PSL1~PSL4.

The initialization circuit 325 may be connected to the repair input-output terminal TR and the initialization circuit 325 may apply an initialization voltage VINT to the repair input-output terminal TR in response to the mode signal MD. For example, the initialization circuit 325 may be implemented with an N-type metal oxide semiconductor (NMOS) transistor as illustrated in FIG. 24. The NMOS transistor may be turned on and the initialization voltage VINT may be applied to the repair input-output terminal TR when the mode signal MD has the logic high level H to represent the first repair mode that does not use the repair signal path and the repair input-output terminal TR. In contrast, the NMOS transistor may be turned off and the initialization voltage VINT may not be applied to the repair input-output terminal TR when the mode signal MD has the logic low level L to represent the second repair mode that uses the repair signal path and the repair input-output terminal TR.

In the conventional schemes, the systems have to be implemented independently with respect to the cases with supporting the repair signal path and with respect to the cases without supporting the repair signal path, due to the floating problems of the repair signal path. Using the initialization circuit controlling the initial state of the repair input-output terminal TR, the integrated device or sub system may be implemented to be applied to various repair schemes.

Figure 25:
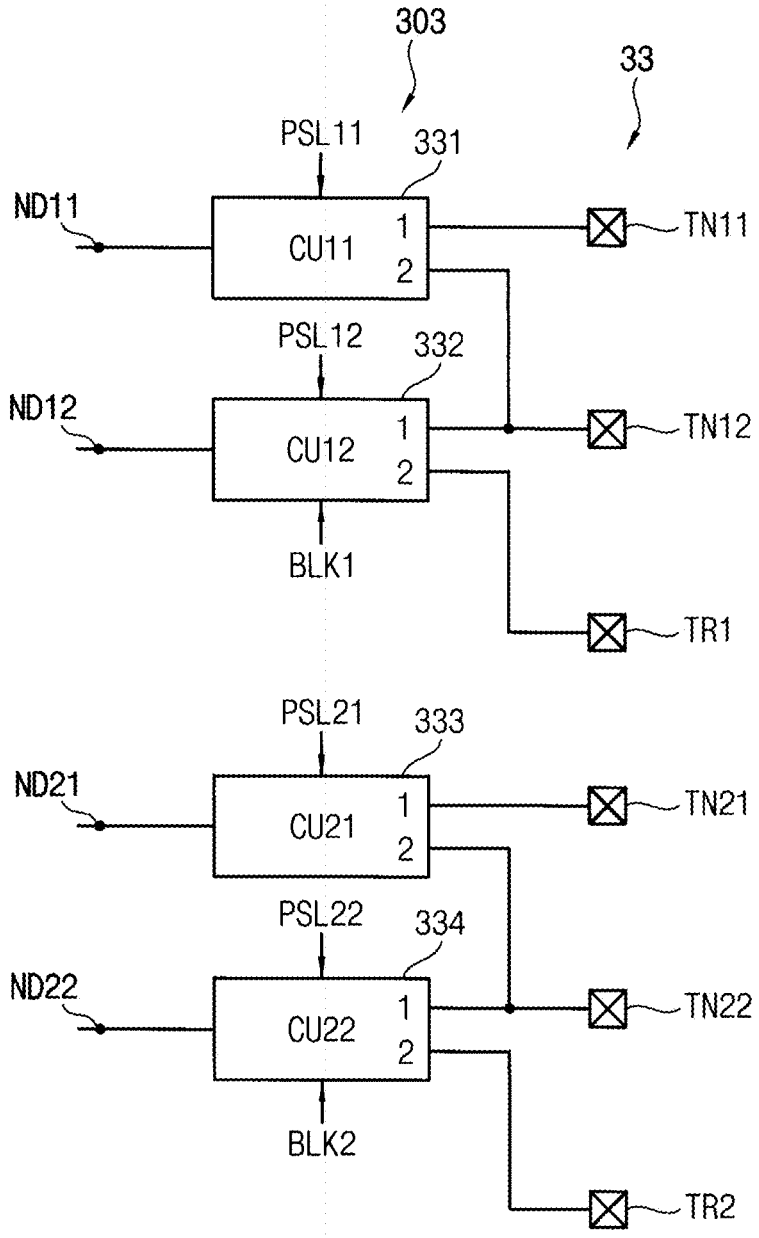
FIG. 25 is a block diagram illustrating a path conversion circuit performing a shifting repair operation according to some example embodiments.

FIG. 25 is a block diagram illustrating a path conversion circuit performing a shifting repair operation according to some example embodiments.

Referring to FIG. 25, a path conversion circuit 303 may include a plurality of conversion units CU11, CU12, CU21 and CU22 331~334. Each of the conversion units 331~334 may control an electrical connection between each of the input-output node ND11, ND12, ND21 and ND22 of the internal circuit and two or more input-output terminals in the input-output terminal set 33 in response to each of the path selection signals PSL11, PSL12, PSL21 and PSL22. FIG. 25 illustrates the first through fourth conversion units 331~334 for convenience of illustration and description, but the number of the conversion units and the input-output terminals may be changed variously.

The normal input-output terminals TN11, TN12, TN21 and TN22 may be divided into a plurality of groups, and the repair input-output terminal may be assigned independently to each group of the groups. For example, as illustrated in FIG. 25, the first group may include the first and second normal input-output terminals TN11 and TN12 and the second group may include the third and fourth normal input-output terminals TN21 and TN22. The first repair input-output terminal TR1 may be assigned to the first group and the second repair input-output terminal TR2 may be assigned to the second group.

As described above, the normal input-output terminals TN11, TN12, TN21 and TN22 may include a plurality of main input-output terminals to transfer main signals for a main (or primary) operation of the internal circuit 20 in FIG. 1 and at least one sub input-output terminal to transfer a sub signal for a sub operation of the internal circuit 20. For example, in the configuration of FIG. 25, the first and third normal input-output terminals TN11 and TN21 may be the main input-output terminals and the second and fourth normal input-output terminals TN12 and TN22 may be the sub input-output terminal.

Each of the main conversion units 331 and 333 corresponding to the main input-output terminals TN11 and TN21 among the conversion units 331~334 may be connected to a corresponding normal input-output terminal and an adjacent normal input-output terminal among the normal input-output terminals TN11, TN12, TN21 and TN22. In other words, the first conversion unit 331 may be connected to the first normal input-output terminal TN11 and the second normal input-output terminal TN12, and the third conversion unit 333 may be connected to the third normal input-output terminal TN21 and the fourth normal input-output terminal TN22.

The sub conversion units 332 and 334 corresponding to the sub input-output terminal TN12 and TN22 among the conversion units 331~334 may be connected to the corresponding normal input-output terminal and the repair input-output terminal of the corresponding group. In other words, the second conversion unit 332 may be connected to the second normal input-output terminal TN12 and the first repair input-output terminal TR1, and the fourth conversion unit 334 may be connected to the fourth normal input-output terminal TN22 and the second repair input-output terminal TR2.

As described above, the repair controller 200 in FIG. 2 may control logic levels of the path selection signals PSL11, PSL12, PSL21 and PSL22 so that the shifting repair operation may be performed. Each of the conversion units 331~334 may be connected selectively to one of the two input-output terminals depending on each logic level of the path selection signals PSL11, PSL12, PSL21 and PSL22. When each path selection signal PSLi is deactivated in a first logic level (e.g., a logic low level), each conversion unit CUi may select the terminal '1' to be connected to the corresponding input-output terminal. When each path selection signal PSLi is activated in a second logic level (e.g., a logic high level), each conversion unit CUi may select the terminal '2' to be connected to the adjacent input-output terminal.

Figure 26:
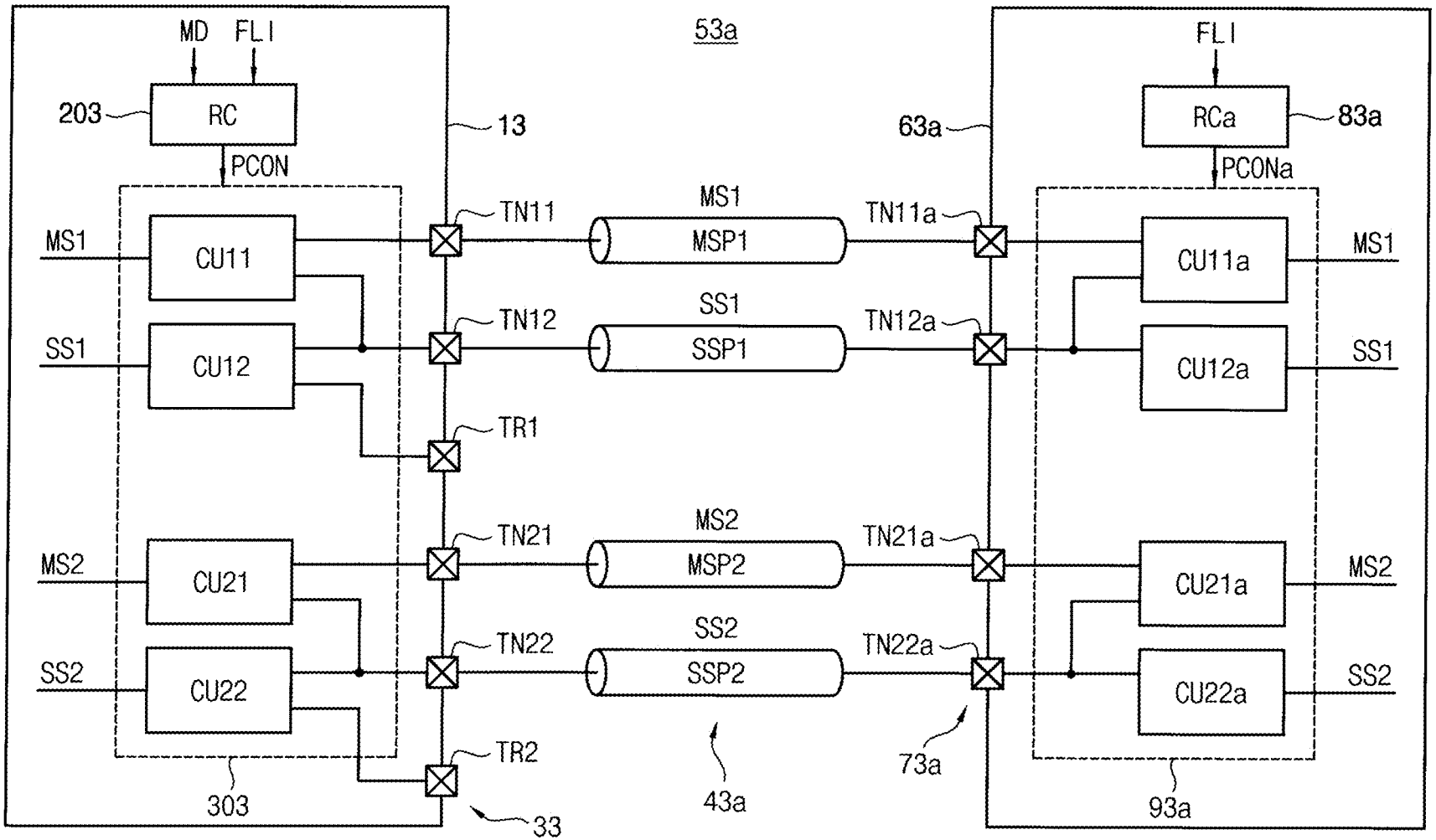
FIG. 26 is a block diagram illustrating a system including the path conversion circuit of FIG. 25 without supporting a repair signal path according to some example embodiments.

FIG. 26 is a block diagram illustrating a system including the path conversion circuit of FIG. 25 without supporting a repair signal path according to some example embodiments.

Referring to FIG. 26, a system 53a may include a first sub system 13, a second sub system 63a and a signal path set 43a connecting the first sub system 13 and the second sub system 63a The first sub system 13 may have a configuration capable of selectively operating in the first repair mode without using the repair input-output terminals or in the second repair mode using the repair input-output terminals. The first system 13 may include an input-output terminal set 33, a repair controller RC 203 and a path conversion circuit 303. The internal circuit of the first sub system 13 is omitted for convenience of illustration.

The input-output terminal set 33 may include a first plurality of normal input-output terminals TN11 and TN12 pertaining to a first group, a second plurality of normal input-output terminals TN21 and TN22 pertaining to a second group and repair input-output terminals TR1 and TR2 respectively assigned to the groups. The repair controller 203 may generate a path control signal PCON based on a mode signal MD and fail information signal FLI. The path conversion circuit 303 may control electrical connections between the input-output terminal set 33 and the internal circuit of the first sub system 13 in response to the path control signal PCON.

As described with reference to FIG. 25, the path conversion circuit 303 may include a plurality of conversion units CU11, CU12, CU21 and CU22 where each of the conversion units CU11, CU12, CU21 and CU22 may control an electrical connection between each of the input-output node ND11, ND12, ND21 and ND22 of the internal circuit and two or more input-output terminals in the input-output terminal set 33 in response to each of the path selection signals PSL11, PSL12, PSL21 and PSL22.

The second sub system 63a may have a configuration that does not support the repair signal path. The second sub system 63a may include an input-output terminal set 73a, a repair controller RCa 83a and a path conversion circuit 93a. The internal circuit of the second sub system 63a is omitted for convenience of illustration.

The input-output terminal set 73a may include a plurality of normal input-output terminals TN11a, TN12a, TN21a and TN22a but may not include a repair input-output terminal. The repair controller 83a may generate a path control signal PCONa based on the fail information signal FLI. The path conversion circuit 93a may control electrical connections between the input-output terminal set 73a and the internal circuit of the second sub system 63a in response to the path control signal PCONa.

Similar to the path conversion circuit 303 of the first sub system 13, the path conversion circuit 93a of the second sub system 63a may include a plurality of conversion units CU11a, CU12a, CU21a and CU22a. and each of the conversion units CU11a, CU12a, CU21a and CU22a may control an electrical connection between each of the input-output node of the internal circuit and two or more input-output terminals in the input-output terminal set 73a in response to each of the path selection signals. However, the input-output terminal set 73a does not include the repair input-output terminal and thus each of the last conversion units CU12a and CU22a of the respective groups may control the electrical connection between the input-output node of the internal circuit and each of the input-output terminals TN12a and TN22a.

Because the second sub system 63a is fixed to the configuration not to support the repair signal path, the repair controller 83a of the second sub system 63a may not receive the mode signal MD. The same fail information signal FLI may be provided to the first sub system 13 and the second sub system 63a.

The signal path set 43a may include a plurality of normal signal paths MSP1, MSP2, SSP1 and SSP2 but may not include a repair signal path. The normal signal paths MSP1, MSP2, SSP1 and SSP2 may include first and second main signal paths MSP1 and MSP2 to transfer main signals MS1 and MS2 for a main operation of the first sub system 13 and first and second sub input-output terminal SSP1 and SSP2 to transfer sub signals SS1 and SS2 for a sub operation of the first sub system 13. As such, the first and second normal input-output terminals TN11 and TN21 may be referred to as main input-output terminals and the third and fourth normal input-output terminals TN21 and TN22 may be referred to as sub input-output terminals. The first and second conversion units CU11 and CU12 may be referred to as main conversion units and the third and fourth conversion units CU12 and CU22 may be referred to as sub conversion units.

FIG. 26 illustrates a signal transfer when the normal signal paths MSP1, MSP2, SSP1 and SSP2 do not include the failed signal path. The repair function may be disabled when the failed signal path does not exist, the first and second main signals MS1 and MS2 may be transferred through the respective main signal paths MSP1 and MSP2, and the first and second sub signals SS1 and SS2 may be transferred through the respective sub signal paths SSP1 and SSP2.

Figure 27A:
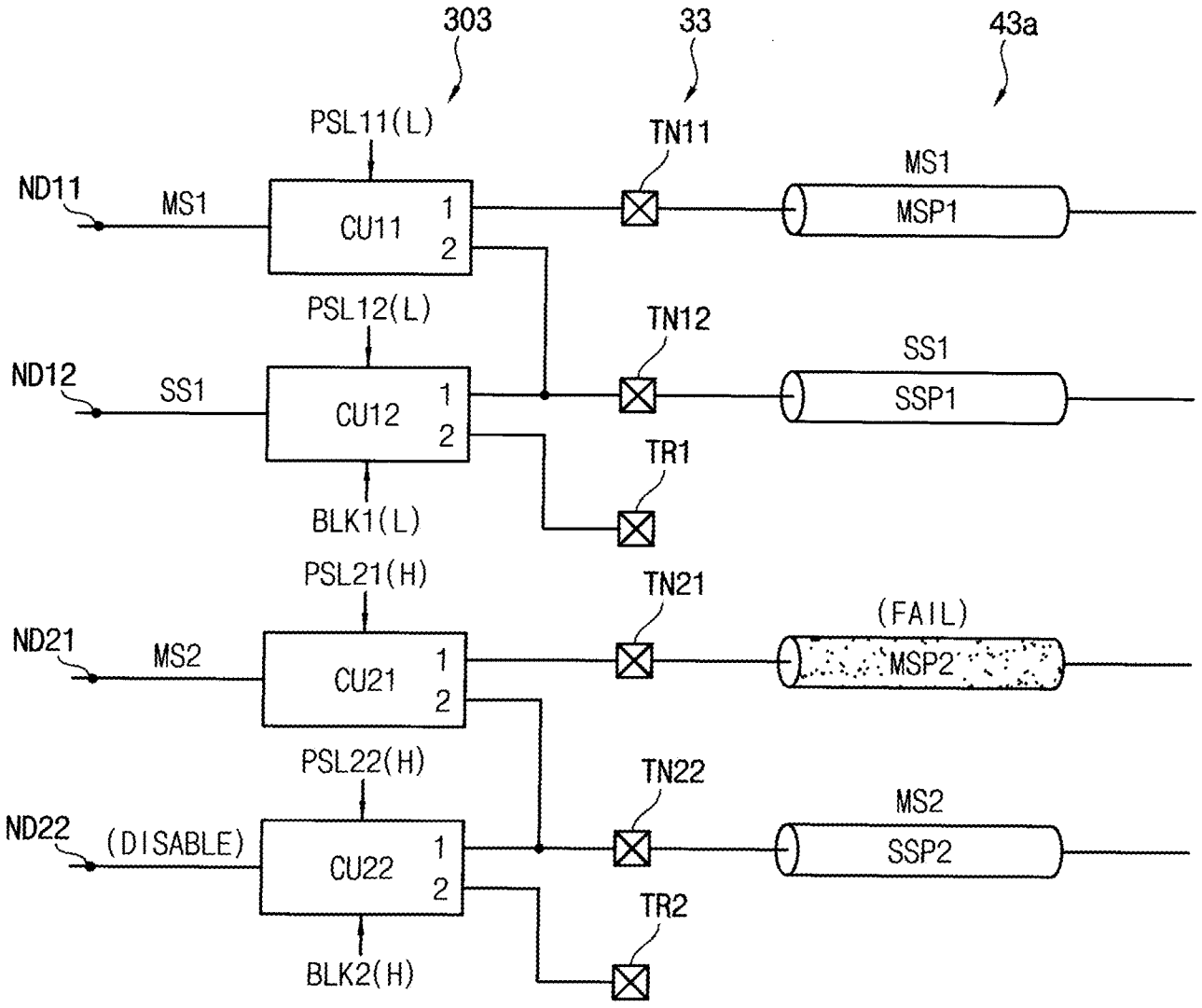
FIGS. 27A and 27B are diagrams for describing a repair operation of the system of FIG. 26 according to some example embodiments.
Figure 27B:
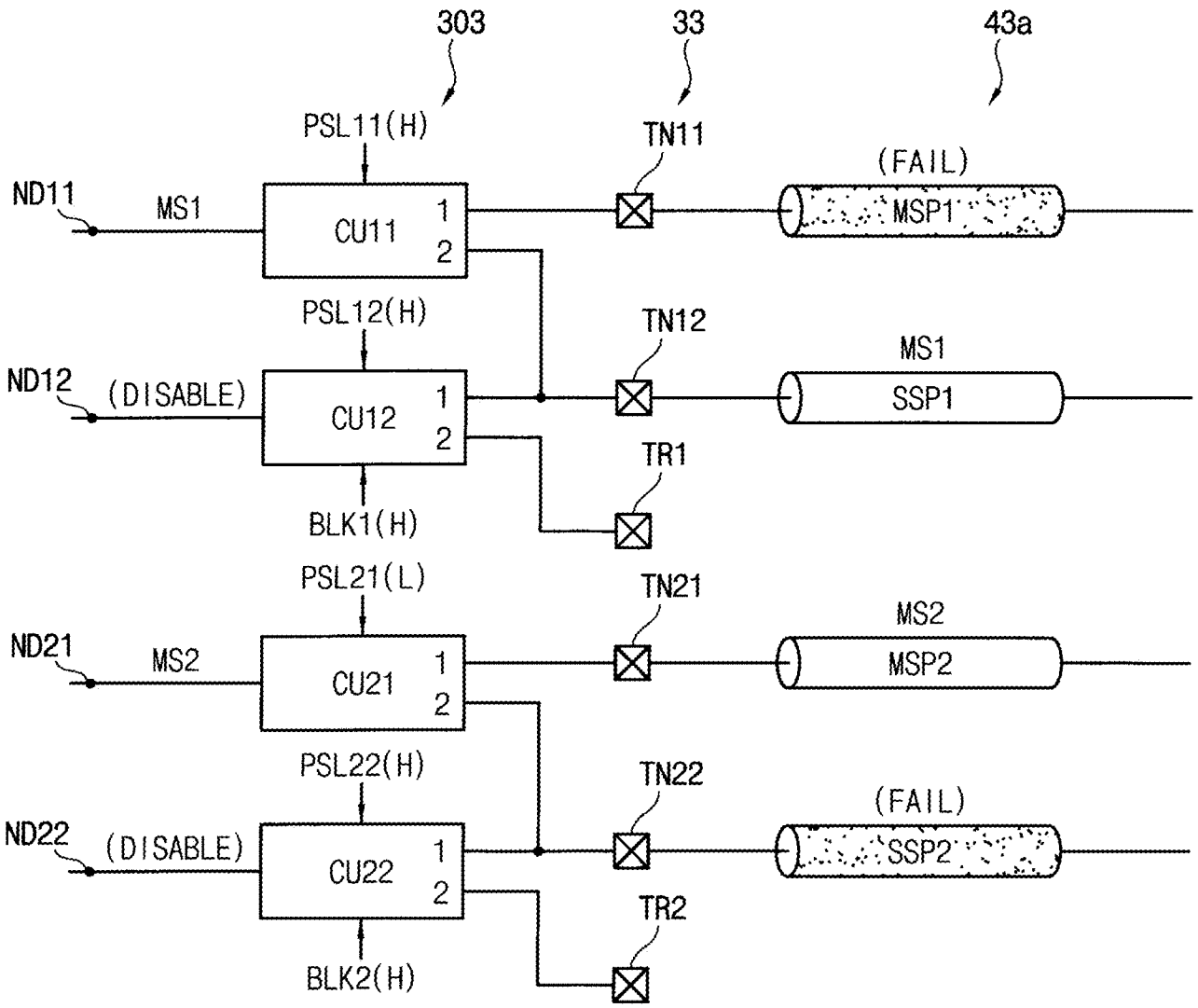

FIGS. 27A and 27B are diagrams for describing a repair operation of the system of FIG. 26.

For example, the second main signal path MSP2 pertaining to the second group may be a failed signal path as illustrated in FIG. 27A. With respect to the first group that does not include a failed signal path, the first main signal MS1 may be transferred through the first main signal path MSP1 and the first sub signal SS1 may be transferred through the first sub signal path SSP1. With respect to the second group that includes a failed signal path, the second main signal MS2 may be transferred through the second sub signal path MSP2. The first and second path selection signals PSL11 and PSL12 may maintain the deactivated logic low level L and thus the first and second conversion units CU11 and CU12 may select the terminal '1'. The third and fourth path selection signals PSL21 and PSL22 may be activated in the logic high level H and thus the third and fourth conversion units CU21 and CU22 may select the terminal '2'. As a result, the first and second main signals MS1 and MS2 may be transferred through the respective input-output nodes ND11 and ND21 of the internal circuit as the case when the failed signal path does not exist. The first sub signal SS1 may be transferred through the input-output node ND12 of the internal circuit as the case when the failed signal path does not exist, and the sub operation using the first sub signal SS1 may be performed. However, the second sub signal SS2 may not be transferred and the sub operation using the second sub signal SS2 may be stopped. The firs block control signal BLK1 maintain the deactivated logic low level L, and the second conversion unit CU12 corresponding to the sub conversion unit of the first group may be electrically connected to the second input-output node ND12 of the internal circuit. The second block control signal BLK2 may be activated in the logic high level H, and the forth conversion unit CU22 corresponding to the sub conversion unit of the second group may block or disable the electrical connection to the fourth input-output node ND22 of the internal circuit.

For example, the first main signal path MSP1 pertaining to the first group and the second sub signal path SSP2 pertaining to the second group may be failed signal paths as illustrated in FIG. 27B. With respect to the first group, the first main signal MS1 may be transferred through the first sub signal path SSP1. With respect to the second group, the second main signal MS2 may be transferred through the second main signal path MSP2. The third path selection signal PSL21 may maintain the deactivated logic low level L and thus the third conversion unit CU21 may select the terminal '1'. The first, second and fourth path selection signals PSL11, PSL12 and PSL22 may be activated in the logic high level H and thus the first, second and fourth conversion units CU11, CU12 and CU22 may select the terminal '2'. As a result, the first and second main signals MS1 and MS2 may be transferred through the respective input-output nodes ND11 and ND21 as the case when the failed signal path does not exist. The first and second sub signals SS1 and SS2 may not be transferred and the sub operations using the first and second sub signal SS1 and SS2 may be stopped. The first and second block control signals BLK1 and BLK2 may be activated in the logic high level H, and the second and forth conversion units CU12 and CU22 corresponding to the sub conversion units of the respective groups may block or disable the electrical connection to the second and fourth input-output node ND12 and ND22 of the internal circuit.

As illustrated in FIGS. 27A and 27B, in the first repair mode that does not support the repair signal path, the failed signal path may be repaired using the sub signal path. The repair circuit including the path conversion circuit 303 of FIG. 25 may perform the shifting repair operation to repair the failed input-output terminal corresponding to the failed signal path among the main input-output terminals TN11 and TN21, using the sub input-output terminals TN1 and TN22.

Figure 28:
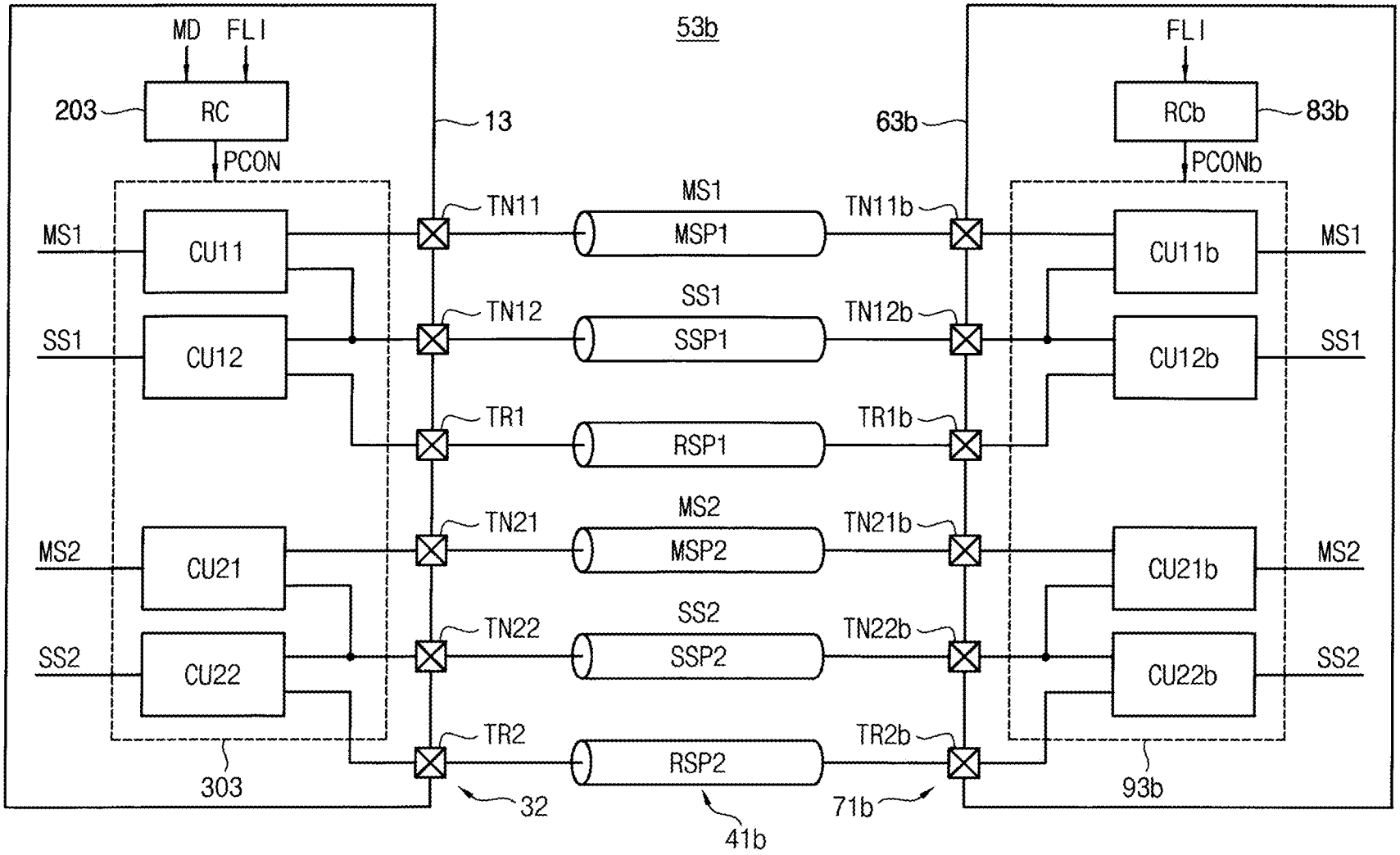
FIG. 28 is a block diagram illustrating a system including the path conversion circuit of FIG. 25 and supporting a repair signal path according to some example embodiments.

FIG. 28 is a block diagram illustrating a system including the path conversion circuit of FIG. 25 and supporting a repair signal path according to at least one example embodiment.

Referring to FIG. 28, a system 53b may include a first sub system 13, a second sub system 63b and a signal path set 43b connecting the first sub system 13 and the second sub system 63b The first sub system 13 may have a configuration capable of selectively operating in the first repair mode without using the repair input-output terminal or in the second repair mode using the repair input-output terminal. The first system 13 may include an input-output terminal set 33, a repair controller RC 203 and a path conversion circuit 303. The internal circuit of the first sub system 13 is omitted for convenience of illustration.

The input-output terminal set 33 may include a first plurality of normal input-output terminals TN11 and TN12 pertaining to a first group, a second plurality of normal input-output terminals TN21 and TN22 pertaining to a second group and repair input-output terminals TR1 and TR2 respectively assigned to the groups. The repair controller 203 may generate a path control signal PCON based on a mode signal MD and fail information signal FLI. The path conversion circuit 303 may control electrical connections between the input-output terminal set 33 and the internal circuit of the first sub system 13 in response to the path control signal PCON.

As described with reference to FIG. 25, the path conversion circuit 303 may include a plurality of conversion units CU11, CU12, CU21 and CU22 where each of the conversion units CU11, CU12, CU21 and CU22 may control an electrical connection between each of the input-output node ND11, ND12, ND21 and ND22 of the internal circuit and two or more input-output terminals in the input-output terminal set 33 in response to each of the path selection signals PSL11, PSL12, PSL21 and PSL22.

The second sub system 63b may have a configuration that supports the repair signal path. The second sub system 63b may include an input-output terminal set 73b, a repair controller RCb 83b and a path conversion circuit 93b. The internal circuit of the second sub system 63b is omitted for convenience of illustration.

The input-output terminal set 73b may include a plurality of normal input-output terminals TN11b, TN12b, TN21b and TN22b and repair input-output terminals TR1b and TR2b. The repair controller 83b may generate a path control signal PCONb based on the fail information signal FLI. The path conversion circuit 93b may control electrical connections between the input-output terminal set 73b and the internal circuit of the second sub system 63b in response to the path control signal PCONb.

Similar to the path conversion circuit 303 of the first sub system 13, the path conversion circuit 93b of the second sub system 63b may include a plurality of conversion units CU11b, CU12b, CU21b and CU22b, and each of the conversion units CU11b, CU12b, CU21b and CU22b may control an electrical connection between each of the input-output node of the internal circuit and two or more input-output terminals in the input-output terminal set 73b in response to each of the path selection signals.

Because the second sub system 63b is fixed to the configuration to support the repair signal path, the repair controller 83b of the second sub system 63b may not receive the mode signal MD. The same fail information signal FLI may be provided to the first sub system 13 and the second sub system 63b.

The signal path set 43b may include a plurality of normal signal paths MSP1, MSP2, SSP1 and SSP2 and repair signal paths RSP1 and RSP2. The normal signal paths MSP1, MSP2, SSP1 and SSP2 may include first and second main signal paths MSP1 and MSP2 to transfer main signals MS1 and MS2 for a main operation of the first sub system 13 and first and second sub input-output terminals SSP1 and SSP2 to transfer sub signals SS1 and SS2 for sub operations of the first sub system 13. As such, the first and third normal input-output terminals TN11 and TN21 may be referred to as main input-output terminals and the second and fourth normal input-output terminals TN12 and TN22 may be referred to as sub input-output terminals. The first and third conversion units CU11 and CU21 may be referred to as main conversion units and the second and fourth conversion units CU12 and CU22 may be referred to as sub conversion units.

FIG. 28 illustrates a signal transfer when the normal signal paths MSP1, MSP2, SSP1 and SSP2 do not include the failed signal path. The repair function may be disabled when the failed signal path does not exist, the first and second main signals MS1 and MS2 may be transferred through the respective main signal paths MSP1 and MSP2, and the first and second sub signals SS1 and SS2 may be transferred through the respective sub signal paths SSP1 and SSP2.

Figure 29A:
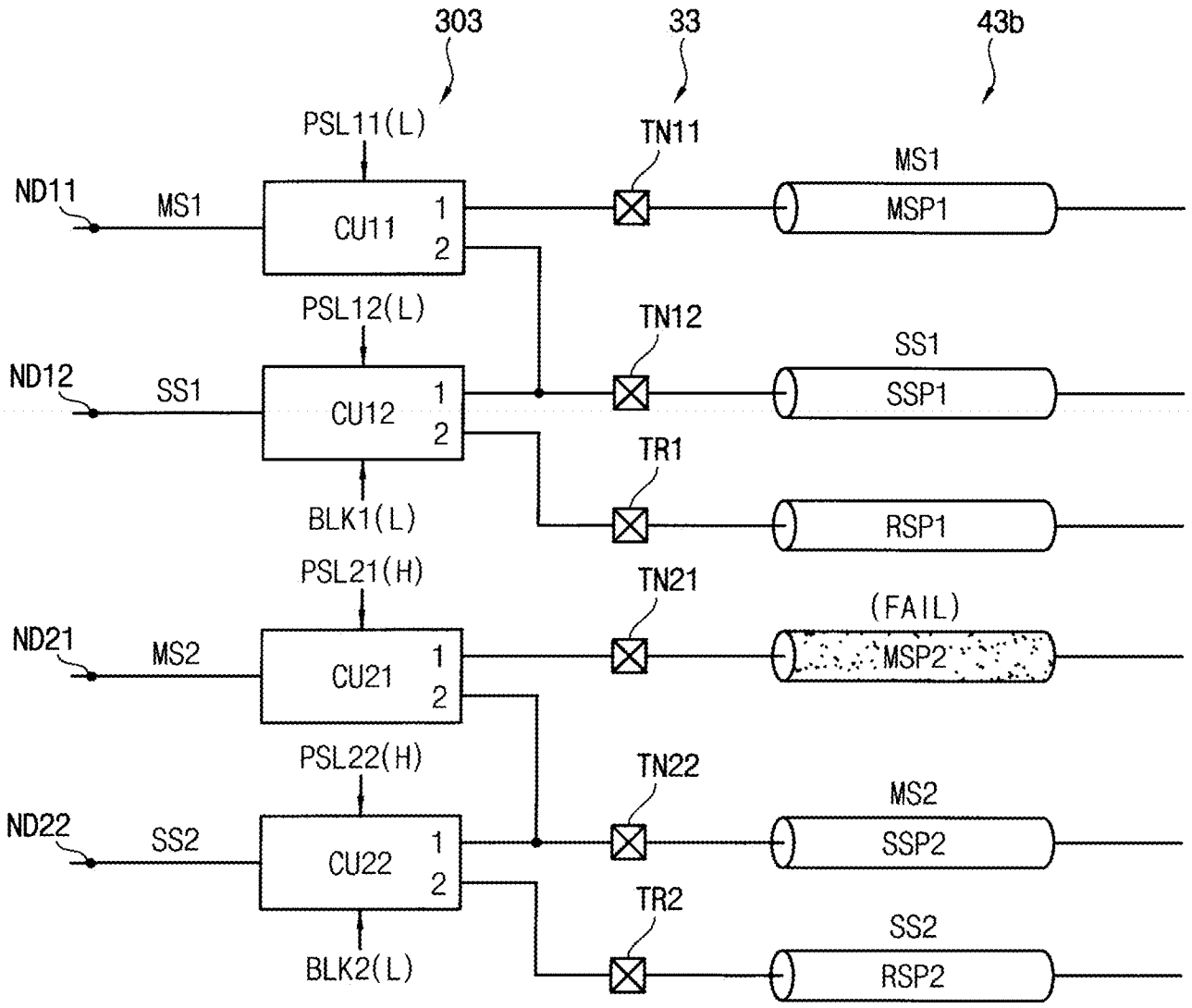
FIGS. 29A and 29B are diagrams for describing a repair operation of the system of FIG. 28 according to some example embodiments.
Figure 29B:
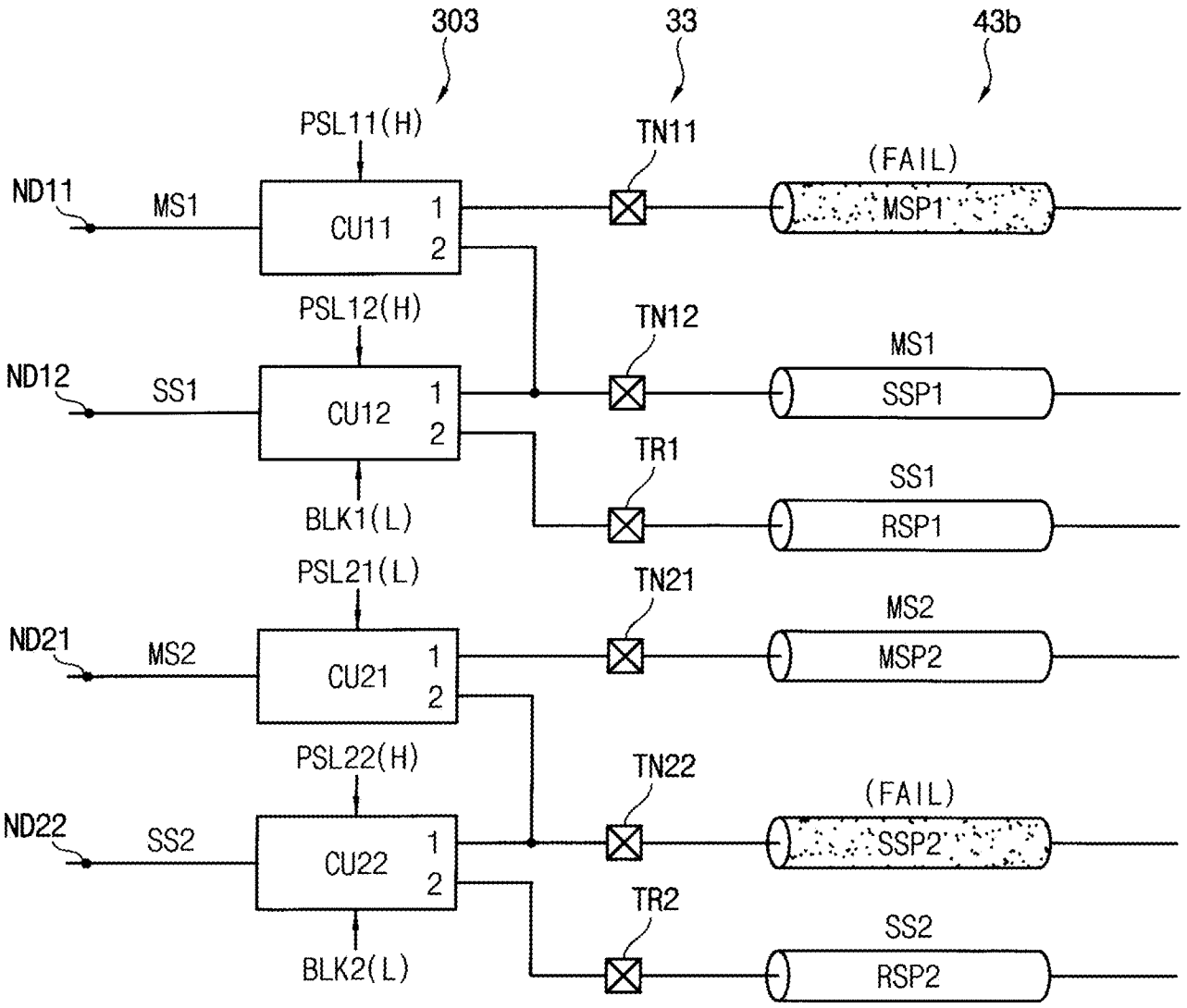

FIGS. 29A and 29B are diagrams for describing a repair operation of the system of FIG. 28.

For example, the second main signal path MSP2 may be a failed signal path as illustrated in FIG. 29A. With respect to the first group that does not include a failed signal path, the first main signal MS1 may be transferred through the first main signal path MSP1 and the first sub signal SS1 may be transferred through the first sub signal path SSP1. With respect to the second group that includes a failed signal path, the second main signal MS2 may be transferred through the second sub signal path MSP2 and the second sub signal SS2 may be transferred through the second repair signal path RSP2. The first and second path selection signals PSL11 and PSL12 may maintain the deactivated logic low level L and thus the first and second conversion units CU11 and CU12 may select the terminal '1'. The third and fourth path selection signals PSL21 and PSL22 may be activated in the logic high level H and thus the third and fourth conversion units CU21 and CU22 may select the terminal '2'. As a result, the first and second main signals MS1 and MS2 and the first and second sub signals SS1 and SS2 may be transferred through the respective input-output nodes ND11, ND12, ND21 and ND22 of the internal circuit as the case when the failed signal path does not exist.

For example the first main signal path MSP1 pertaining to the first group and the second sub signal path SSP2 pertaining to the second group may be failed signal paths as illustrated in FIG. 29B. With respect to the first group, the first main signal MS1 may be transferred through the first sub signal path SSP1 and the first sub signal SS1 may be transferred through the first repair signal path RSP1. With respect to the second group, the second main signal MS2 may be transferred through the second main signal path MSP2 and the second sub signal SS2 may be transferred through the second repair signal path RSP2. The third path selection signal PSL21 may maintain the deactivated logic low level L and thus the third conversion unit CU21 may select the terminal '1'. The first, second and fourth path selection signals PSL11, PSL12 and PSL22 may be activated in the logic high level H and thus the first, second and fourth conversion units CU11, CU12 and CU22 may select the terminal '2'. As a result, the first and second main signals MS1 and MS2 and the first and second sub signals SS1 and SS2 may be transferred through the respective input-output nodes ND11, ND12, ND21 and ND22 of the internal circuit as the case when the failed signal path does not exist.

As illustrated in FIGS. 29A and 29B, in the second repair mode that supports the repair signal path, the failed signal path may be repaired using the repair signal path assigned to each group. The repair circuit including the path conversion circuit 303 of FIG. 25 may perform the shifting repair operation to repair the failed input-output terminal corresponding to the failed signal path among the normal input-output terminals TN11, TN12, TN21 and TN22, using the repair input-output terminals TR1 and TR2. The sub signals SS1 and SS2 may be transferred and the internal circuit 20 may perform the sub operations using the sub signals SS1 and SS2 in the second repair mode. The block control signals BLK1 and BLK2 may be deactivated, for example, in the logic low level L, and the second and forth conversion units CU12 and CU22 corresponding to the sub conversion units may be electrically connected to the second and fourth input-output node ND12 and ND22 of the internal circuit.

Figure 30:
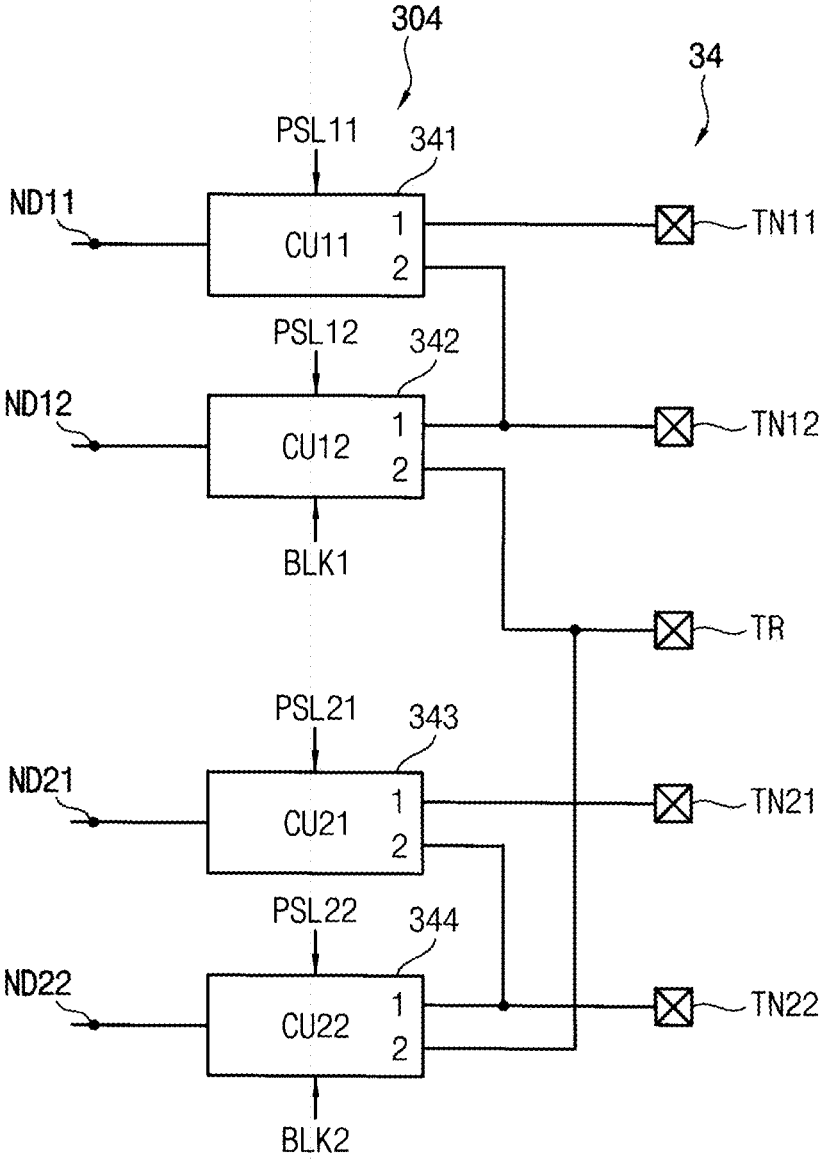
FIG. 30 is a block diagram illustrating a path conversion circuit performing a shifting repair operation according to some example embodiments.

FIG. 30 is a block diagram illustrating a path conversion circuit performing a shifting repair operation according to some example embodiments.

Referring to FIG. 30, a path conversion circuit 304 may include a plurality of conversion units CU11, CU12, CU21 and CU22 341~344. Each of the conversion units 334~344 may control an electrical connection between each of the input-output node ND11, ND12, ND21 and ND22 of the internal circuit and two or more input-output terminals in the input-output terminal set 34 in response to each of the path selection signals PSL11, PSL12, PSL21 and PSL22. FIG. 30 illustrates the first through fourth conversion units 341~344 for convenience of illustration and description, but the number of the conversion units and the input-output terminals may be changed variously.

The normal input-output terminals TN11, TN12, TN21 and TN22 may be divided into a plurality of groups, and the repair input-output terminal may be assigned commonly to the groups. For example, as illustrated in FIG. 30, the first group may include the first and second normal input-output terminals TN11 and TN12 and the second group may include the third and fourth normal input-output terminals TN21 and TN22. The repair input-output terminal TR may be assigned commonly to the first and second groups.

As described above, the normal input-output terminals TN11, TN12, TN21 and TN22 may include a plurality of main input-output terminals to transfer main signals for a main operation of the internal circuit 20 in FIG. 1 and at least one sub input-output terminal to transfer a sub signal for a sub operation of the internal circuit 20. For example, in the configuration of FIG. 30, the first and third normal input-output terminals TN11 and TN21 may be the main input-output terminals and the second and fourth normal input-output terminals TN12 and TN22 may be the sub input-output terminal.

Each of the main conversion units 341 and 343 corresponding to the main input-output terminals TN11 and TN21 among the conversion units 341-344 may be connected to a corresponding normal input-output terminal and an adjacent normal input-output terminal among the normal input-output terminals TN11, TN12, TN21 and TN22. In other words, the first conversion unit 341 may be connected to the first normal input-output terminal TN11 and the second normal input-output terminal TN12, and the third conversion unit 343 may be connected to the third normal input-output terminal TN21 and the fourth normal input-output terminal TN22.

The sub conversion units 342 and 344 corresponding to the sub input-output terminal TN12 and TN22 among the conversion units 341-344 may be connected to the corresponding normal input-output terminal and the common repair input-output terminal. In other words, the second conversion unit 342 may be connected to the second normal input-output terminal TN12 and the repair input-output terminal TR, and the fourth conversion unit 344 may be connected to the fourth normal input-output terminal TN22 and the repair input-output terminal TR.

As described above, the repair controller 200 in FIG. 2 may control logic levels of the path selection signals PSL11, PSL12, PSL21 and PSL22 so that the shifting repair operation may be performed. Each of the conversion units 341~344 may be connected selectively to one of the two input-output terminals depending on each logic level of the path selection signals PSL11, PSL12, PSL21 and PSL22. When each path selection signal PSLi is deactivated in a first logic level (e.g., a logic low level), each conversion unit CUi may select the terminal '1' to be connected to the corresponding input-output terminal. When each path selection signal PSLi is activated in a second logic level (e.g., a logic high level), each conversion unit CUi may select the terminal '2' to be connected to the adjacent input-output terminal.

Figure 31:
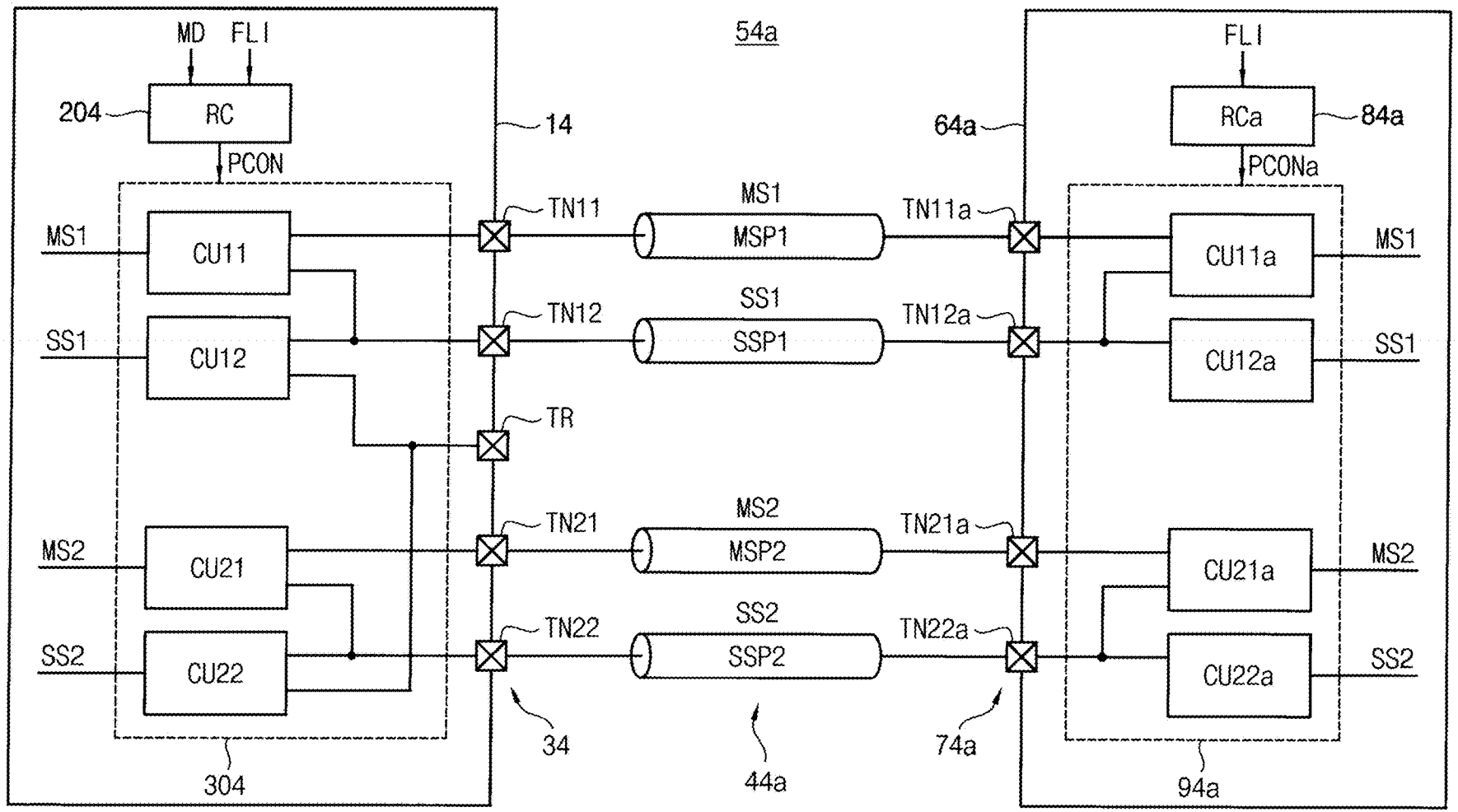
FIG. 31 is a block diagram illustrating a system including the path conversion circuit of FIG. 30 without supporting a repair signal path according to some example embodiments.

FIG. 31 is a block diagram illustrating a system including the path conversion circuit of FIG. 30 without supporting a repair signal path according to an example embodiment.

Referring to FIG. 31, a system 54a may include a first sub system 14, a second sub system 64a and a signal path set 44a connecting the first sub system 14 and the second sub system 64a The first sub system 14 may have a configuration capable of selectively operating in the first repair mode without using the repair input-output terminal or in the second repair mode using the repair input-output terminal. The first system 14 may include an input-output terminal set 34, a repair controller RC 204 and a path conversion circuit 304. The internal circuit of the first sub system 14 is omitted for convenience of illustration.

The input-output terminal set 34 may include a first plurality of normal input-output terminals TN11 and TN12 pertaining to a first group, a second plurality of normal input-output terminals TN21 and TN22 pertaining to a second group and a repair input-output terminals TR assigned commonly to the first and second groups. The repair controller 204 may generate a path control signal PCON based on a mode signal MD and fail information signal FLI. The path conversion circuit 304 may control electrical connections between the input-output terminal set 34 and the internal circuit of the first sub system 14 in response to the path control signal PCON.

As described with reference to FIG. 30, the path conversion circuit 304 may include a plurality of conversion units CU11, CU12, CU21 and CU22 where each of the conversion units CU11, CU12, CU21 and CU22 may control an electrical connection between each of the input-output node ND11, ND12, ND21 and ND22 of the internal circuit and two or more input-output terminals in the input-output terminal set 34 in response to each of the path selection signals PSL11, PSL12, PSL21 and PSL22.

The second sub system 64a may have a configuration that does not support the repair signal path. The second sub system 64a may include an input-output terminal set 74a, a repair controller RCa 84a and a path conversion circuit 94a. The internal circuit of the second sub system 64a is omitted for convenience of illustration.

The input-output terminal set 74a may include a plurality of normal input-output terminals TN11a, TN12a, TN21a and TN22a but may not include a repair input-output terminal. The repair controller 84a may generate a path control signal PCONa based on the fail information signal FLI. The path conversion circuit 94a may control electrical connections between the input-output terminal set 74a and the internal circuit of the second sub system 64a in response to the path control signal PCONa.

Similar to the path conversion circuit 304 of the first sub system 14, the path conversion circuit 94a of the second sub system 64a may include a plurality of conversion units CU11a, CU12a, CU21a and CU22a. and each of the conversion units CU11a, CU12a, CU21a and CU22a may control an electrical connection between each of the input-output node of the internal circuit and two or more input-output terminals in the input-output terminal set 74a in response to each of the path selection signals. However, the input-output terminal set 74a does not include the repair input-output terminal and thus each of the last conversion units CU12a and CU22a of the respective groups may control the electrical connection between the input-output node of the internal circuit and each of the input-output terminals TN12a and TN22a.

Because the second sub system 64a is fixed to the configuration not to support the repair signal path, the repair controller 84a of the second sub system 64a may not receive the mode signal MD. The same fail information signal FLI may be provided to the first sub system 14 and the second sub system 64a.

The signal path set 44a may include a plurality of normal signal paths MSP1, MSP2, SSP1 and SSP2 but may not include a repair signal path. The normal signal paths MSP1, MSP2, SSP1 and SSP2 may include first and second main signal paths MSP1 and MSP2 to transfer main signals MS1 and MS2 for a main operation of the first sub system 14 and first and second sub input-output terminal SSP1 and SSP2 to transfer sub signals SS1 and SS2 for a sub operation of the first sub system 14. As such, the first and second normal input-output terminals TN11 and TN21 may be referred to as main input-output terminals and the third and fourth normal input-output terminals TN21 and TN22 may be referred to as sub input-output terminals. The first and second conversion units CU11 and CU12 may be referred to as main conversion units and the third and fourth conversion units CU12 and CU22 may be referred to as sub conversion units.

FIG. 31 illustrates a signal transfer when the normal signal paths MSP1, MSP2, SSP1 and SSP2 do not include the failed signal path. The repair function may be disabled when the failed signal path does not exist, the first and second main signals MS1 and MS2 may be transferred through the respective main signal paths MSP1 and MSP2, and the first and second sub signals SS1 and SS2 may be transferred through the respective sub signal paths SSP1 and SSP2.

Figure 32A:
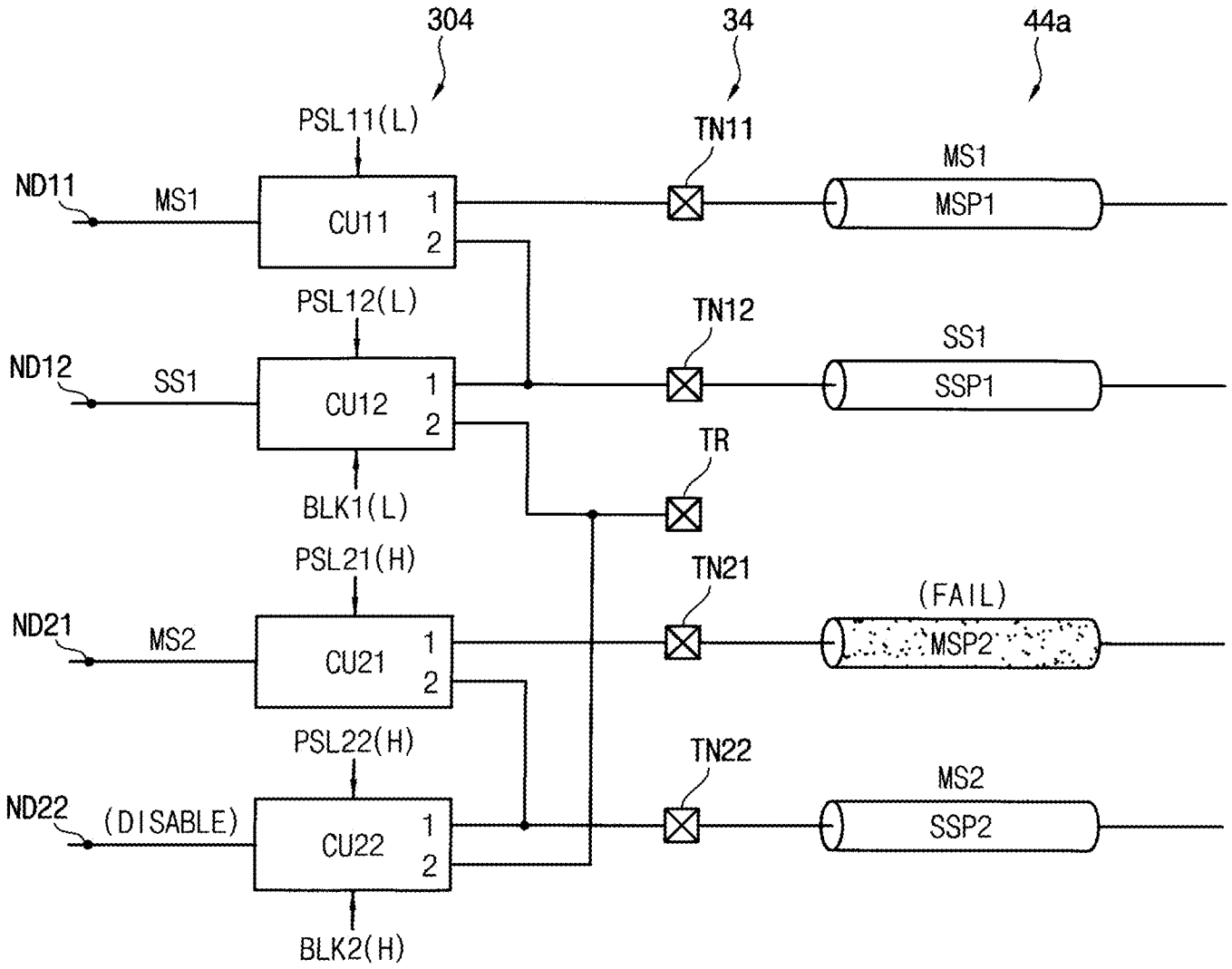
FIGS. 32A and 32B are diagrams for describing a repair operation of the system of FIG. 31 according to some example embodiments.
Figure 32B:
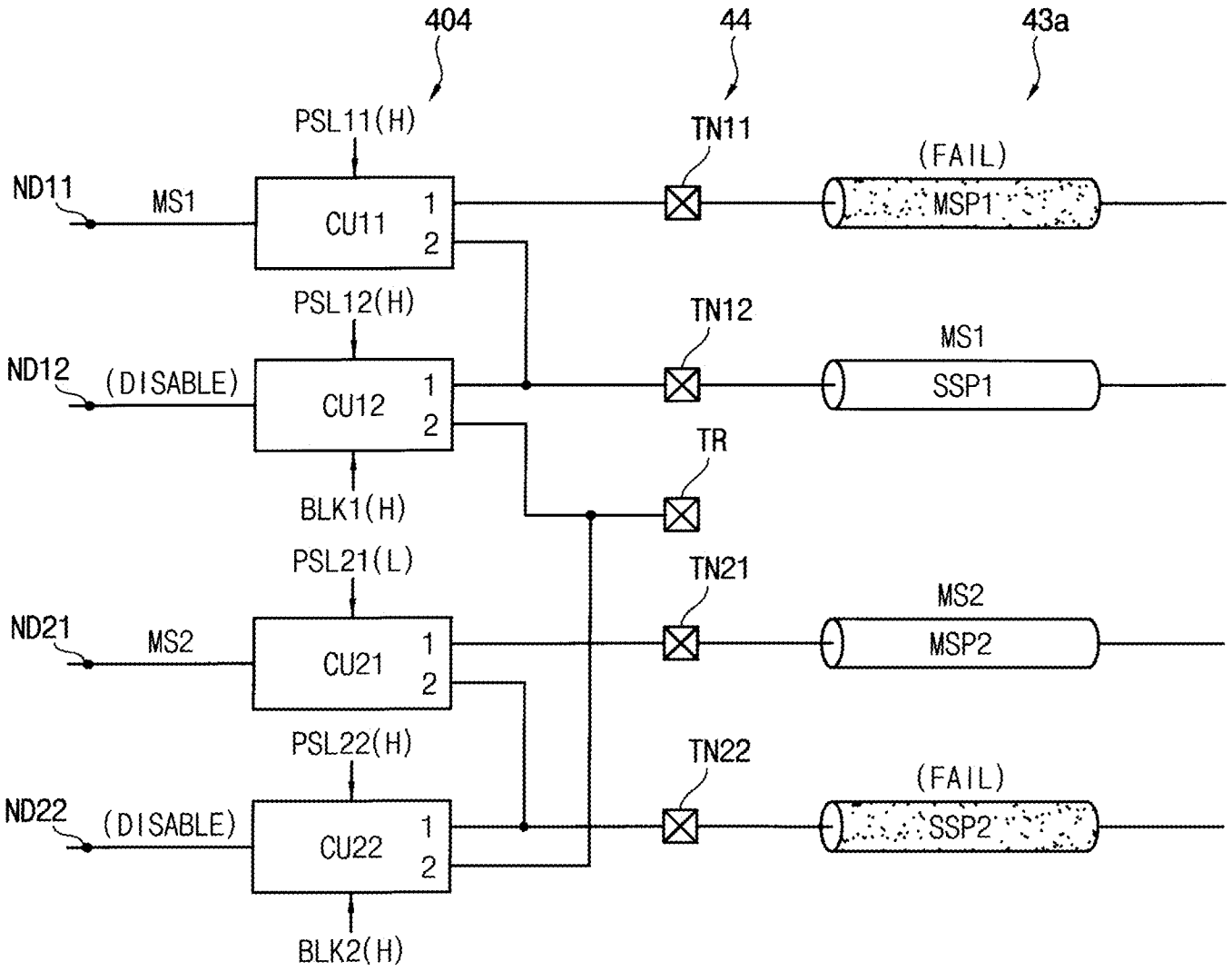

FIGS. 32A and 32B are diagrams for describing a repair operation of the system of FIG. 31.

For example, the second main signal path MSP2 pertaining to the second group may be a failed signal path as illustrated in FIG. 32A. With respect to the first group that does not include a failed signal path, the first main signal MS1 may be transferred through the first main signal path MSP1 and the first sub signal SS1 may be transferred through the first sub signal path SSP1. With respect to the second group that includes a failed signal path, the second main signal MS2 may be transferred through the second sub signal path MSP2. The first and second path selection signals PSL11 and PSL12 may maintain the deactivated logic low level L and thus the first and second conversion units CU11 and CU12 may select the terminal '1'. The third and fourth path selection signals PSL21 and PSL22 may be activated in the logic high level H and thus the third and fourth conversion units CU21 and CU22 may select the terminal '2'. As a result, the first and second main signals MS1 and MS2 may be transferred through the respective input-output nodes ND11 and ND21 of the internal circuit as the case when the failed signal path does not exist. The first sub signal SS1 may be transferred through the input-output node ND12 of the internal circuit as the case when the failed signal path does not exist, and the sub operation using the first sub signal SS1 may be performed. However, the second sub signal SS2 may not be transferred and the sub operation using the second sub signal SS2 may be stopped. The firs block control signal BLK1 maintain the deactivated logic low level L, and the second conversion unit CU12 corresponding to the sub conversion unit of the first group may be electrically connected to the second input-output node ND12 of the internal circuit. The second block control signal BLK2 may be activated in the logic high level H, and the forth conversion unit CU22 corresponding to the sub conversion unit of the second group may block or disable the electrical connection to the fourth input-output node ND22 of the internal circuit.

For example, the first main signal path MSP1 pertaining to the first group and the second sub signal path SSP2 pertaining to the second group may be failed signal paths as illustrated in FIG. 32B. With respect to the first group, the first main signal MS1 may be transferred through the first sub signal path SSP1. With respect to the second group, the second main signal MS2 may be transferred through the second main signal path MSP2. The third path selection signal PSL21 may maintain the deactivated logic low level L and thus the third conversion unit CU21 may select the terminal '1'. The first, second and fourth path selection signals PSL11, PSL12 and PSL22 may be activated in the logic high level H and thus the first, second and fourth conversion units CU11, CU12 and CU22 may select the terminal '2'. As a result, the first and second main signals MS1 and MS2 may be transferred through the respective input-output nodes ND11 and ND21 as the case when the failed signal path does not exist. The first and second sub signals SS1 and SS2 may not be transferred and the sub operations using the first and second sub signal SS1 and SS2 may be stopped. The first and second block control signals BLK1 and BLK2 may be activated in the logic high level H, and the second and forth conversion units CU12 and CU22 corresponding to the sub conversion units of the respective groups may block or disable the electrical connection to the second and fourth input-output nodes ND12 and ND22 of the internal circuit.

As illustrated in FIGS. 32A and 32B, in the first repair mode that does not support the repair signal path, the failed signal path may be repaired using the sub signal path. The repair circuit including the path conversion circuit 304 of FIG. 30 may perform the shifting repair operation to repair the failed input-output terminal corresponding to the failed signal path among the main input-output terminals TN11 and TN21, using the sub input-output terminals TN1 and TN22.

Figure 33:
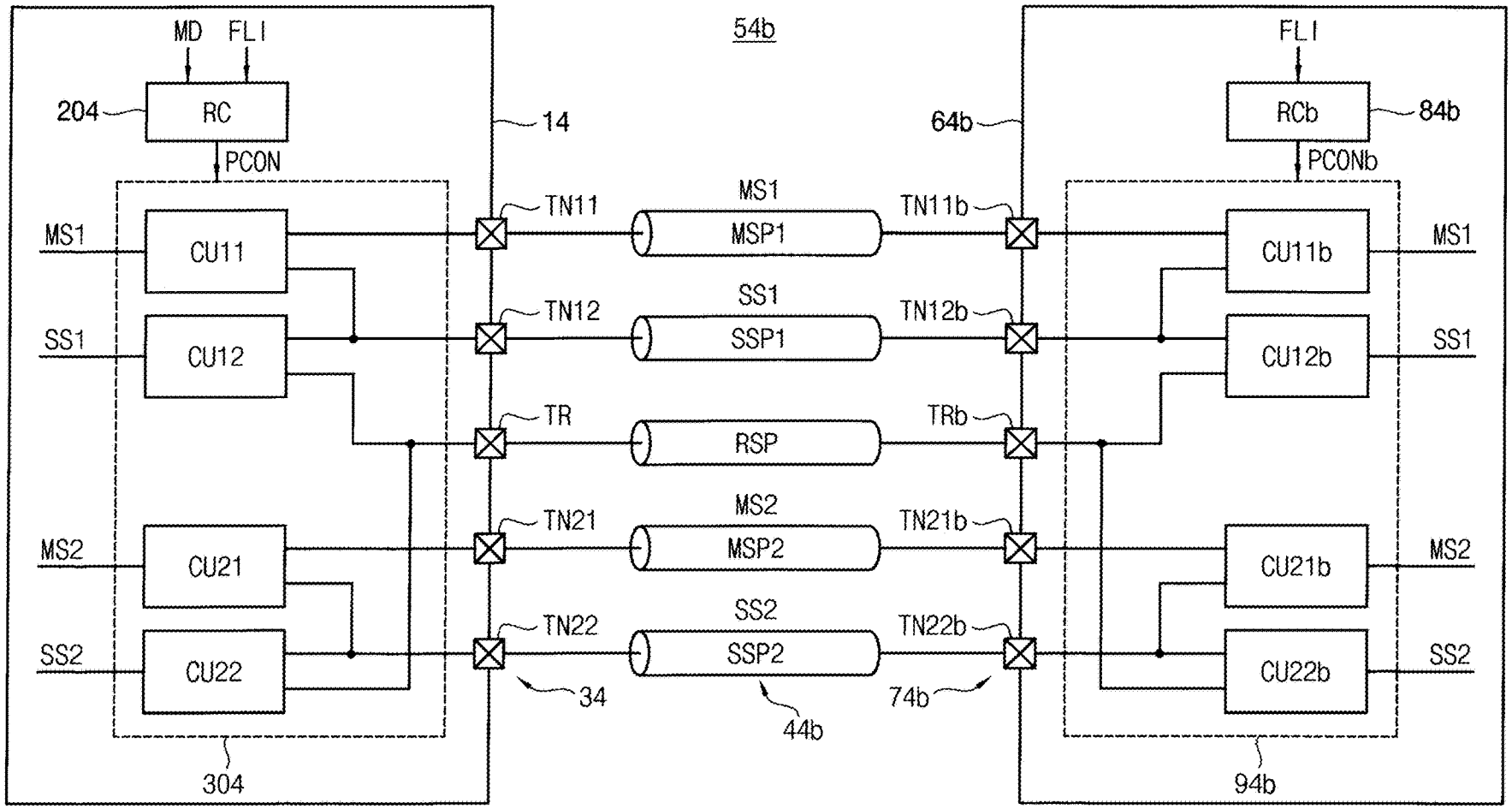
FIG. 33 is a block diagram illustrating a system including the path conversion circuit of FIG. 30 and supporting a repair signal path according to some example embodiments.

FIG. 33 is a block diagram illustrating a system including the path conversion circuit of FIG. 30 and supporting a repair signal path according to an example embodiment.

Referring to FIG. 33, a system 54b may include a first sub system 14, a second sub system 64b and a signal path set 44b connecting the first sub system 14 and the second sub system 64b.

The first sub system 14 may have a configuration capable of selectively operating in the first repair mode without using the repair input-output terminal or in the second repair mode using the repair input-output terminal. The first system 14 may include an input-output terminal set 34, a repair controller RC 204 and a path conversion circuit 304. The internal circuit of the first sub system 14 is omitted for convenience of illustration.

The input-output terminal set 34 may include a first plurality of normal input-output terminals TN11 and TN12 pertaining to a first group, a second plurality of normal input-output terminals TN21 and TN22 pertaining to a second group and an input-output terminal TR commonly assigned to the groups. The repair controller 204 may generate a path control signal PCON based on a mode signal MD and fail information signal FLI. The path conversion circuit 304 may control electrical connections between the input-output terminal set 34 and the internal circuit of the first sub system 14 in response to the path control signal PCON.

As described with reference to FIG. 30, the path conversion circuit 304 may include a plurality of conversion units CU11, CU12, CU21 and CU22 where each of the conversion units CU11, CU12, CU21 and CU22 may control an electrical connection between each of the input-output node ND11, ND12, ND21 and ND22 of the internal circuit and two or more input-output terminals in the input-output terminal set 34 in response to each of the path selection signals PSL11, PSL12, PSL21 and PSL22.

The second sub system 64b may have a configuration that supports the repair signal path. The second sub system 64b may include an input-output terminal set 74b, a repair controller RCb 84b and a path conversion circuit 94b. The internal circuit of the second sub system 64b is omitted for convenience of illustration.

The input-output terminal set 74b may include a plurality of normal input-output terminals TN11b, TN12b, TN21b and TN22b and a repair input-output terminal TRb. The repair controller 84b may generate a path control signal PCONb based on the fail information signal FLI. The path conversion circuit 94b may control electrical connections between the input-output terminal set 74b and the internal circuit of the second sub system 64b in response to the path control signal PCONb.

Similar to the path conversion circuit 304 of the first sub system 14, the path conversion circuit 94b of the second sub system 64b may include a plurality of conversion units CU11b, CU12b, CU21b and CU22b, and each of the conversion units CU11b, CU12b, CU21b and CU22b may control an electrical connection between each of the input-output node of the internal circuit and two or more input-output terminals in the input-output terminal set 74b in response to each of the path selection signals.

Because the second sub system 64b is fixed to the configuration to support the repair signal path, the repair controller 84b of the second sub system 64b may not receive the mode signal MD. The same fail information signal FLI may be provided to the first sub system 14 and the second sub system 64b.

The signal path set 44b may include a plurality of normal signal paths MSP1, MSP2, SSP1 and SSP2 and a repair signal path RSP. The normal signal paths MSP1, MSP2, SSP1 and SSP2 may include first and second main signal paths MSP1 and MSP2 to transfer main signals MS1 and MS2 for a main operation of the first sub system 14 and first and second sub input-output terminals SSP1 and SSP2 to transfer sub signals SS1 and SS2 for sub operations of the first sub system 14. As such, the first and third normal input-output terminals TN11 and TN21 may be referred to as main input-output terminals and the second and fourth normal input-output terminals TN12 and TN22 may be referred to as sub input-output terminals. The first and third conversion units CU11 and CU21 may be referred to as main conversion units and the second and fourth conversion units CU12 and CU22 may be referred to as sub conversion units.

FIG. 33 illustrates a signal transfer when the normal signal paths MSP1, MSP2, SSP1 and SSP2 do not include the failed signal path. The repair function may be disabled when the failed signal path does not exist, the first and second main signals MS1 and MS2 may be transferred through the respective main signal paths MSP1 and MSP2, and the first and second sub signals SS1 and SS2 may be transferred through the respective sub signal paths SSP1 and SSP2.

Figure 34A:
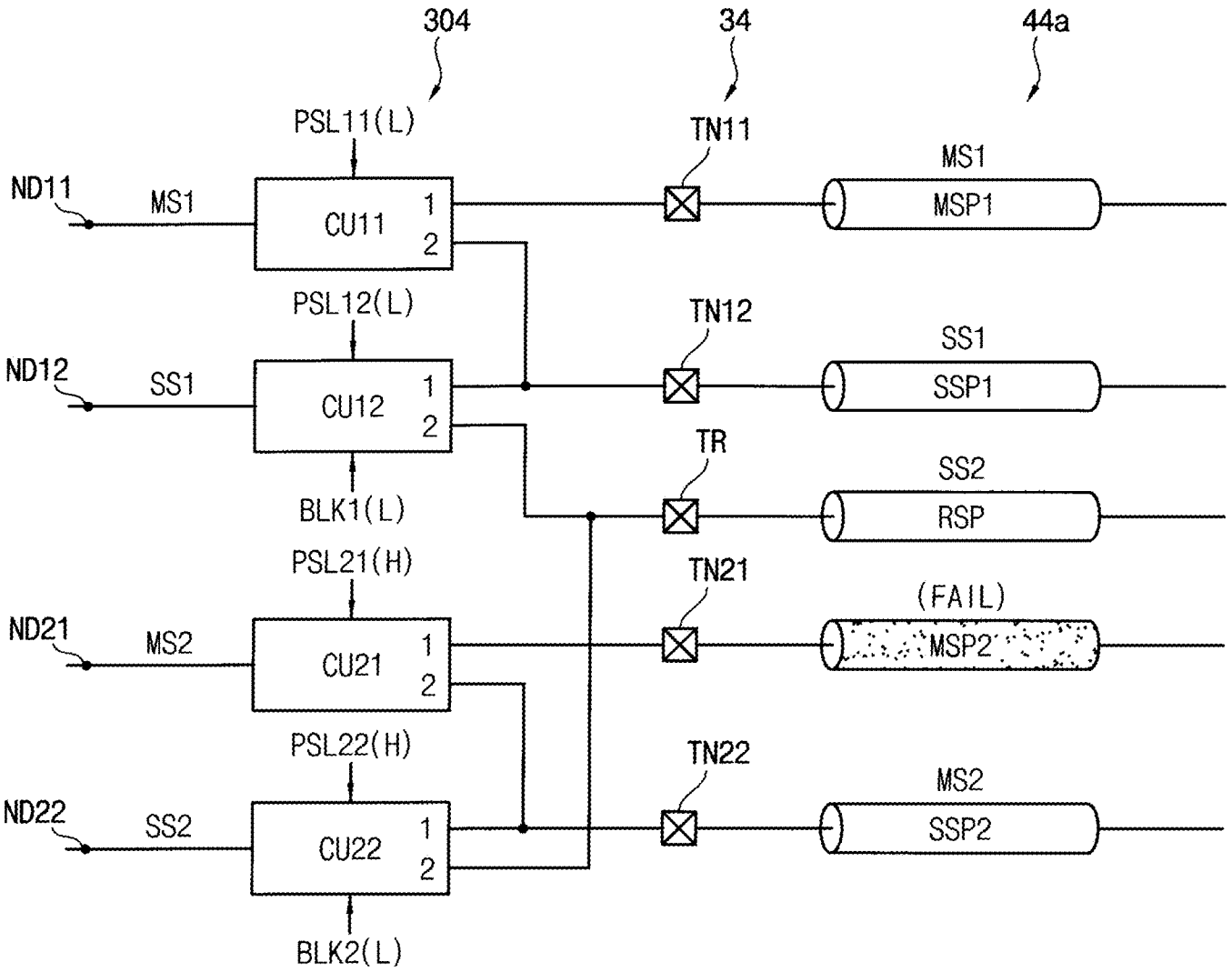
FIGS. 34A and 34B are diagrams for describing a repair operation of the system of FIG. 28 according to some example embodiments.
Figure 34B:
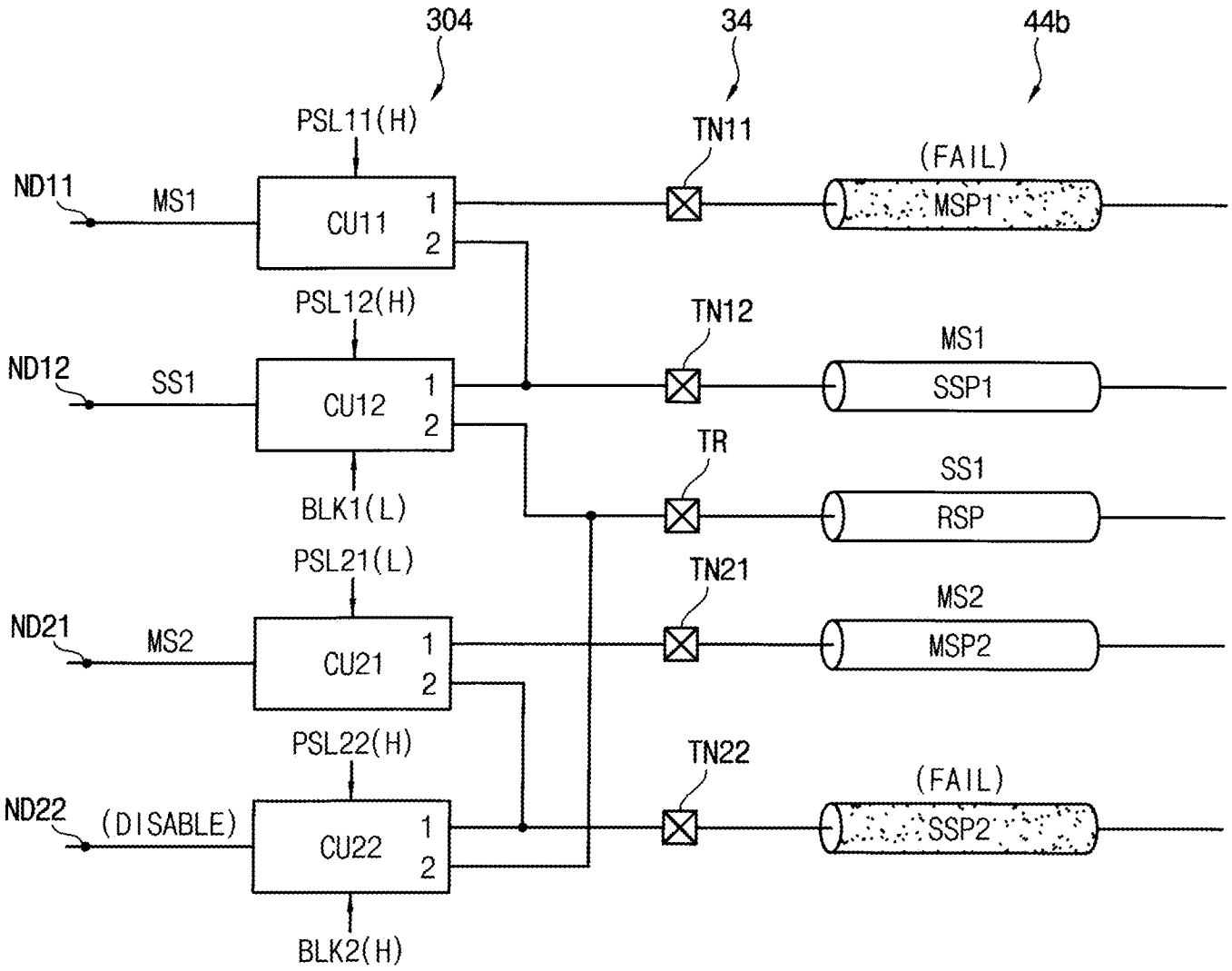

FIGS. 34A and 34B are diagrams for describing a repair operation of the system of FIG. 28.

For example, the second main signal path MSP2 pertaining the second group may be a failed signal path as illustrated in FIG. 34A. With respect to the first group that does not include a failed signal path, the first main signal MS1 may be transferred through the first main signal path MSP1 and the first sub signal SS1 may be transferred through the first sub signal path SSP1. With respect to the second group that includes a failed signal path, the second main signal MS2 may be transferred through the second sub signal path MSP2 and the second sub signal SS2 may be transferred through the repair signal path RSP. The first and second path selection signals PSL11 and PSL12 may maintain the deactivated logic low level L and thus the first and second conversion units CU11 and CU12 may select the terminal '1'. The third and fourth path selection signals PSL21 and PSL22 may be activated in the logic high level H and thus the third and fourth conversion units CU21 and CU22 may select the terminal '2'. As a result, the first and second main signals MS1 and MS2 and the first and second sub signals SS1 and SS2 may be transferred through the respective input-output nodes ND11, ND12, ND21 and ND22 of the internal circuit as the case when the failed signal path does not exist. The first and second block control signals BLK1 and BLK2 may maintain the deactivated logic low level L, and the second and forth conversion units CU12 and CU22 corresponding to the sub conversion units may be electrically connected to the second and fourth input-output node ND12 and ND22 of the internal circuit.

For example the first main signal path MSP1 pertaining to the first group and the second sub signal path SSP2 pertaining to the second group may be failed signal paths as illustrated in FIG. 34B. With respect to the first group, the first main signal MS1 may be transferred through the first sub signal path SSP1 and the first sub signal SS1 may be transferred through the repair signal path RSP. With respect to the second group, the second main signal MS2 may be transferred through the second main signal path MSP2. The third path selection signal PSL21 may maintain the deactivated logic low level L and thus the third conversion unit CU21 may select the terminal '1'. The first, second and fourth path selection signals PSL11, PSL12 and PSL22 may be activated in the logic high level H and thus the first, second and fourth conversion units CU11, CU12 and CU22 may select the terminal '2'. As a result, the first and second main signals MS1 and MS2 and the first and second sub signals SS1 and SS2 may be transferred through the respective input-output nodes ND11, ND12, ND21 and ND22 of the internal circuit as the case when the failed signal path does not exist.

The first sub signal SS1 may be transferred through the input-output node ND12 of the internal circuit and the sub operation using the first sub signal SS1 may be performed. The second sub signal SS2 may not be transferred and the sub operations using the second sub signal SS2 may be stopped. The first block control signal BLK1 may maintain the deactivated logic low level L and the second conversion unit CU12 corresponding to the sub conversion unit of the first group may be electrically connected to the second input-output node ND12 of the internal circuit. The second block control signal BLK2 may be activated in the logic high level H, and the forth conversion unit CU22 corresponding to the sub conversion units of the second group may block or disable the electrical connection to the fourth input-output node ND22 of the internal circuit.

As illustrated in FIGS. 34A and 34B, in the second repair mode that supports the repair signal path, the failed signal path may be repaired using the repair signal path commonly assigned to the groups. The repair circuit including the path conversion circuit 304 of FIG. 30 may perform the shifting repair operation to repair the failed input-output terminal corresponding to the failed signal path among the normal input-output terminals TN11, TN12, TN21 and TN22, using the repair input-output terminal TR.

The shifting repair operation of FIGS. 3 through 13 have been described with respect to the example embodiments that the normal input-output terminals are divided into a plurality of groups with reference to FIGS. 25 through 34B. In the same way, it would be understood that the multiplexing repair operation of FIGS. 4 through 24 may be applied to some example embodiments that the normal input-output terminals are divided into a plurality of groups.

Figure 35:
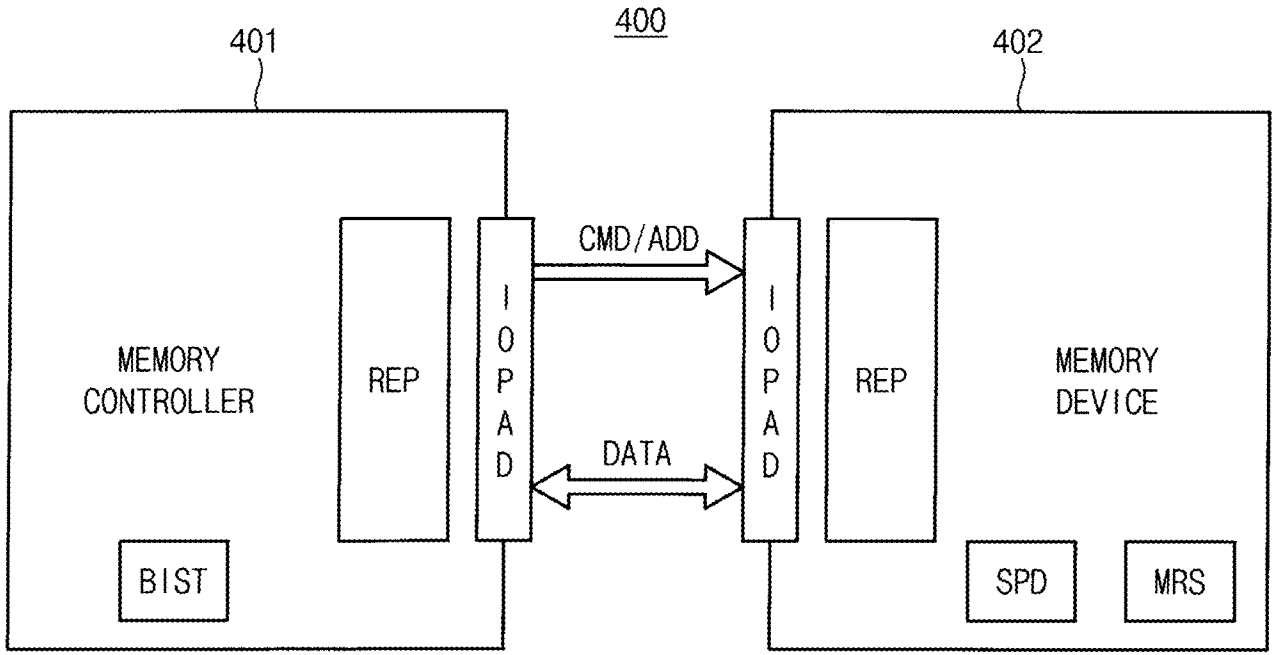
FIG. 35 is a block diagram illustrating a memory system including a repair circuit according to some example embodiments.

FIG. 35 is a block diagram illustrating a memory system including a repair circuit according to some example embodiments.

Referring to FIG. 35, a memory system 400 may include a memory controller 401 and a memory device 402. The internal circuits performing the respective functions of the memory controller 401 and the memory device 402 are omitted for convenience of illustration.

The memory controller 401 and the memory device 402 may include respective input-output terminal sets IOPAD and transfer command-address signals CMD/ADD and data signals DATA through signal paths connecting the input-output terminal sets IOPAD. The memory controller 401 and the memory device 402 may include respective repair circuits REP or interface circuits connected to the respective input-output terminal sets IOPAD. At least one of the repair circuits REP may be an adaptive repair circuit that may repair various systems adopting different repair schemes according to some example embodiments as described above.

The memory controller 401 may include a built-in self-test circuit BIST for providing the fail information. The built-in self-test circuit BIST may test the signal paths connecting the memory controller 401 and the memory device 402 in case of rebooting the system 400 to provide the fail information.

The memory device 401 may include a serial-presence detect device SPD and/or a mode register set MRS. The product information of the memory device 402 may be stored in the serial-presence detect device SPD or an electrically-erasable-programmable read-only memory (EEPROM) device. The serial-presence detect device SPD may store data for representing various characteristics of the memory device 402. For example, the serial-presence detect device SPD may store the information on the repair scheme that is supported by the memory device 402 and the serial-presence detect device SPD may provide the information on the repair scheme to the memory controller 401 or a basic input-output system (BIOS) of a computing system including the memory system 400. The built-in self-test circuit BIST may the fail information on the signal paths to the memory device 402 in addition to the internal circuit of the memory controller 401, and the provided fail information may be stored in the mode register set MRS.

Figure 36:
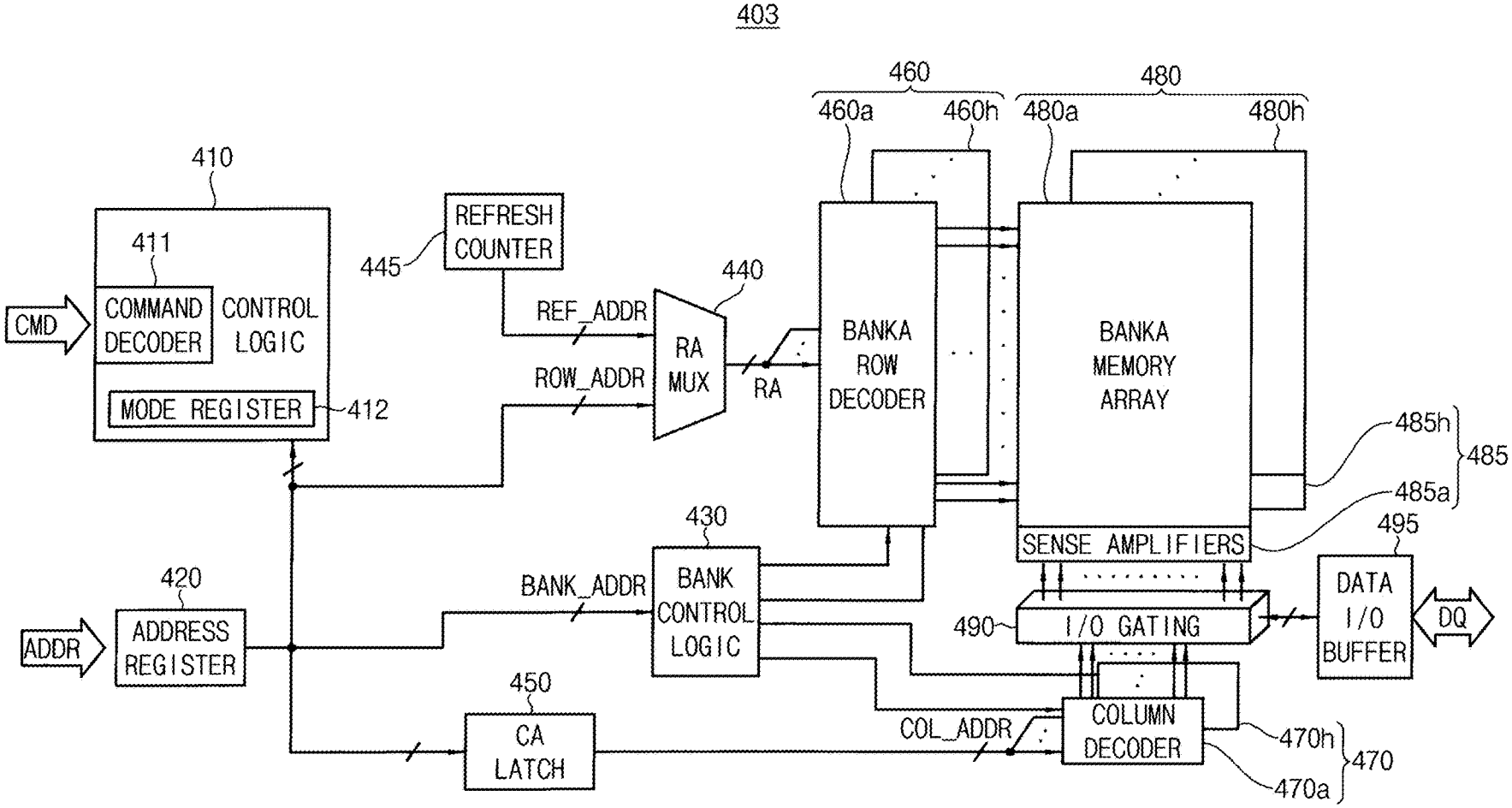
FIG. 36 is a block diagram illustrating an example of an internal circuit of a memory device in the memory system of FIG. 35 according to some example embodiments.

FIG. 36 is a block diagram illustrating an example of an internal circuit of a memory device in the memory system of FIG. 35 according to an example embodiment.

Referring to FIG. 36, an internal circuit 403 of a memory device may include a control logic 410, an address register 420, a bank control logic 430, a row address multiplexer 440, a column address latch 450, a row decoder 460, a column decoder 470, a memory cell array 480, a sense amplifier unit 485, an input/output (I/O) gating circuit 490, a data input/output (I/O) buffer 495, and a refresh counter 445.

The memory cell array 480 may include a plurality of bank arrays 480a~480h. The row decoder 460 may include a plurality of bank row decoders 460a~460h respectively coupled to the bank arrays 480a~480h, the column decoder 470 may include a plurality of bank column decoders 470a~470h respectively coupled to the bank arrays 480a~480h, and the sense amplifier unit 485 may include a plurality of bank sense amplifiers 485a~485h respectively coupled to the bank arrays 480a~480h.

The address register 420 may receive an address ADDR including a bank address BANK_ADDR, a row address ROW_ADDR and a column address COL_ADDR from the memory controller. The address register 420 may provide the received bank address BANK_ADDR to the bank control logic 430, may provide the received row address ROW_ADDR to the row address multiplexer 440, and may provide the received column address COL_ADDR to the column address latch 450.

The bank control logic 430 may generate bank control signals in response to the bank address BANK_ADDR. One of the bank row decoders 460a~460h corresponding to the bank address BANK_ADDR may be activated in response to the bank control signals, and one of the bank column decoders 470a~470h corresponding to the bank address BANK_ADDR may be activated in response to the bank control signals.

The row address multiplexer 440 may receive the row address ROW_ADDR from the address register 420, and may receive a refresh row address REF_ADDR from the refresh counter 445. The row address multiplexer 440 may selectively output the row address ROW_ADDR or the refresh row address REF_ADDR as a row address RA. The row address RA that is output from the row address multiplexer 440 may be applied to the first through eighth bank row decoders 460a~460h.

The activated one of the bank row decoders 460a~460h may decode the row address RA that is output from the row address multiplexer 440, and may activate a word-line corresponding to the row address RA. For example, the activated bank row decoder may apply a word-line driving voltage to the word-line corresponding to the row address RA.

The column address latch 450 may receive the column address COL_ADDR from the address register 420, and may temporarily store the received column address COL_ADDR. In some embodiments, in a burst mode, the column address latch 450 may generate column addresses that increment from the received column address COL_ADDR. The column address latch 450 may apply the temporarily stored or generated column address to the bank column decoders 470a-470h.

The activated one of the bank column decoders 470a~470h may decode the column address COL_ADDR that is output from the column address latch 450, and may control the input/output gating circuit 490 in order to output data corresponding to the column address COL_ADDR.

The I/O gating circuit 490 may include a circuitry for gating input/output data. The I/O gating circuit 490 may further include read data latches for storing data that is output from the bank arrays 480a~480h, and write drivers for writing data to the bank arrays 480a~480h.

Data to be read from one bank array of the bank arrays 480a~480h may be sensed by a sense amplifier coupled to the one bank array from which the data is to be read, and may be stored in the read data latches. The data stored in the read data latches may be provided to the memory controller via the data I/O buffer 495. Data DQ to be written in one bank array of the bank arrays 480a~480h may be provided to the data I/O buffer 495 from the memory controller. The write driver may write the data DQ in one bank array of the first through eighth bank arrays 480a~480h.

The control logic 410 may control operations of the memory device. For example, the control logic 410 may generate control signals for the memory device in order to perform a write operation or a read operation. The control logic 410 may include a command decoder 411 that decodes a command CMD received from the memory controller via the buffer chip 450 and a mode register set 412 that sets an operation mode of the memory device.

For example, the command decoder 411 may generate the control signals corresponding to the command CMD by decoding a write enable signal (/WE), a row address strobe signal (/RAS), a column address strobe signal (/CAS), a chip select signal (/CS), etc. The mode register set 412 may store the above described fail information, the product information such as the repair scheme of the memory controller 401, tec. In some example embodiments, the above described mode signal MD and/or fail information signal FLI may be generated based on the values stored in the mode register set 412.

Figure 37:
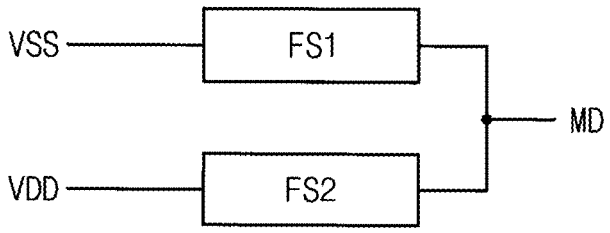
FIG. 37 is a diagram illustrating an example embodiment of a fuse circuit providing a mode signal according to some example embodiments.

FIG. 37 is a diagram illustrating an example embodiment of a fuse circuit providing a mode signal.

A fuse circuit of FIG. 37 may be programmed selectively depending on the repair scheme of the external device to provide the mode signal MD. For example, the fuse circuit may be included in the memory device 402 in FIG. 35 and may include a first fuse FS1 and a second fuse FS2 that are programmed selectively depending on the repair scheme of the memory controller 401. If the memory controller 401, which is connected to the memory device 402, does not support a repair signal path, the first fuse FS1 may be cut and the second fuse FS2 may be electrically connected to provide the mode signal MD of the logic high level H corresponding to the power supply voltage VDD. In contrast, if the memory controller 401 supports a repair signal path, the first fuse FS1 may be electrically connected and the second fuse FS2 may be cut to provide the mode signal MD of the logic low level L corresponding to the ground voltage VSS.

In some example embodiments, the type of the repair scheme may be determined when the system is established and the logic level of the mode signal MD may be fixed using the fuse circuit as described with reference to FIG. 37. In other example embodiments, the information on the repair scheme of the system may be stored in the mode register set as described with reference to FIGS. 35 and 36 and the logic level of the mode signal MD may be determined based on the information stored in the mode register set.

Figure 38:
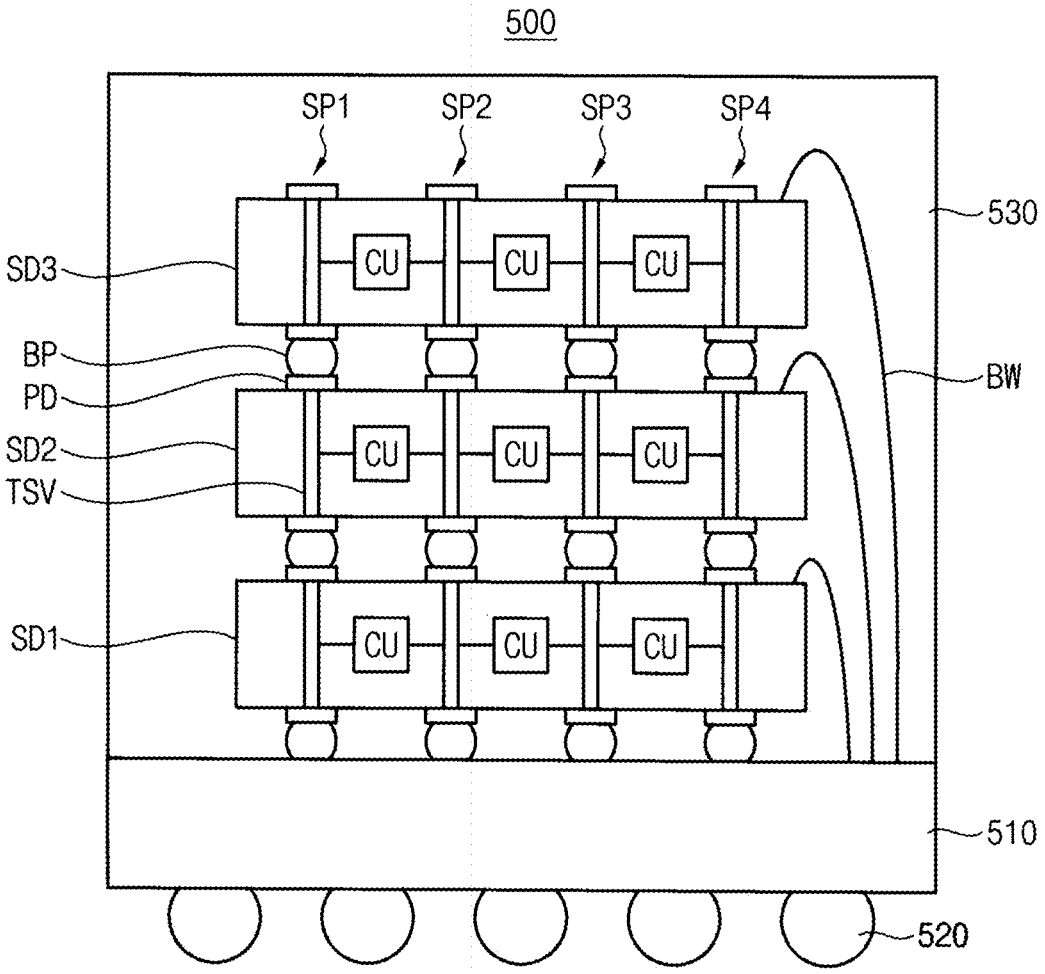
FIG. 38 is a diagram illustrating a stacked memory chip according to some example embodiments.

FIG. 38 is a diagram illustrating a stacked memory chip according to some example embodiments.

Referring to FIG. 38, a stacked memory chip 500 may include a base substrate 510 and a plurality of semiconductor dies SD1, SD2 and SD3 stacked on the base substrate 510. FIG. 38 illustrates the three semiconductor dies SD1, SD2 and SD3 but the number of the semiconductor dies changed variously.

The base substrate 510 may be a printed circuit board (PCB). External connecting members 520, e.g., conductive bumps, may be formed on a lower surface of the base substrate 510. The semiconductor dies SD1, SD2 and SD3 may be electrically connected to each other and to an external device such as a memory controller through a plurality of signal paths SP1~SP4. Each of the signal paths SP1~SP4 may include at least one conductive pad PD, at least one conductive bump BP, at least one through-silicon via TSV, etc. The signal paths SP1~SP4 may include normal signal paths and at least one sub signal path as described above. The semiconductor dies SD1, SD2 and SD3 may be connected to the base substrate 510 through bonding wires BW in addition to the signal paths SP1~SP4. The stacked semiconductor dies SD1, SD2 and SD3 may be packaged using the sealing member 530.

Each of the semiconductor dies SD1, SD2 and SD3 may include an internal circuit configured to perform its own functions, an input-output terminal set and a repair circuit, as described above. The input-output terminal set includes a plurality of normal input-output terminals connected to the external device via a plurality of normal signal paths and at least one repair signal path selectively connected to the external device via at least one repair signal path. The repair circuit repairs at least one failed signal path included in the normal signal paths based on the mode signal MD and fail information signal FLI. The mode signal MD represents whether to use the repair signal path and the fail information signal FLI represents the fail information on the normal signal paths. The conversion units CU included in the repair circuit are illustrated in FIG. 38, and the internal circuits, the repair controller, etc. are omitted for convenience of illustration.

The stacked memory chip 500 including the adaptive repair circuit may support the different repair schemes using the same configuration and thus cost of designing and manufacturing various systems may be reduced.

Figure 39:
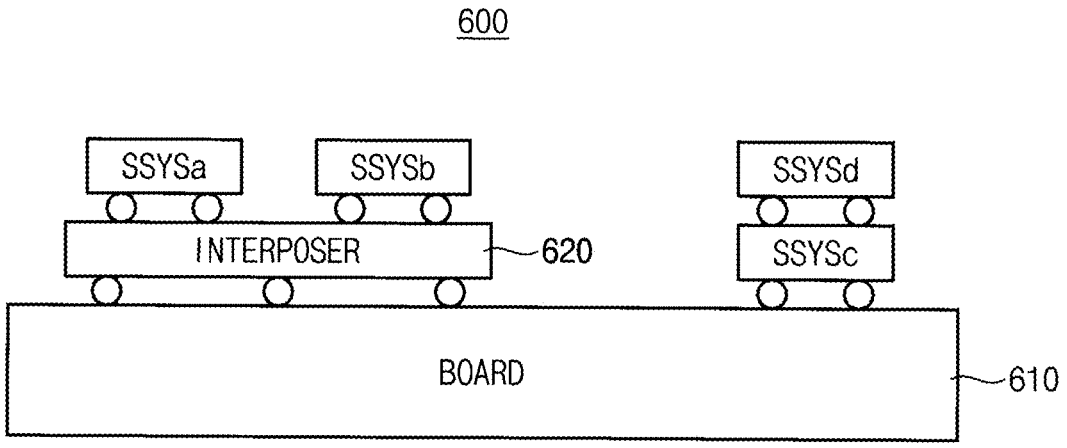
FIG. 39 is a diagram illustrating a system according to some example embodiments.

FIG. 39 is a diagram illustrating a system according to some example embodiments.

Referring to FIG. 39, a system 600 includes a board 610 and a plurality of sub systems SSYSa, SSYSb, SSYSc and SSYSd that are mounted on the board 610.

For example, the first sub system SSYSa and the second sub system SSYSb may be mounted on an interposer 620 that is mounted on the board 610, and the first sub system SSYSa and the second sub system SSYSb may be connected through signal lines or signal paths that are formed at the interposer 620. For example, the fourth sub system SSYSd may be stacked on the third sub system SSYSc to form a structure of package on package (PoP). The interposer 620 and the PoP may be connected through signal bus lines that are formed at the board 610.

At least one of the sub systems SSYSa, SSYSb, SSYSc and SSYSd may include an adaptive repair circuit according to some example embodiments as described above. Using the adaptive repair circuit, different repair schemes may be supported using the same configuration of the adaptive repair circuit and thus cost of designing and manufacturing various systems may be reduced.

Figure 40:
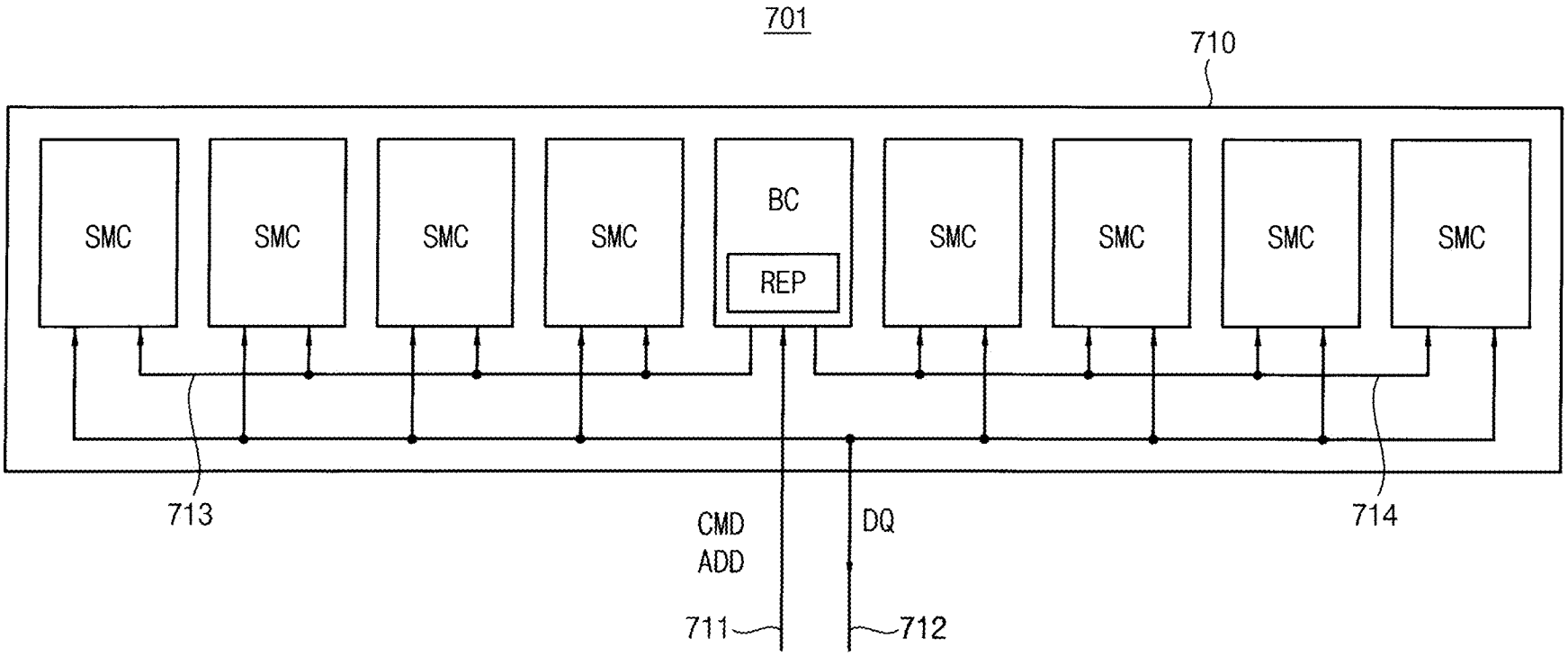
FIGS. 40 and 41 are diagrams illustrating a memory module according to some example embodiments.
Figure 41:
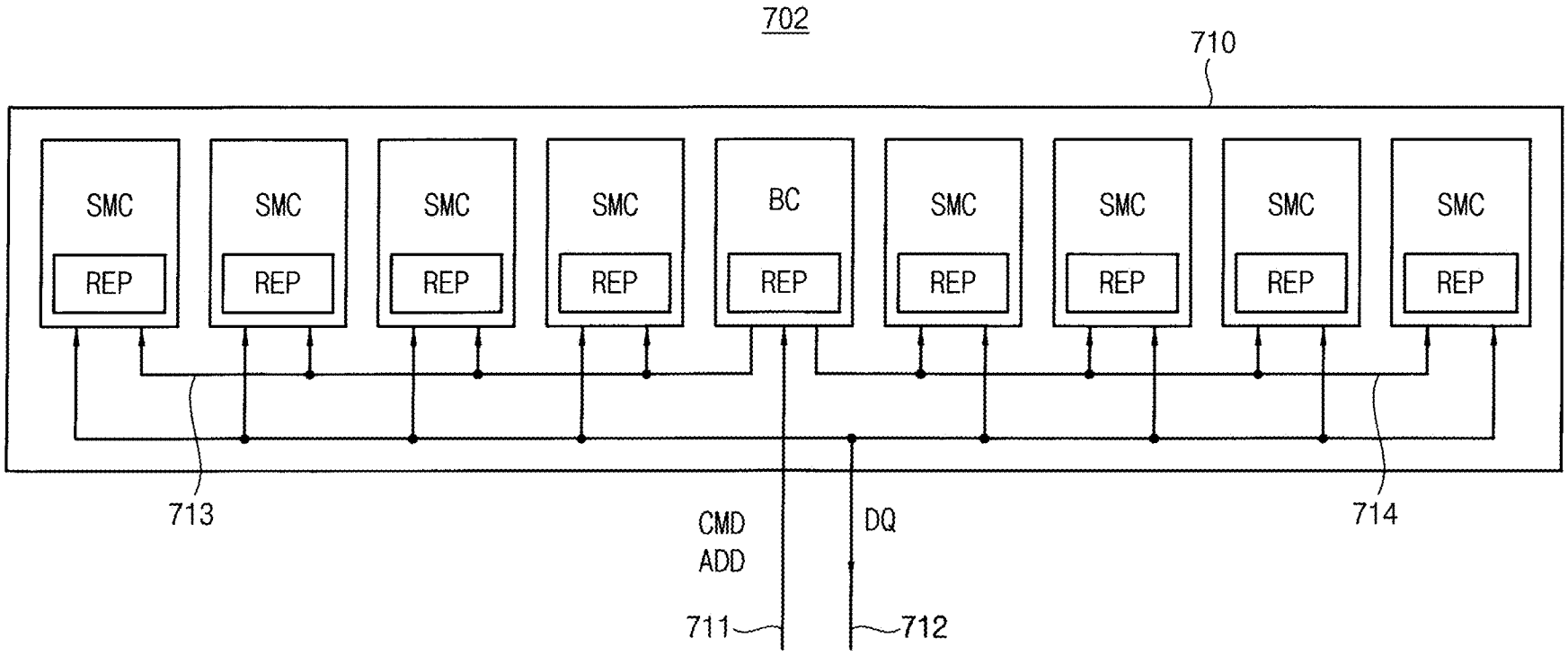

FIGS. 40 and 41 are diagrams illustrating a memory module according to some example embodiments.

Referring to FIGS. 40 and 41, memory modules 701 and 702 may include a module board 710, a plurality of semiconductor memory chips SMC and a buffer chip BC.

The semiconductor memory chips SMC may be mounted on the module board 710 and each of the semiconductor memory chips SMC may receive data DQ from an external device such as a memory controller through a data bus 712 in a write mode, or transmit the data DQ to the external device through the data bus 712 in a read mode.

The buffer chip BC may be mounted on the module board and the buffer chip BC may receive command signals CMD and address signals ADD through a control bus 711 to provide the received signals CMD and ADD to the semiconductor memory chips SMC through internal buses 713 and 714. The buffer chip BC may include a register to store control information of the memory modules 701 and 702.

In some example embodiments, as illustrated in FIG. 40, the buffer chip BC may include an adaptive repair circuit REP according to some example embodiments. Using the adaptive repair circuit, the signal paths for transferring the command signals CMD and the address signals ADD may be repaired efficiently.

In other example embodiments, as illustrated in FIG. 41, the semiconductor memory chips SMC may include an adaptive repair circuit REP according to some example embodiments. Using the adaptive repair circuit, the signal paths for transferring the data DQ may be repaired efficiently.

Figure 42:
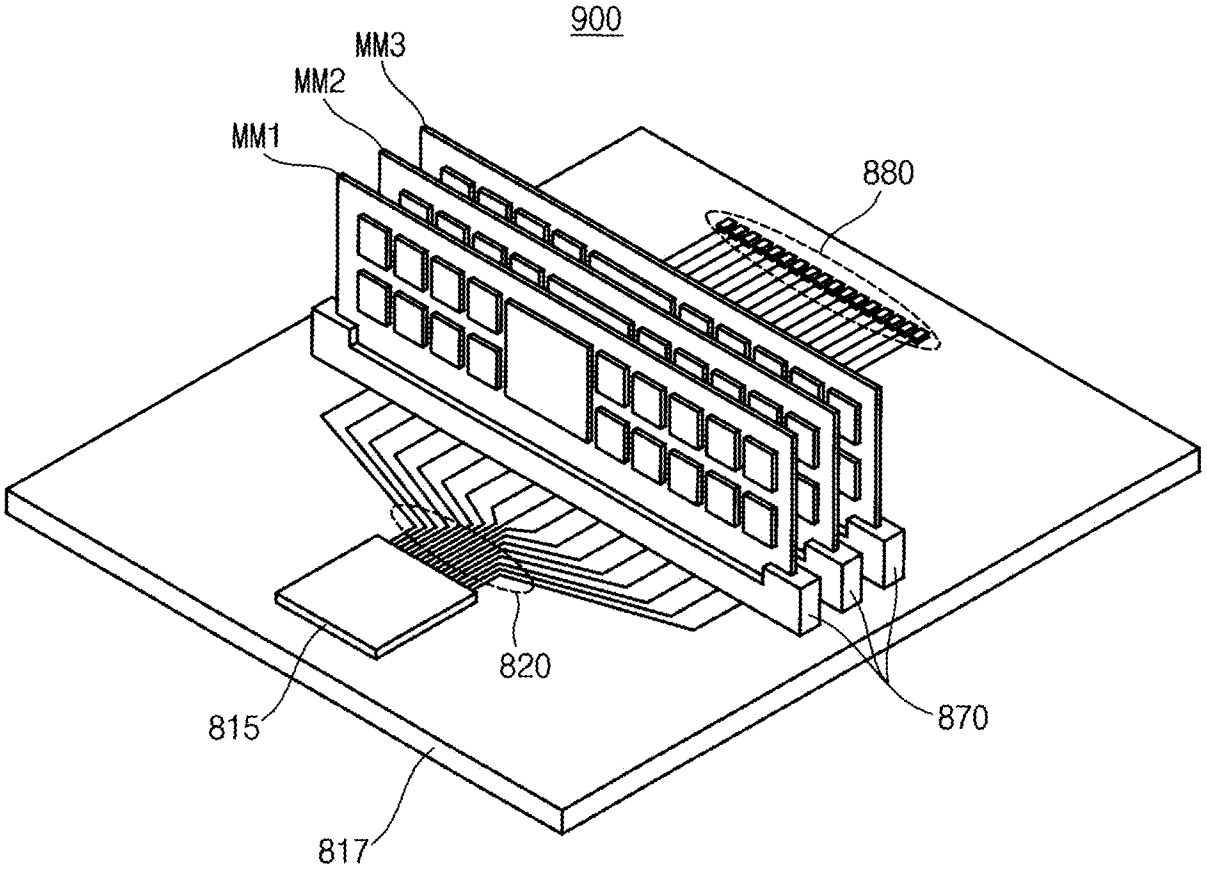
FIG. 42 is a diagram illustrating a memory system according to some example embodiments.

FIG. 42 is a diagram illustrating a memory system according to some example embodiments.

FIG. 42 illustrates a memory system 900 in which a memory controller 815 and a plurality of connecting sockets 870, which are mounted on a main board 817, are connected through a system bus 20. A desired number of the memory modules MM1, MM2 and MM3 may be coupled in the connecting sockets. Termination resistors 880 may be disposed on the main board 817 for impedance matching.

For cases that a failed signal path exists in the system bus 820 connecting the memory controller 815 and the memory modules MM1, MM2 and MM3, a repair circuit may be included in each of the memory controller 815 and the memory modules MM1, MM2 and MM3 to repair the failed signal path. At least one of the memory controller 815 and the memory modules MM1, MM2 and MM3 may include an adaptive repair circuit according to at least one example embodiment as described above. Using the adaptive repair circuit, the signal paths between the memory controller 815 and the memory modules MM1, MM2 and MM3 may be repaired efficiently.

Figure 43:
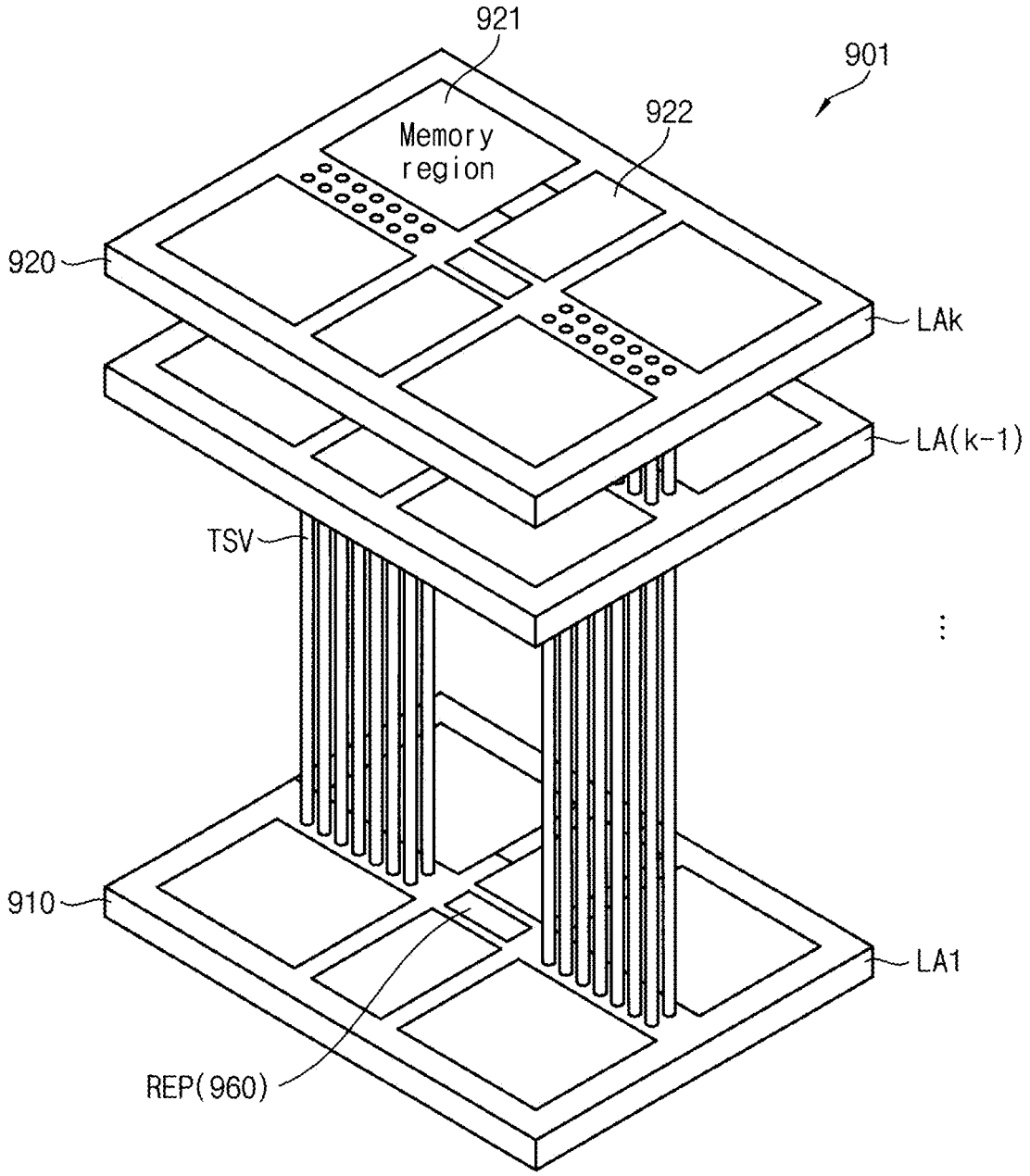
FIG. 43 is a structural diagram illustrating a semiconductor memory device according to some example embodiments.

FIG. 43 is a structural diagram illustrating a semiconductor memory device according to some example embodiments.

Referring to FIG. 43, a semiconductor memory device 901 may include first through kth semiconductor integrated circuit layers LA1 through LAk, in which the lowest first semiconductor integrated circuit layer LA1 is assumed to be an interface or control chip and the other semiconductor integrated circuit layers LA2 through LAk are assumed to be slave chips including core memory chips. The first through kth semiconductor integrated circuit layers LA1 through LAk may transmit and receive signals between the layers by through-substrate vias (e.g., through-silicon vias TSVs). The lowest first semiconductor integrated circuit layer LA1 as the interface or control chip may communicate with an external memory controller through a conductive structure formed on an external surface.

The first semiconductor integrated circuit layer 610 through the kth semiconductor integrated circuit layer 620 may include memory regions 921 and peripheral circuits 922 for driving the memory regions 921. For example, the peripheral circuits 922 may include a row-driver for driving wordlines of a memory, a column-driver for driving bit lines of the memory, a data input/output unit for controlling input/output of data, a command buffer for receiving a command from outside and buffering the command, and an address buffer for receiving an address from outside and buffering the address.

The first semiconductor integrated circuit layer 910 may further include a control circuit. The control circuit may control an access to the memory region 921 based on a command and an address signal from a memory controller and may generate control signals for accessing the memory region 921.

The first semiconductor integrated circuit layer 910 through the kth semiconductor integrated circuit layer 620 may include an adaptive repair circuit REP 960 according to at least one example embodiment as described above. Using the adaptive repair circuit 960, the failed signal path in the signal paths between the memory controller and semiconductor memory device 901 may be repaired efficiently.

Figure 44:
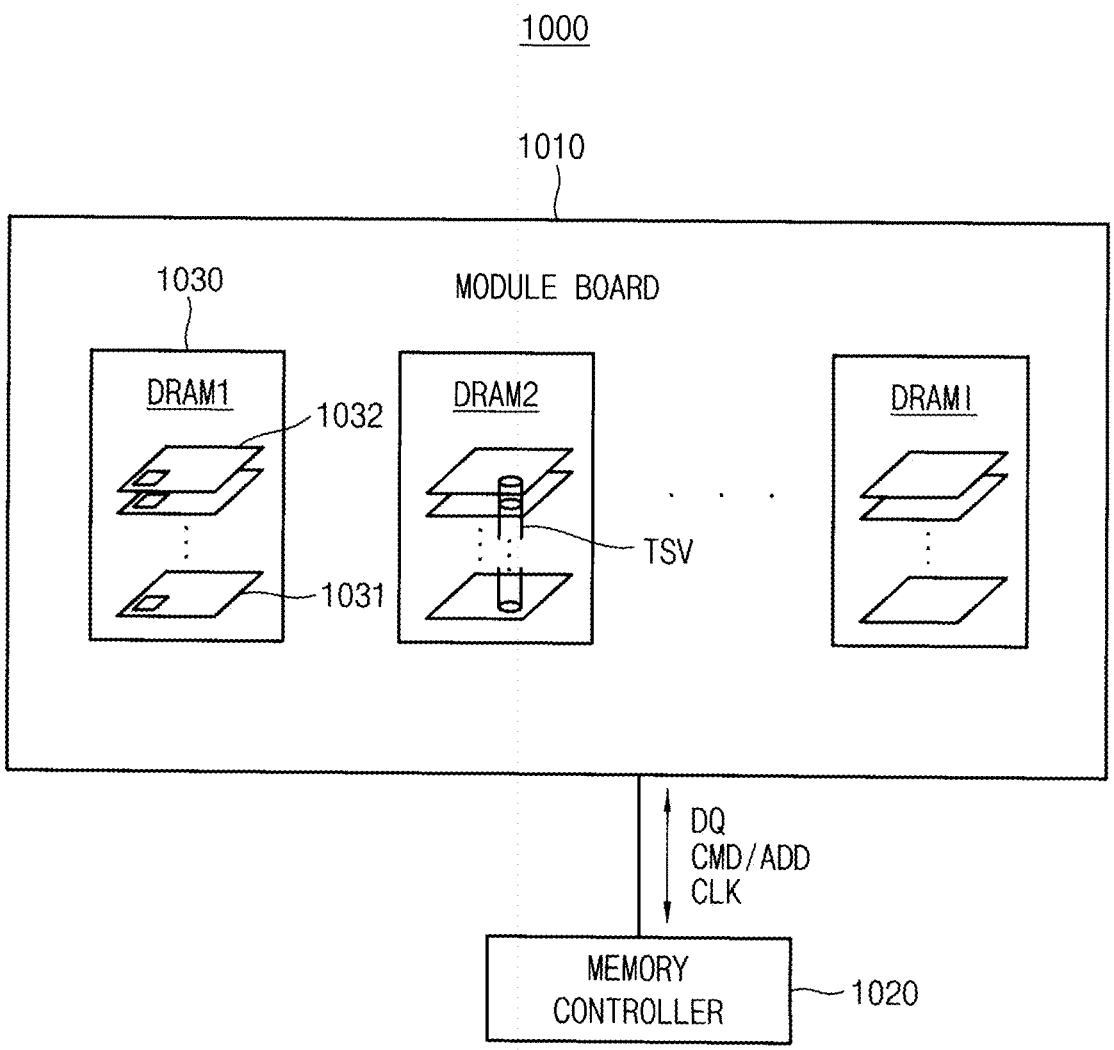
FIG. 44 is a block diagram illustrating a memory system according to some example embodiments.

FIG. 44 is a block diagram illustrating a memory system according to some example embodiments.

Referring to FIG. 44, a memory system 1000 may include a memory module 1010 and a memory controller 1020. The memory module 1010 may include at least one semiconductor memory device 1030 mounted on a module board. For example, the semiconductor memory device 1030 may be constructed as a DRAM chip. In addition, the semiconductor memory device 1030 may include a stack of semiconductor chips. In this case, the semiconductor chips may include at least one master chip 1031 and at least one slave chip 1032. Signal transfer between the semiconductor chips may be performed via through-substrate vias (e.g., through-silicon vias TSV) and/or bonding wires.

The memory module 1010 may communicate with the memory controller 1020 via a system bus. Data DQ, a command/address CMD/ADD, and a clock signal CLK may be transmitted and received between the memory module 1010 and the memory controller 1020 via the system bus.

At least one of the memory module 1010 and the memory controller 1020 may include an adaptive repair circuit according to some example embodiments as described above. Using the adaptive repair circuit, the failed signal path in the signal paths between the memory controller 1020 and semiconductor memory device 1010 may be repaired efficiently.

Figure 45:
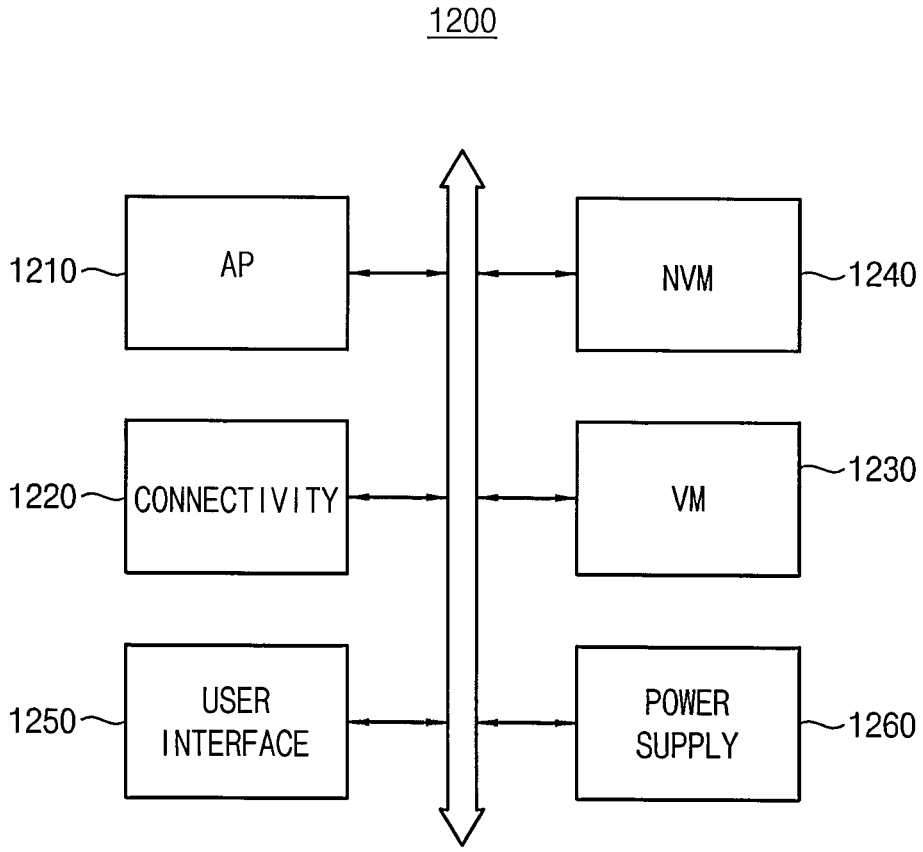
FIG. 45 is a block diagram illustrating a mobile system according to some example embodiments.

FIG. 45 is a block diagram illustrating a mobile system according to some example embodiments.

Referring to FIG. 45, a mobile system 1200 includes an application processor 1210, a connectivity unit 1220, a volatile memory device (VM) 1230, a nonvolatile memory device 1240, a user interface 1250, and a power supply 1260. In some example embodiments, the mobile system 1200 may be a mobile phone, a smart phone, a personal digital assistant (PDA), a portable multimedia player (PMP), a digital camera, a music player, a portable game console, a navigation system, or another type of electronic device.

The application processor 1210 may execute applications such as a web browser, a game application, a video player, etc. In some example embodiments, the application processor 1210 may include a single core or multiple cores. For example, the application processor 1210 may be a multi-core processor such as a dual-core processor, a quad-core processor, a hexa-core processor, etc. The application processor 1210 may include an internal or external cache memory.

The connectivity unit 1220 may perform wired or wireless communication with an external device. For example, the connectivity unit 1220 may perform Ethernet communication, near field communication (NFC), radio frequency identification (RFID) communication, mobile telecommunication, memory card communication, universal serial bus (USB) communication, etc. In some example embodiments, connectivity unit 1220 may include a baseband chipset that supports communications, such as global system for mobile communications (GSM), general packet radio service (GPRS), wideband code division multiple access (WCDMA), high speed downlink/uplink packet access (HSxPA), etc.

The volatile memory device 1230 may store data processed by the application processor 1210, or may operate as a working memory. For example, the volatile memory device 1230 may be a dynamic random access memory, such as DDR SDRAM, LPDDR SDRAM, GDDR SDRAM, RDRAM, etc.

The nonvolatile memory device 1240 may store a boot image for booting the mobile system 1200. For example, the nonvolatile memory device 1240 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.

The user interface 1250 may include at least one input device, such as a keypad, a touch screen, etc., and at least one output device, such as a speaker, a display device, etc. The power supply 1260 may supply a power supply voltage to the mobile system 1200. In some embodiments, the mobile system 1200 may further include a camera image processor (CIS), and/or a storage device, such as a memory card, a solid state drive (SSD), a hard disk drive (HDD), a CD-ROM, etc.

In some example embodiments, the mobile system 1200 and/or components of the mobile system 1200 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), wafer-level processed stack package (WSP), etc.

At least one of the application processor 1210, the connectivity unit 1220, the volatile memory device 1230, the nonvolatile memory device 1240 and the user interface 1250 may include an adaptive repair circuit according to example embodiments as described above. Using the adaptive repair circuit, the failed signal path in the signal paths between the various components may be repaired efficiently.

Figure 46:
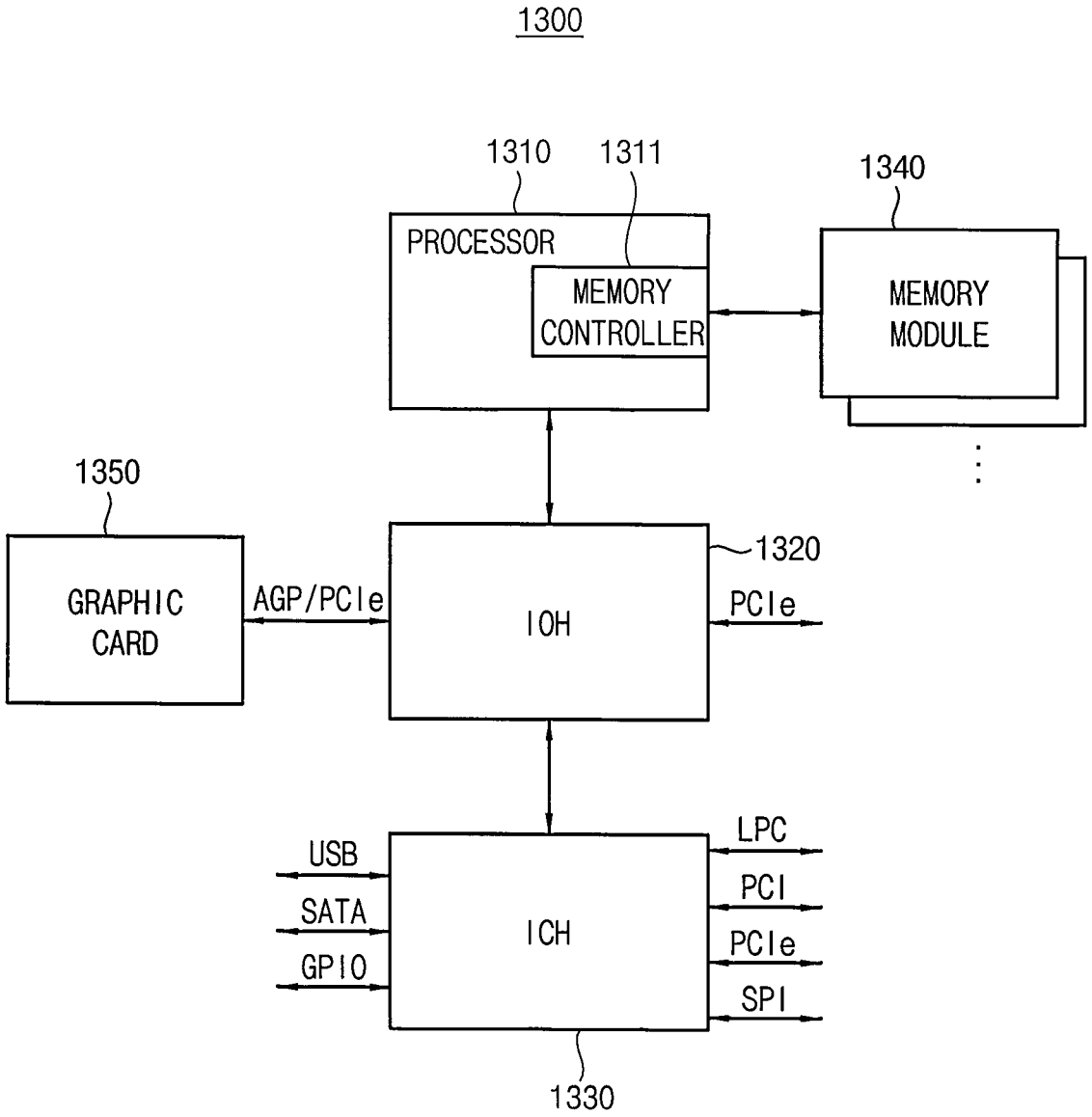
FIG. 46 is a block diagram illustrating a computing system according to some example embodiments.

FIG. 46 is a block diagram illustrating a computing system according to some example embodiments.

Referring to FIG. 46, a computing system 1300 includes a processor 1310, an input/output hub (IOH) 1320, an input/output controller hub (ICH) 1330, at least one memory module 1340, and a graphics card 1350. In some embodiments, the computing system 1300 may be a personal computer (PC), a server computer, a workstation, a laptop computer, a mobile phone, a smart phone, a personal digital assistant (PDA), a portable multimedia player (PMP), a digital camera), a digital television, a set-top box, a music player, a portable game console, a navigation system, etc.

The processor 1310 may perform various computing functions such as executing specific software for performing specific calculations or tasks. For example, the processor 1310 may be a microprocessor, a central process unit (CPU), a digital signal processor, or the like. In some embodiments, the processor 1310 may include a single core or multiple cores. For example, the processor 1310 may be a multi-core processor, such as a dual-core processor, a quad-core processor, a hexa-core processor, etc. Although FIG. 40 illustrates the computing system 1300 including one processor 1310, in some embodiments, the computing system 1300 may include a plurality of processors. The processor 1310 may include an internal or external cache memory.

The processor 1310 may include a memory controller 1311 for controlling operations of the memory module 1340. The memory controller 1311 included in the processor 1310 may be referred to as an integrated memory controller (IMC). A memory interface between the memory controller 1311 and the memory module 1340 may be implemented with a single channel including a plurality of signal lines, or may bay be implemented with multiple channels, to each of which at least one memory module 1340 may be coupled. In some embodiments, the memory controller 1311 may be located inside the input/output hub 1320, which may be referred to as memory controller hub (MCH).

The input/output hub 1320 may manage data transfer between processor 1310 and devices, such as the graphics card 1350. The input/output hub 1320 may be coupled to the processor 1310 via various interfaces. For example, the interface between the processor 1310 and the input/output hub 1320 may be a front side bus (FSB), a system bus, a HyperTransport, a lightning data transport (LDT), a QuickPath interconnect (QPI), a common system interface (CSI), etc. Although FIG. 46 illustrates the computing system 1300 including one input/output hub 1320, in some embodiments, the computing system 1300 may include a plurality of input/output hubs. The input/output hub 1320 may provide various interfaces with the devices. For example, the input/output hub 1320 may provide an accelerated graphics port (AGP) interface, a peripheral component interface-express (PCIe), a communications streaming architecture (CSA) interface, etc.

The graphic card 1350 may be coupled to the input/output hub 1320 via AGP or PCIe. The graphics card 1350 may control a display device (not shown) for displaying an image. The graphics card 1350 may include an internal processor for processing image data and an internal memory device. In some example embodiments, the input/output hub 1320 may include an internal graphics device along with or instead of the graphics card 1350 outside the graphics card 1350. The graphics device included in the input/output hub 1320 may be referred to as integrated graphics. Further, the input/output hub 1320 including the internal memory controller and the internal graphics device may be referred to as a graphics and memory controller hub (GMCH).

The input/output controller hub 1330 may perform data buffering and interface arbitration to efficiently operate various system interfaces. The input/output controller hub 1330 may be coupled to the input/output hub 1320 via an internal bus, such as a direct media interface (DMI), a hub interface, an enterprise Southbridge interface (ESI), PCIe, etc. The input/output controller hub 1330 may provide various interfaces with peripheral devices. For example, the input/output controller hub 1330 may provide a universal serial bus (USB) port, a serial advanced technology attachment (SATA) port, a general purpose input/output (GPIO), a low pin count (LPC) bus, a serial peripheral interface (SPI), PCI, PCIe, etc.

In some embodiments, the processor 1310, the input/output hub 1320 and the input/output controller hub 1330 may be implemented as separate chipsets or separate integrated units. In other example embodiments, at least two of the processor 1310, the input/output hub 1320 and the input/output controller hub 1330 may be implemented as a single chipset. Also, while many features of the example embodiments are disclosed as units, in other embodiments those features may be implemented as other forms of logic including but not limited to code-based operations performed by a processor.

At least one of the processor 1310, the input/output hub 1320, the input/output controller hub 1330, the memory module 1340, and the graphics card 1350 may include an adaptive repair circuit according to at least one example embodiment as described above. Using the adaptive repair circuit, the failed signal path in the signal paths between the various components may be repaired efficiently.

The example embodiments may be applied to arbitrary devices and systems requiring signal transfer between devices and sub systems. For example, the example embodiments may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, or computer storage medium or device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A memory system comprising:

a memory controller;

a memory device comprising:

N number of input-output terminals and a repair input-output terminal disposed in an order of first to Nth input-output terminals and the repair input-output terminal, the N being a natural integer; and an adaptive repair circuit configured to perform a first repair mode in response to a first mode signal and a first fail information, and to perform a second repair mode in response to a second mode signal and a second fail information; and an interposer including a plurality of signal paths disposed in accordance with the order of the input-output terminals, and each of the plurality of signal paths connecting each of the input-output terminals to a corresponding terminal of the memory controller, wherein, in the first repair mode, when the first fail information indicates that jth signal path connected to jth input-output terminal has failed, j being a natural integer smaller than N, the adaptive repair circuit is configured to replace each of jth to N−1th signal paths with each of j+1th to Nth signal paths respectively, and in the second repair mode, when the second fail information indicates that kth signal path connected to kth input-output terminal failed, k being a natural integer equal to or smaller than N, the adaptive repair circuit is configured to replace each of the kth to Nth signal paths with each of k+1th to Nth signal paths and a repair signal path which is connected to the repair input-output terminal respectively.

2. The memory system of claim 1, wherein the first to N−1th input-output terminals are main input-output terminals;

the Nth input-output terminal is a sub input-output terminal; and in the first repair mode, the sub input-output terminal is not electrically connected to any of the plurality of signal paths, and in the second repair mode, the sub input-output terminal is connected to the repair signal path.

3. The memory system of claim 2, wherein the main input-output terminals are configured to transfer main signals for main operation of the memory device;

the main operation is one of a read operation and a write operation; and the sub input-output terminal is configured to transfer a sub signal for sub operation of the memory device, the sub operation and the sub signal are data bus inversion operation and a data bus inversion signal respectively.

4. The memory system of claim 1, wherein, in the first repair mode, the first to j−1th input-output terminals are connected to the first to j−1th signal paths respectively, and in the second repair mode, the first to k−1th input-output terminals are connected to the first to k−1th signal paths respectively.

5. The memory system of claim 1, wherein the memory controller is configured to provide the first fail information and the second fail information.

6. The memory system of claim 5, wherein the memory controller includes a built-in self-test (BIST) circuit configured to generate the first fail information and the second fail information.

7. The memory system of claim 6, wherein the BIST circuit is configured to test the plurality of signal paths connecting the memory controller and the memory device while rebooting the memory system to provide the first and/or second fail information.

8. The memory system of claim 1, wherein the memory controller and the memory device are mounted on the interposer.

9. The memory system of claim 1, wherein the memory system further includes a substrate on which the interposer in mounted.

10. The memory system of claim 9, wherein the memory system further includes a conductive bump formed on a lower surface of the substrate for connecting the memory system to an external device.

11. The memory system of claim 1, wherein the memory device comprising:

a master chip; and a slave chip stacked on the master chip, the slave chip configured to transfer and receive electrical signals to/from the master chip through through-silicon-vias (TSVs), and the slave chip including an internal circuit configured to perform at least one function.

12. The memory system of claim 11, wherein the adaptive repair circuit is included in the master chip.

13. The memory system of claim 1, further comprising:

a mode register set configured to set each of the first mode signal and the second mode through a mode register set operation.

14. A memory system, comprising:

a first sub system;

a second sub system comprising:

a plurality of input-output terminals disposed in an order of a first group of input-output terminals, a repair input-output terminal, and a second group of input-output terminals, the first group of input-output terminals including N number of input-output terminals disposed in an order of first to Nth input-output terminals and the second group of input-output terminals including M number of input-output terminals disposed in an order of first to Mth input-output terminals, the N and M being natural integers; and an adaptive repair circuit configured to perform a repair operation in response to a fail information; and an interposer including a first group of signal paths disposed in accordance with the order of the first group of input-output terminal and each of the first group of signal paths connecting each of the first group of input-output terminals of the second sub system to corresponding [terminal] *terminals* of the first sub system, a repair signal path connecting the repair input-output terminals of the second sub system to corresponding terminal of the first sub system, and a second group of signal paths disposed in accordance with the order of the second group of input-output terminals and each of the second group of signal paths connecting each of the second group of input-output terminals of the second sub system to corresponding [terminal] *terminals* of the first sub system, wherein, when the fail information indicates that jth signal path in the first group of signal paths failed, the adaptive repair circuit is configured to replace each of the jth to Nth input-output terminals of the first group of input-output terminals with each of j+1th to Nth signal paths of the first group of signal paths and the repair signal path respectively, [and]

when the fail information indicates that kth signal path in the second group of signal paths failed, the adaptive repair circuit is configured to replace each of the kth to Mth input-output terminals of the second group of input-output terminals to each of k+1th to Mth signal paths of the second group of signal paths and the repair signal path respectively, j and k are natural integers, and equal to or smaller than N and M respectively*, and*

*the repair signal path is located between the first group of signal paths and the second group of signal paths.*

15. The memory system of claim 14, wherein the N and the M are the same.

16. The memory system of claim 14, wherein when the fail information indicates that jth signal path among the first group of signal path failed, the adaptive repair circuit is further configured to connect each of the first to j−1th input-output terminals of the first group of input-output terminals to each of first to j−1th signal paths of the first group of signal paths respectively; and when the fail information indicates that kth signal path in the second group of signal paths failed, the adaptive repair circuit is further configured to replace each of the first to k−1th input-output terminals of the second group of input-output terminals to each of first to k−1th signal paths of the second group of signal paths respectively.

[17. The memory system of claim 16, wherein the repair signal path is located between the first group of signal paths and the second group of signal paths.]

18. The memory system of claim [17] *14*, wherein the repair signal path is shared by both the Nth input-output terminal of the first group of input-output terminals and the Mth input-output terminal of the second group of input-output terminals.

19. The memory system of claim 14, wherein the first sub system and the second sub system are a master chip and a slave chip respectively, the slave chip is stacked on the master chip and configured to transfer and receive electrical signals to/from the master chip through through-silicon-vias (TSVs).

20. The memory system of claim 19, wherein the adaptive repair circuit is included in the master chip.

*21. A memory system, comprising:*

*a memory controller;*

*a memory device including an adaptive repair circuit, the adaptive repair circuit configured to receive first fail information during a first repair mode and to receive second fail information during a second repair mode; and*

*an interposer including a plurality of normal signal paths and at least one repair signal path, the plurality of normal signal paths comprising a plurality of main signal paths and a sub signal path, each of the plurality of normal signal paths and the at least one repair signal path being configured to connect the memory controller and the memory device, wherein*

*in the first repair mode, the adaptive repair circuit is configured to repair a failed signal path using the sub signal path based on the first fail information, and*

*in the second repair mode, the adaptive repair circuit is configured to repair the failed signal path using the repair signal path based on the second fail information,*

*the plurality of main signal paths are configured to transfer main signals for main operation of the memory device, the main operation being one of a read operation and a write operation, and*

*the sub signal path is configured to transfer a sub signal for sub operation of the memory device, the sub operation and the sub signal being a data bus inversion operation and a data bus inversion signal respectively.*

*22. The memory system of claim 21, wherein the data bus inversion operation based on the sub signal path is not performed when the failed signal path is repaired in the first repair mode.*

*23. The memory system of claim 21, wherein the adaptive repair circuit is configured to replace the sub signal path with the repair signal path in the second repair mode.*

*24. The memory system of claim 21, wherein each of the first fail information and the second fail information identifies the failed signal path among the plurality of the normal signal paths.*

*25. The memory system of claim 21, wherein the memory controller is configured to provide the first fail information in the first repair mode and the second fail information in the second repair mode to the memory device.*

*26. The memory system of claim 21, wherein the memory controller includes a built-in self-test (BIST) circuit configured to generate the first fail information and the second fail information.*

*27. The memory system of claim 26, wherein the built-in self-test circuit is configured to test the plurality of normal signal paths connecting the memory controller and the memory device in response to rebooting of the memory system to provide the first fail information and the second fail information.*

*28. The memory system of claim 21, wherein the memory controller and the memory device are mounted on the interposer.*

*29. The memory system of claim 21, further comprising:*

*a base substrate on which the interposer in mounted.*

*30. The memory system of claim 29, further comprising:*

*a conductive bump formed on a lower surface of the base substrate, the conductive bump configured to connect the memory system to an external device.*

*31. The memory system of claim 21, wherein*

*the plurality of normal signal paths are divided into a plurality of groups; and*

*one repair signal path is assigned to two groups of the plurality of groups.*

*32. The memory system of claim 21, wherein the failed signal path is one of the plurality of main signal paths.*

*33. A memory device comprising:*

*an input-output terminal set including a plurality of normal input-output terminals and a repair input-output terminal, the plurality of normal input-output terminals being connected to an external device via a plurality of main signal paths and a sub signal path, and the repair input-output terminal being selectively connected to the external device via a repair signal path; and*

*an adaptive repair circuit configured to repair a failed signal path based on a repair mode and fail information, wherein*

*in a first repair mode, the adaptive repair circuit is configured to repair the failed signal path using the sub signal path, and*

*in a second repair mode, the adaptive repair circuit is configured to repair the failed signal path using the repair signal path,*

*the plurality of main signal paths are configured to transfer main signals for main operation of the memory device, the main operation being one of a read operation and a write operation, and*

*the sub signal path is configured to transfer a sub signal for sub operation of the memory device, the sub operation and the sub signal being a data bus inversion operation and a data bus inversion signal respectively.*

*34. The memory device of claim 33, wherein, if one of the plurality of main signal paths is repaired using the sub signal path during the first repair mode, the memory device is configured to not perform the data bus inversion operation based on the sub signal path.*

*35. The memory device of claim 34, wherein the adaptive repair circuit is configured to replace the sub signal path with the repair signal path in the second repair mode.*

*36. The memory device of claim 34, wherein the fail information identifies the failed signal path among the plurality of the normal signal paths.*

*37. The memory device of claim 34, wherein the failed signal path is one of the plurality of main signal paths.*

*38. A memory device, comprising:*

*a master chip, comprising,*

*an input-output terminal set including a plurality of normal input-output terminals and a repair input-output terminal, the plurality of normal input-output terminals being connected to an external device via*

*a plurality of main signal paths and a sub signal path, and the repair input-output terminal being selectively connected to the external device via a repair signal path, and*

*an adaptive repair circuit configured to repair a failed signal path based on a repair mode and fail information; and*

*a slave chip stacked on the master chip, the slave chip being configured to transfer and receive electrical signals to/from the master chip through through-silicon-vias (TSVs), and the slave chip including an internal circuit configured to perform at least one function, wherein,*

*in a first repair mode, the adaptive repair circuit is configured to repair the failed signal path using the sub signal path, and*

*in a second repair mode, the adaptive repair circuit is configured to repair the failed signal path using the repair signal path,*

*the plurality of main signal paths are configured to transfer main signals for main operation of the memory device, the main operation being one of a read operation and a write operation, and*

*the sub signal path is configured to transfer a sub signal for sub operation of the memory device, the sub operation and the sub signal being a data bus inversion operation and a data bus inversion signal respectively.*

* * * * *